US012149000B2

(12) United States Patent
Park et al.

(10) Patent No.: US 12,149,000 B2
(45) Date of Patent: Nov. 19, 2024

(54) ANTENNA MODULE HAVING A MINIATURIZED SIZE AND ELECTRONIC DEVICE INCLUDING THE ANTENNA MODULE

(71) Applicant: Samsung Electronics Co., Ltd., Gyeonggi-do (KR)

(72) Inventors: Seongjin Park, Gyeonggi-do (KR); Hosaeng Kim, Gyeonggi-do (KR); Sumin Yun, Gyeonggi-do (KR); Woomin Jang, Gyeonggi-do (KR); Jaehoon Jo, Gyeonggi-do (KR); Jinwoo Jung, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 195 days.

(21) Appl. No.: 17/719,029

(22) Filed: Apr. 12, 2022

(65) Prior Publication Data

US 2022/0336967 A1 Oct. 20, 2022

Related U.S. Application Data

(63) Continuation of application No. PCT/KR2022/005117, filed on Apr. 8, 2022.

(30) Foreign Application Priority Data

Apr. 14, 2021 (KR) ........................ 10-2021-0048663

(51) Int. Cl.
*H01Q 21/24* (2006.01)
*H01Q 5/307* (2015.01)

(52) U.S. Cl.
CPC ............. *H01Q 21/24* (2013.01); *H01Q 5/307* (2015.01)

(58) Field of Classification Search
CPC .. H01Q 21/0025; H01Q 20/021; H01Q 21/24; H01Q 9/0407; H01Q 21/065
See application file for complete search history.

(56) References Cited

U.S. PATENT DOCUMENTS

2018/0048075 A1 2/2018 Park et al.
2019/0198976 A1 6/2019 Kim et al.
(Continued)

FOREIGN PATENT DOCUMENTS

CN 207303357 5/2018
KR 10-2008-0017655 2/2008
(Continued)

OTHER PUBLICATIONS

International Search Report dated Jul. 15, 2022 issued in counterpart application No. PCT/KR2022/005117, 11 pages.
(Continued)

*Primary Examiner* — David E Lotter
*Assistant Examiner* — Aladdin Abdulbaki
(74) *Attorney, Agent, or Firm* — The Farrell Law Firm, P.C.

(57) ABSTRACT

Disclosed is an electronic device including a housing, a wireless communication module, and an antenna module operatively connected to the wireless communication module and disposed inside the housing, wherein the antenna module includes a first substrate comprising at least one feed line, a first surface disposed in a first direction, and a second surface disposed in a second direction opposite the first surface, a second substrate disposed on the first surface of the first substrate and having a first antenna array and a second antenna array disposed on the second substrate, and a third substrate disposed in a portion of the second surface of the first substrate and having a third antenna array and a fourth antenna array disposed on the third substrate, wherein
(Continued)

the second substrate and/or the third substrate is formed of a material having a higher permittivity than the first substrate.

16 Claims, 34 Drawing Sheets

(56) References Cited

U.S. PATENT DOCUMENTS

| | | | |
|---|---|---|---|
| 2020/0119453 A1 | 4/2020 | Takayama et al. | |
| 2020/0169007 A1 | 5/2020 | Song et al. | |
| 2020/0266523 A1 | 8/2020 | Park et al. | |
| 2020/0381804 A1* | 12/2020 | Park | H01Q 9/16 |
| 2021/0036407 A1 | 2/2021 | Kim et al. | |
| 2021/0044001 A1 | 2/2021 | Kang et al. | |

FOREIGN PATENT DOCUMENTS

| | | |
|---|---|---|
| KR | 1020180017667 | 2/2018 |
| KR | 1020200061935 | 6/2020 |
| KR | 10-2137093 | 7/2020 |
| KR | 1020200099417 | 8/2020 |
| KR | 10-2020-0115413 | 10/2020 |
| KR | 1020200120464 | 10/2020 |
| KR | 1020200136156 | 12/2020 |
| KR | 1020210015500 | 2/2021 |

OTHER PUBLICATIONS

European Search Report dated Jun. 26, 2024 issued in counterpart application No. 22788356.8-1201, 8 pages.

* cited by examiner (a)

(b)

(a)

(b)

Radiation pattern @28G

ANTENNA MODULE HAVING A MINIATURIZED SIZE AND ELECTRONIC DEVICE INCLUDING THE ANTENNA MODULE

CROSS REFERENCE TO RELATED APPLICATIONS

This application is a Bypass Continuation Application of International Application No. PCT/KR2022/005117, which was filed on Apr. 8, 2022, and is based on and claims priority under 35 U.S.C. § 119 to Korean Patent Application No. 10-2021-0048663, which was filed in the Korean Intellectual Property Office on Apr. 14, 2021, the entire disclosure of each of which is incorporated herein by reference.

BACKGROUND

1. Field

The disclosure relates generally to an electronic device, and more particularly, to an antenna module and the electronic device including the antenna module.

2. Description of Related Art

The use of electronic devices such as smartphones, foldable phones, and tablet personal computers (PCs) continues to increase, and various functions are provided to the electronic devices.

The electronic device may perform a phone call with another electronic device and transmit and receive a variety of data to and from the electronic device through wireless communication.

The electronic device may include at least one antenna module to perform long-range communication and/or short-range communication with another electronic device. For example, the electronic device may include at least one antenna module capable of supporting a high frequency band of about 3 gigahertz (GHz) to 300 GHz.

The electronic device may perform a wireless communication function corresponding to a $5^{th}$ generation (5G) communication band using at least one antenna module.

Next-generation wireless communication technology may transmit and receive radio signals using a frequency band in the range of about 3 GHz to 300 GHz.

Recently, active research has been performed on an antenna module capable of performing 5G millimeter wave (mmWave) communication), which is a next-generation wireless communication technology.

At least one antenna module may be disposed in an inner space of a housing (e.g., a side bezel structure) of an electronic device. The number of electronic components mounted to the electronic device is increasing as the functions provided by the electronic device are diversified.

When disposing a plurality of antennas on a general printed circuit board (PCB), it becomes difficult to decrease the size of the antenna module.

If the antenna module is not miniaturized, the mounting space of other electronic components in the electronic device is compromised.

Thus, there is a need in the art for an antenna module that consumes less space yet provides high performance in the electronic device.

SUMMARY

The disclosure has been made to address at least the above-mentioned problems and/or disadvantages and to provide at least the advantages described below.

Accordingly, an aspect of the disclosure is to provide a miniaturized an antenna module using a substrate having high permittivity, thereby providing an electronic device including a miniaturized antenna module.

Another aspect of the disclosure is to provide an antenna module in which a plurality of antennas is disposed on at least one substrate having high permittivity, thus realizing dual-polarized wave radiation in a plurality of directions.

In accordance with an aspect of the disclosure, an electronic device may include a housing, a wireless communication module, and an antenna module operatively connected to the wireless communication module and disposed inside the housing, wherein the antenna module includes a first substrate comprising at least one feed line, a first surface disposed in a first direction, and a second surface disposed in a second direction opposite the first surface, a second substrate disposed on the first surface of the first substrate and having a first antenna array and a second antenna array disposed on the second substrate, and a third substrate disposed in a portion of the second surface of the first substrate and having a third antenna array and a fourth antenna array disposed on the third substrate, wherein the second substrate and/or the third substrate is formed of a material having a higher permittivity than the first substrate.

In accordance with an aspect of the disclosure, an electronic device may include a housing, a wireless communication module, and an antenna module operatively connected to the wireless communication module and disposed inside the housing, wherein the antenna module comprises a first substrate comprising at least one feed line, a first surface disposed in a first direction, and a second surface disposed in a second direction opposite the first surface, a second substrate disposed on the first surface of the first substrate and having a first antenna array, a second antenna array, and a third antenna array disposed on the second substrate, a ground layer disposed inside the second substrate and comprising a plurality of slits, and a plurality of substrates disposed under the third antenna array and having a fourth antenna array disposed on the plurality of substrates, and wherein the second substrate and the plurality of substrates are formed of a material having a higher permittivity than the first substrate.

In accordance with an aspect of the disclosure, an antenna module may include a first substrate comprising at least one feed line, a first surface directed in a first direction, and a second surface directed in a second direction opposite the first surface, a second substrate disposed on the first surface of the first substrate and having a first antenna array and a second antenna array disposed on the second substrate, and a third substrate disposed in a portion of the second surface of the first substrate and having a third antenna array and a fourth antenna array disposed on the third substrate, wherein the second substrate and/or the third substrate is formed of a material having higher permittivity than the first substrate.

BRIEF DESCRIPTION OF THE DRAWINGS

The above and other aspects, features, and advantages of certain embodiments of the disclosure will be more apparent from the following detailed description taken in conjunction with the accompanying drawings, in which.

DETAILED DESCRIPTION

Hereinafter, embodiments of the disclosure will be described in detail with reference to the accompanying drawings. Descriptions of well-known functions and/or configurations will be omitted for the sake of clarity and conciseness.

Figure 1:
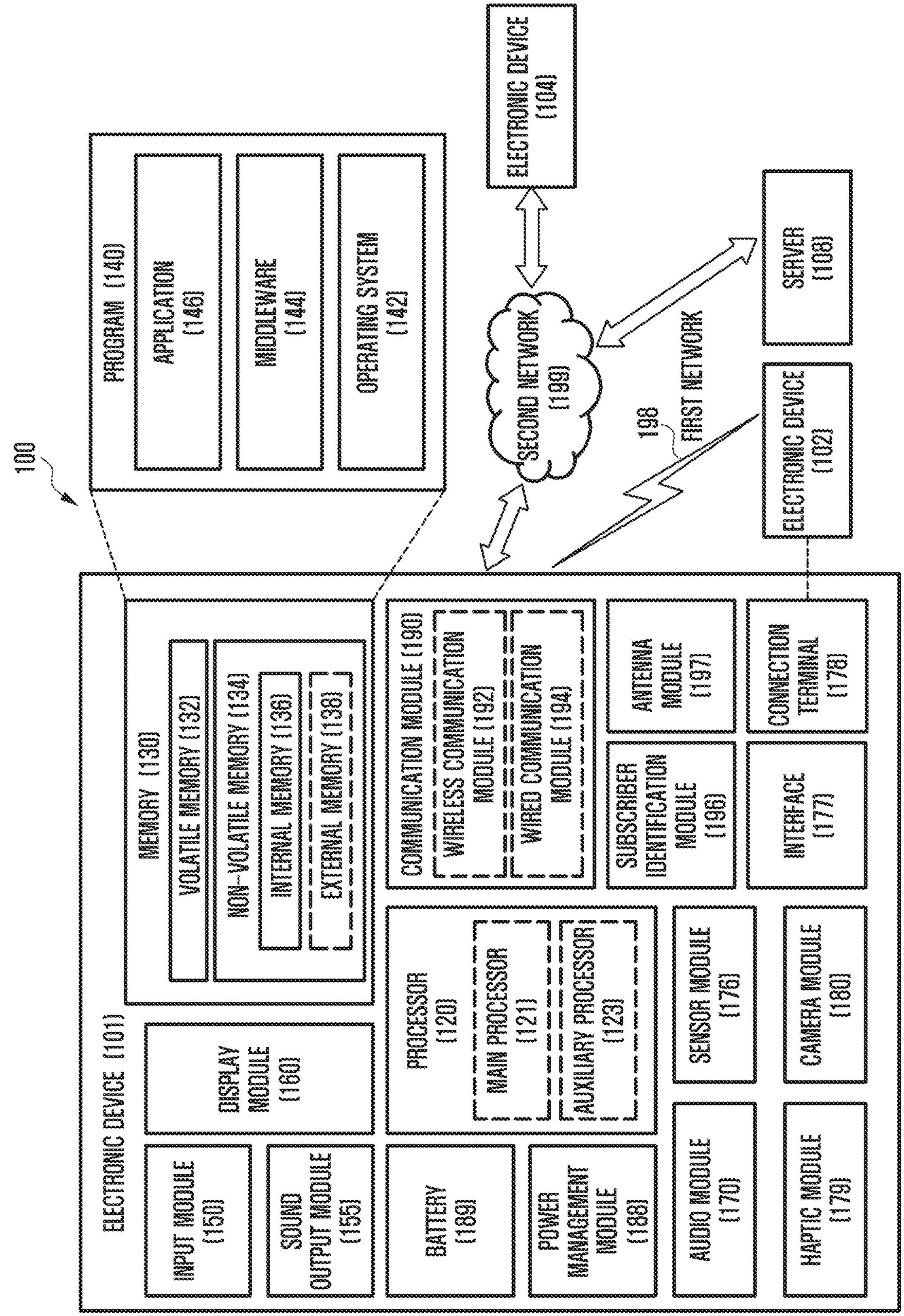
FIG. 1 illustrates an electronic device in a network environment according to an embodiment.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) card 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM card 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate, such as a PCB. According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a PCB, a RFIC disposed on a first surface (e.g., the bottom surface) of the PCB, or adjacent to the first surface and capable of supporting a designated high-frequency band (e.g., the mmWave band), and a plurality of antennas (e.g., array antennas) disposed on a second surface (e.g., the top or a side surface) of the PCB, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as “A or B,” “at least one of A and B,” “at least one of A or B,” “A, B, or C,” “at least one of A, B, and C,” and “at least one of A, B, or C,” may include any one of, or all possible combinations of the items enumerated together in a corresponding one of the phrases. As used herein, such terms as “1st” and “2nd,” or “first” and “second” may be used to simply distinguish a corresponding component from another, and does not limit the components in other aspect (e.g., importance or order). It is to be understood that if an element (e.g., a first element) is referred to, with or without the term “operatively” or “communicatively”, as “coupled with,” “coupled to,” “connected with,” or “connected to” another element (e.g., a second element), it means that the element may be coupled with the other element directly (e.g., wiredly), wirelessly, or via a third element.

As used in connection with various embodiments of the disclosure, the term “module” may include a unit implemented in hardware, software, or firmware, and may interchangeably be used with other terms, for example, “logic,” “logic block,” “part,” or “circuitry”. A module may be a single integral component, or a minimum unit or part thereof, adapted to perform one or more functions. For example, according to an embodiment, the module may be implemented in a form of an application-specific integrated circuit (ASIC).

Figure 2:
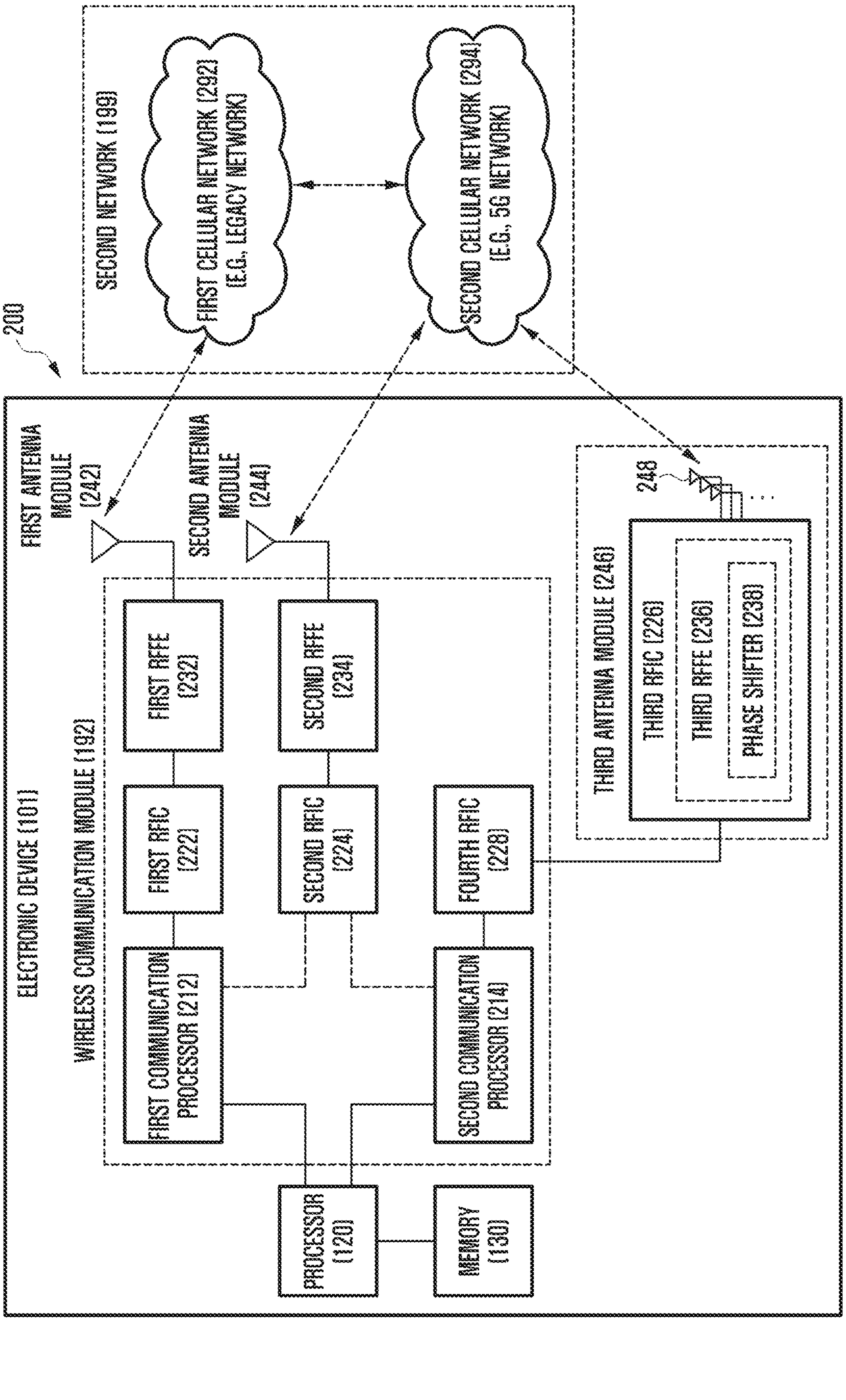
FIG. 2 illustrates an electronic device to support legacy network communication and 5G network communication according to an embodiment.

FIG. 2 is a block diagram 200 of an electronic device 101 to support legacy network communication and 5G network communication according to various embodiments.

Referring to FIG. 2, the electronic device 101 may include a first communication processor 212, a second communication processor 214, a first radio frequency integrated circuit (RFIC) 222, a second RFIC 224, and a third RFIC 226, a fourth RFIC 228, a first radio frequency front end (RFFE) 232, a second RFFE 234, a first antenna module 242, a second antenna module 244, and an antenna 248. The electronic device 101 may further include a processor 120 and a memory 130. The second network 199 may include a first cellular network 292 (e.g., a legacy network) and a second cellular network 294 (e.g., a 5G network). The electronic device 101 may further include at least one of the components illustrated in FIG. 1, and the second network 199 may further include at least one other network. According to an embodiment, the first communication processor 212, the second communication processor 214, the first RFIC 222, the second RFIC 224, the fourth RFIC 228, the first RFFE 232, and the second RFFE 234 may configure at least a portion of the wireless communication module 192. The fourth RFIC 228 may be omitted or may be included as a part of the third RFIC 226.

The first communication processor 212 may support establishment of a communication channel in a band to be used for wireless communication with the first cellular network 292 and legacy network communication through the established communication channel. According to various embodiments, the first cellular network may be a legacy network including a second generation (2G), 3G, 4G, or long-term evolution (LTE) network. The second communication processor 214 may support establishment of a communication channel corresponding to a specified band (e.g., about 6 GHz to about 60 GHz) among the bands to be used for wireless communication with the second cellular network 294, and 5G network communication through the established communication channel. According to various embodiments, the second cellular network 294 may be a 5G network defined by 3GPP. Additionally, according to an embodiment, the first communication processor 212 or the second communication processor 214 may support establishment of a communication channel corresponding to another specified band (e.g., about 6 GHz or less) among the bands to be used for wireless communication with the second cellular network 294, and 5G network communication through the established communication channel.

According to an embodiment, the first communication processor 212 and the second communication processor 214 may be implemented in a single chip or a single package. According to various embodiments, the first communication processor 212 or the second communication processor 214 may be provided in a single chip or a single package together with the processor 120, the coprocessor 123, or the communication module 190.

In the case of transmission, the first RFIC 222 may convert a baseband signal generated by the first communication processor 212 into a radio frequency (RF) signal of about 700 MHz to about 3 GHz used in the first cellular network 292 (e.g., a legacy network). In the case of reception, an RF signal may be obtained from the first cellular network 292 (e.g., a legacy network) through an antenna (e.g., the first antenna module 242), and may be preprocessed through an RFFE (e.g., the first RFFE 232). The first RFIC 222 may convert the preprocessed RF signal into a baseband signal to be processed by the first communication processor 212.

In the case of transmission, the second RFIC 224 may convert a baseband signal generated by the first communication processor 212 or the second communication processor 214 into an RF signal in a Sub6 band (e.g., about 6 GHz or less) (hereinafter, a 5G Sub6 RF signal) to be used in the second cellular network 294 (e.g., a 5G network). In the case of reception, a 5G Sub6 RF signal may be obtained from the second cellular network 294 (e.g., a 5G network) through an antenna (e.g., the second antenna module 244), and may be preprocessed through an RFFE (e.g., the second RFFE 234). The second RFIC 224 may convert the preprocessed 5G Sub6 RF signal into a baseband signal to be processed by a corresponding one of the first communication processor 212 or the second communication processor 214.

The third RFIC 226 may convert a baseband signal generated by the second communication processor 214 into an RF signal in a 5G Above6 band (e.g., about 6 GHz to about 60 GHz) (hereinafter, a 5G Above6 RF signal) to be used in the second cellular network 294 (e.g., a 5G network). In the case of reception, a 5G Above6 RF signal may be obtained from the second cellular network 294 (e.g., a 5G network) through an antenna (e.g., the antenna 248) and may be preprocessed through the third RFFE 236. The third RFIC 226 may convert the preprocessed 5G Above6 RF signal into a baseband signal to be processed by the second communication processor 214. According to an embodiment, the third RFFE 236 may be configured as a part of the third RFIC 226.

According to an embodiment, the electronic device 101 may include a fourth RFIC 228 separately from or as at least a part of the third RFIC 226. In this case, the fourth RFIC 228 may convert a baseband signal generated by the second communication processor 214 into an RF signal in an intermediate frequency band (e.g., about 9 GHz to about 11 GHz) (hereinafter, IF signal) and transmit the IF signal to the third RFIC 226. The third RFIC 226 may convert the IF signal into a 5G Above6 RF signal. In the case of reception, a 5G Above6 RF signal may be received from the second network 294 (e.g., a 5G network) through an antenna (e.g., the antenna 248) and may be converted into an IF signal by the third RFIC 226. The fourth RFIC 228 may convert the IF signal into a baseband signal to be processed by the second communication processor 214.

According to an embodiment, the first RFIC 222 and the second RFIC 224 may be implemented as at least a part of a single chip or single package. According to an embodiment, the first RFFE 232 and the second RFFE 234 may be implemented as at least a part of a single chip or single package. According to an embodiment, at least one antenna module of the first antenna module 242 or the second antenna module 244 may be omitted or combined with another antenna module to process RF signals in a plurality of corresponding bands.

According to an embodiment, the third RFIC 226 and the antenna 248 may be disposed on the same substrate to configure a third antenna module 246. For example, the wireless communication module 192 or the processor 120 may be disposed on the first substrate (e.g., a main PCB). In this case, the third RFIC 226 may be disposed in a partial area (e.g., the bottom surface) of a second substrate (e.g., a sub-PCB) that is separate from the first substrate, and the antenna 248 may be disposed in another partial area (e.g., the top surface) thereof, thereby configuring the third antenna module 246. By disposing the third RFIC 226 and the antenna 248 on the same substrate, it is possible to reduce the length of a transmission line therebetween. This may reduce loss (e.g., attenuation) of a signal, for example, in a high-frequency band (e.g., about 6 GHz to about 60 GHz) used in 5G network communication due to a transmission line. Accordingly, the electronic device 101 may improve the quality or speed of communication with the second cellular network 294 (e.g., a 5G network).

According to an embodiment, the antenna 248 may be configured as an antenna array including a plurality of antenna elements to be used in beamforming. In this case, the third RFIC 226 may include a plurality of phase shifters 238 corresponding to the plurality of antenna elements as, for example, a part of the third RFFE 236. In the case of transmission, the each of the plurality of phase shifters 238 may convert the phase of a 5G Above6 RF signal to be transmitted to the outside of the electronic device 101 (e.g., a base station of a 5G network) through a corresponding antenna element. In the case of reception, each of the plurality of phase shifters 238 may convert the phase of a 5G Above6 RF signal received from the outside through a corresponding antenna element into the same or substantially the same phase. This enables transmission or reception between the electronic device 101 and the outside through beamforming.

The second cellular network 294 (e.g., a 5G network) may be operated independently of (e.g., stand-alone (SA)) or may be operated while being connected to (e.g., non-stand-alone (NSA)) the first cellular network 292 (e.g., a legacy network). For example, the 5G network may have only an access network (e.g., a 5G radio access network (RAN) or a next-generation RAN (NG RAN)), and may not have a core network (e.g., a next-generation core (NGC)). In this case, after accessing the access network of the 5G network, the electronic device 101 may access an external network (e.g., the Internet) under the control of a core network (e.g., an evolved packed core (EPC)) of the legacy network. Protocol information for communication with the legacy network (e.g., LTE protocol information) or protocol information for communication with the 5G network (e.g., new radio (NR) protocol information) may be stored in the memory 130, and other components (e.g., the processor 120, the first communication processor 212, or the second communication processor 214) may access the same.

Figure 3A:
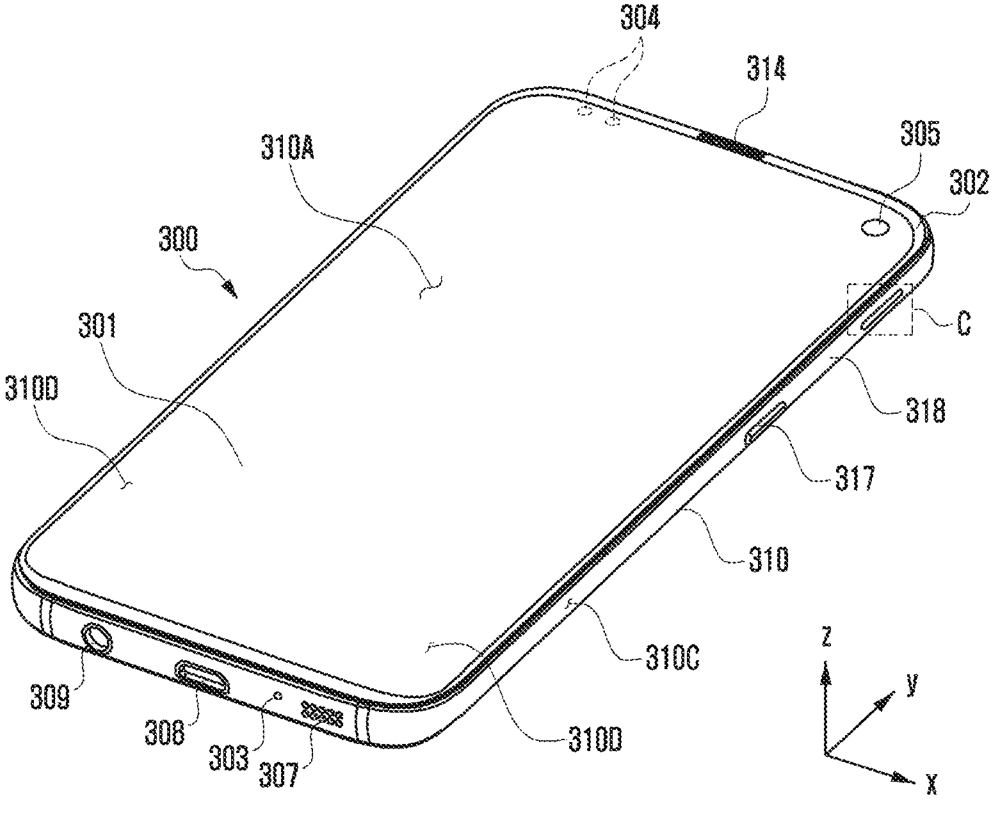
FIG. 3A illustrates a front side of an electronic device according to an embodiment.
Figure 3B:
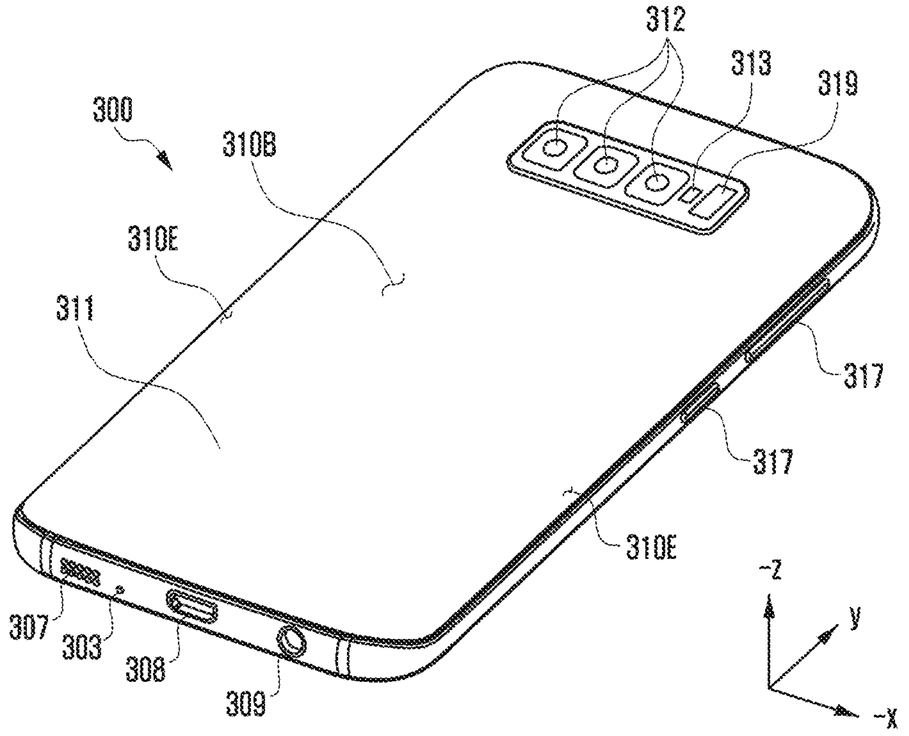
FIG. 3B illustrates a rear side of the electronic device in FIG. 3A according to an embodiment.

FIG. 3A illustrates a front side of an electronic device according to various embodiments of the disclosure. FIG. 3B illustrates a rear side of the electronic device in FIG. 3A according to various embodiments of the disclosure.

Referring to FIGS. 3A and 3B, an electronic device 300 according to an embodiment may include a housing 310 including a first surface (or a front surface) 310A, a second surface (or a rear surface) 310B, and a side surface 310C surrounding the space between the first surface 310A and the second surface 310B. In another embodiment, the housing 310 may refer to a structure that forms part of the first surface 310A, the second surface 310B, and the side surface 310C in FIG. 3A. According to an embodiment, the first surface 310A may be formed by a front plate 302 at least a portion of which is substantially transparent (e.g., a glass plate including various coating layers, or a polymer plate). The second surface 310B may be formed by a substantially opaque rear plate 311. The rear plate 311 may be formed of, for example, coated or tinted glass, ceramic, polymer, metal (e.g., aluminum, stainless steel (STS), or magnesium), or a combination of at least two of the above materials. The side surface 310C may be coupled to the front plate 302 and the rear plate 311 and may be formed by a side bezel structure (or "side member") 318 including metal and/or polymer. In some embodiments, the rear plate 311 and the side bezel structure 318 may be integrally formed and may include the same material (e.g., a metal material such as aluminum).

In the illustrated embodiment, the front plate 302 may include two first areas 310D seamlessly extending from the first surface 310A to be bent toward the rear plate 311 at both ends of the long edge of the front plate 302. In the illustrated embodiment (see FIG. 3B), the rear plate 311 may include two second areas 310E seamlessly extending from the second surface 310B to be bent toward the front plate 302 at both ends of the long edge thereof. In some embodiments, the front plate 302 (or the rear plate 311) may include only one of the first areas 310D (or the second areas 310E). In another embodiment, some of the first areas 310D or second areas 310E may not be included. In the above embodiments, when viewed from the side of the electronic device 300, the side bezel structure 318 may have a first thickness (or width) on the side surface that does not include the first areas 310D or the second areas 310E, and a second thickness, which is less than the first thickness, on the side surface including the first areas 310D or the second areas 310E.

According to an embodiment, the electronic device 300 may include at least one or more of a display 301, an input device 303, sound output devices 307 and 314, sensor modules 304 and 319, camera modules 305, 312, and 313, a key input device 317, an indicator, and/or connector holes 308 and 309. In some embodiments, the electronic device 300 may exclude at least one of the elements (e.g., the key input device 317 or the indicator) or further include other elements.

The display 301 may be exposed through, for example, a substantial portion of the front plate 302. In some embodiments, at least a portion of the display 301 may be exposed through the first surface 310A and the front plate 302 configuring the first area 310D of the side surface 310C. The display 301 may be combined with a touch sensing circuit, a pressure sensor capable of measuring the intensity (pressure) of a touch, and/or a digitizer that detects a magnetic field type stylus pen, or may be disposed adjacent thereto. In some embodiments, at least a portion of the sensor modules

304 and 319, and/or at least a portion of the key input device 317 may be disposed in the first area 310D and/or the second area 310E.

The input device 303 may include a microphone 303. In some embodiments, the input device 303 may include a plurality of microphones 303 arranged to sense the direction of a sound. The sound output devices 307 and 314 may include speakers 307 and 314. The speakers 307 and 314 may include an external speaker 307 and a receiver 314 for a call. In some embodiments, the microphone 303, the speakers 307 and 314, and the connectors 308 and 309 may be disposed in the space of the electronic device 300, and may be exposed to the external environment through at least one hole formed in the housing 310. In some embodiments, the hole formed in housing 310 may be used in common for the microphone 303 and the speakers 307 and 314. In some embodiments, the sound output devices 307 and 314 may include a speaker (e.g., a piezo speaker) that operates without a hole formed in the housing 310.

The sensor modules 304 and 319 may generate electrical signals or data values corresponding to the internal operation state of the electronic device 300 or an external environmental state. The sensor modules 304 and 319 may include, for example, a first sensor module 304 (e.g., a proximity sensor) and/or a second sensor module (e.g., a fingerprint sensor) disposed on the first surface 310A of the housing 310, and/or a third sensor module 319 (e.g., an HRM sensor) disposed on the second surface 310B of the housing 310. The fingerprint sensor may be disposed on the first surface 310A of the housing 310. The fingerprint sensor (e.g., an ultrasonic fingerprint sensor or an optical fingerprint sensor) may be disposed on the first surface 310A under the display 301. The electronic device 300 may further include at least one of sensor modules such as a gesture sensor, a gyro sensor, an atmospheric pressure sensor, a magnetic sensor, an acceleration sensor, a grip sensor, a color sensor, an IR sensor, a biometric sensor, a temperature sensor, a humidity sensor, and an illuminance sensor 304.

The camera modules 305, 312, and 313 may include a first camera device 305 disposed on the first surface 310A of the electronic device 300, and a second camera device 312 and/or a flash 313 disposed on the second surface 310B. The camera modules 305 and 312 may include one or more lenses, an image sensor, and/or an image signal processor. The flash 313 may include, for example, a light-emitting diode or a xenon lamp. In some embodiments, two or more lenses (wide-angle and telephoto lenses) and image sensors may be disposed on one side of the electronic device 300.

The key input device 317 may be disposed on the side surface 310C of the housing 310. In another embodiment, the electronic device 300 may exclude some or all of the above-mentioned key input devices 317, and the excluded key input devices 317 may be implemented in other forms such as soft keys or the like on the display 301. In another embodiment, the key input device 317 may be implemented using a pressure sensor included in the display 301.

The indicator may be disposed on, for example, the first surface 310A of the housing 310. The indicator may provide state information of the electronic device 300, for example, in the form of light. In another embodiment, the light-emitting device may provide, for example, a light source that interworks with the operation of the camera module 305. The indicator may include, for example, LEDs, IR LEDs, and xenon lamps.

The connector holes 308 and 309 may include a first connector hole 308 capable of accommodating a connector for transmitting and receiving power and/or data to and from an external electronic device (e.g., a USB connector or an IF module (interface connector port module)), and/or a second connector hole (or earphone jack) 309 capable of accommodating a connector for transmitting and receiving audio signals to and from an external electronic device.

Some camera modules 305 of the camera modules 305 and 312, some sensor modules 304 of the sensor modules 304 and 319, or the indicator may be disposed to be exposed through the display 101. For example, the camera module 305, the sensor module 304, or the indicator may be disposed so as to lead to the external environment through an opening perforated from the internal space of the electronic device 300 to the front plate 302 of the display 301. In another embodiment, some sensor modules 304 may be disposed in the internal space of the electronic device to perform their functions without being visually exposed through the front plate 302. For example, in this case, the area of the display 301 facing the sensor module is not required to have a perforated opening.

Figure 3C:
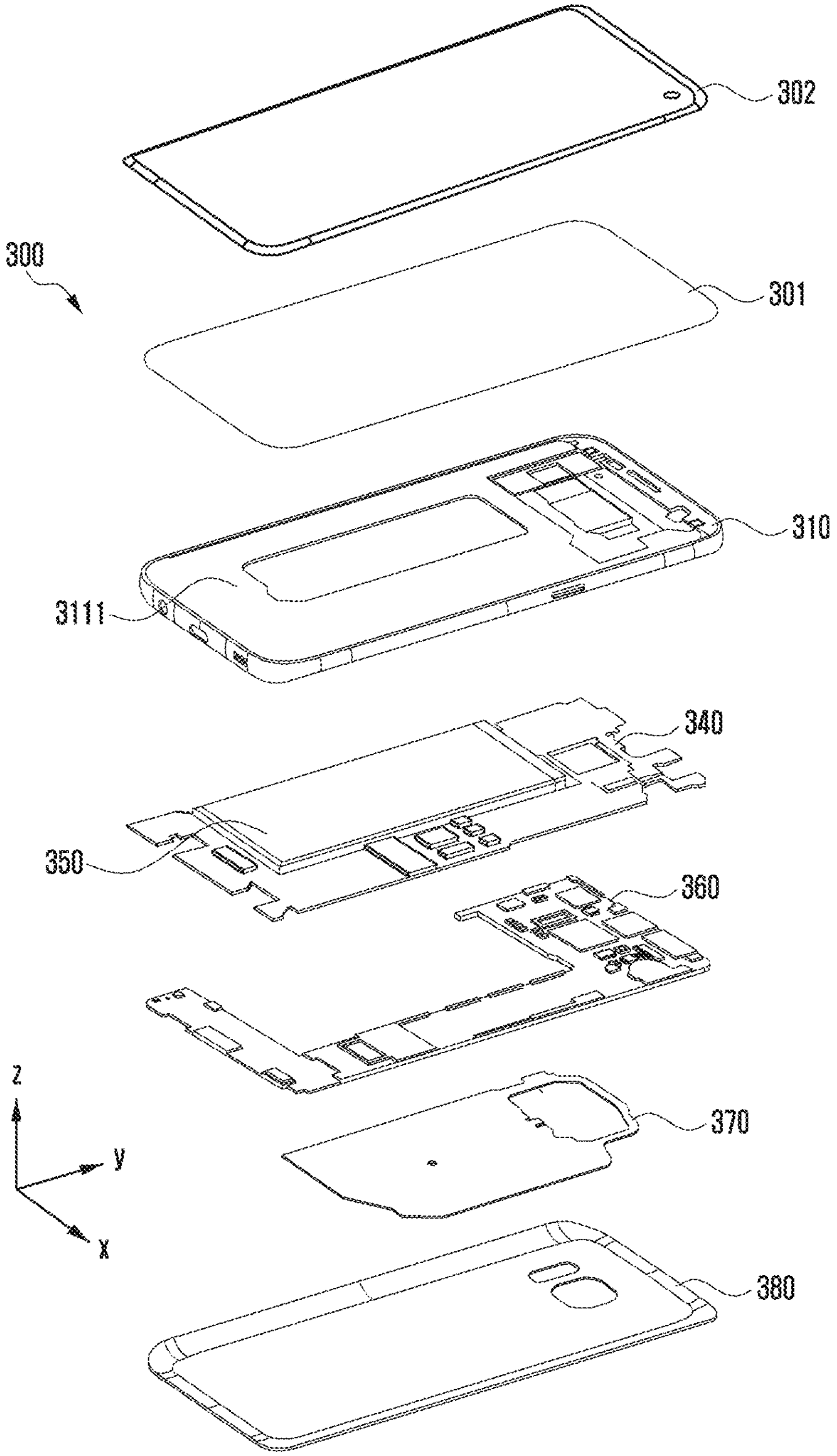
FIG. 3C is an exploded perspective view of the electronic device in FIG. 3A according to an embodiment.

FIG. 3C is an exploded perspective view of the electronic device in FIG. 3A according to various embodiments of the disclosure.

Referring to FIG. 3C, the electronic device 300 may include a side member 310 (e.g., a side bezel structure), a first support member 3111 (e.g., a bracket), a front plate 302, a display 301 (e.g., a display device), a printed circuit board 340, a battery 350, a second support member 360 (e.g., a rear case), an antenna 370, and/or a rear plate 380. In some embodiments, the electronic device 300 may exclude at least one of the elements (e.g., the first support member 3111 or the second support member 360) or further include other elements. At least one of the elements of the electronic device 300 may be the same as or similar to at least one of the elements of the electronic device 300 shown in FIG. 3A or 3B, so a duplicate description thereof will be omitted below.

The first support member 3111 may be disposed inside the electronic device 300 to be connected to the side bezel structure 310, or may be integrally formed with the side bezel structure 310. The first support member 3111 may be formed of, for example, a metal material and/or a non-metal (e.g., polymer) material. The first support member 3111 may have one surface to which a display 301 is coupled and the opposite surface to which the printed circuit board 340 is coupled. The printed circuit board 340 may have a processor, a memory, and/or an interface mounted thereon. The processor may include, for example, one or more of a central processing unit, an application processor, a graphic processing unit, an image signal processor, a sensor hub processor, or a communication processor.

The memory may include, for example, a volatile memory or a nonvolatile memory.

The interface may include, for example, an HDMI (high definition multimedia interface), a USB (universal serial bus) interface, an SD card interface, and/or an audio interface. For example, the interface may electrically or physically connect the electronic device 300 with an external electronic device, and may include a USB connector, an SD card/MMC connector, or an audio connector.

The battery 350 is a device for supplying power to at least one element of the electronic device 300, and may include, for example, a non-rechargeable primary battery, a rechargeable secondary battery, or a fuel cell. At least a portion of the battery 350 may be disposed on substantially the same plane as the printed circuit board 340. The battery 350 may be integrally disposed inside the electronic device 300, or may be disposed detachably from the electronic device 300.

The antenna 370 may be disposed between the rear plate 380 and the battery 350. The antenna 370 may include, for example, an NFC (near field communication) antenna, a wireless charging antenna, and/or an MST (magnetic secure transmission) antenna. For example, the antenna 370 may perform short-range communication with an external device or wirelessly transmit/receive power required for charging. In another embodiment, the antenna structure may be configured by a part of the side bezel structure 310 and/or the first support member 311 or a combination thereof.

Figure 4A:
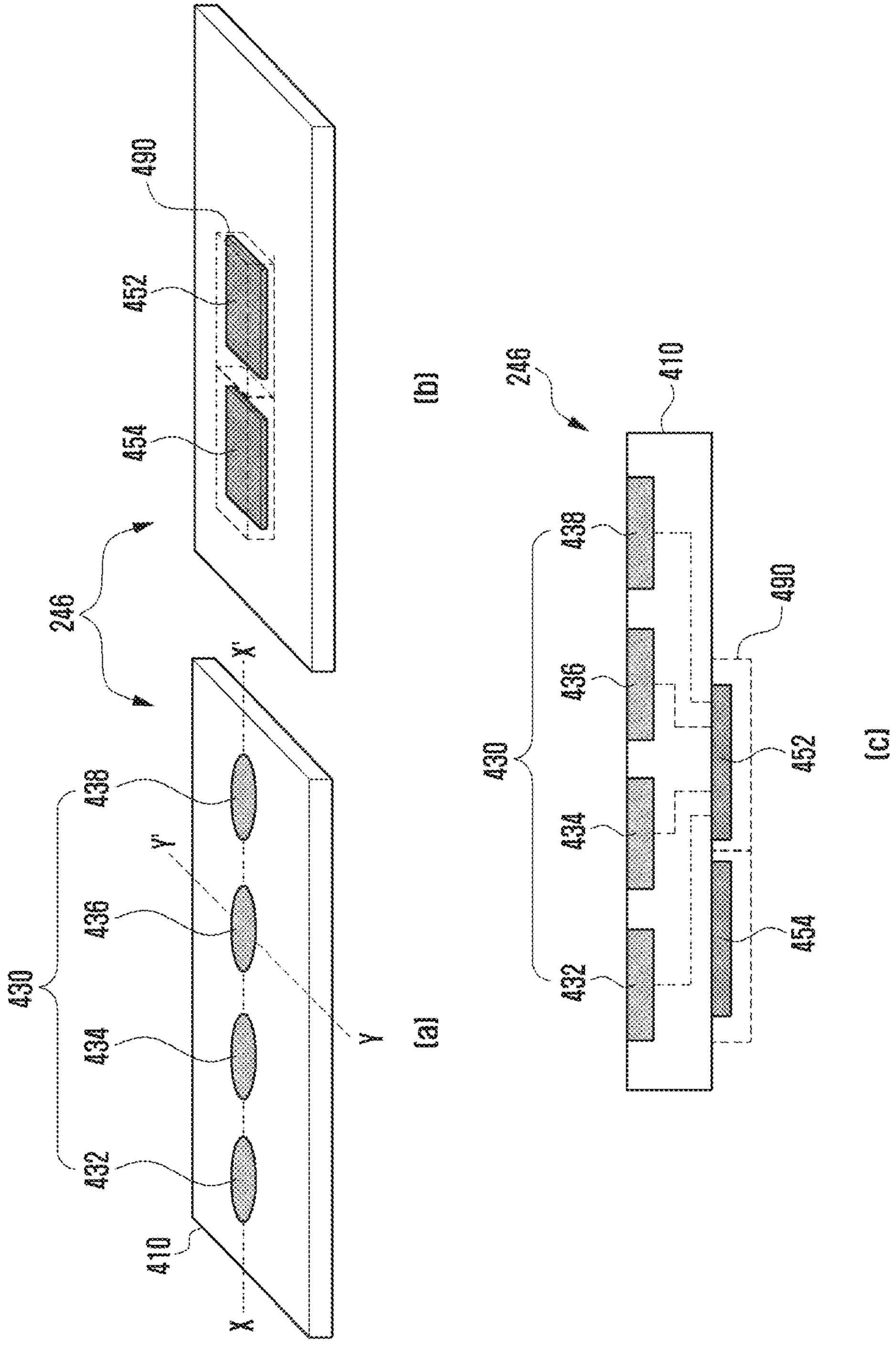
FIG. 4A illustrates the structure of the third antenna module described with reference to FIG. 2 according to an embodiment.

FIG. 4A illustrates the structure of the third antenna module described with reference to FIG. 2, according to an embodiment.

Section (a) of FIG. 4A is a perspective view of the third antenna module 246 viewed from a first side, and section (b) of FIG. 4A is a perspective view of the third antenna module 246 viewed from a second side opposite the first side. Section (c) of FIG. 4A illustrates the third antenna module 246 taken along X-X'.

Referring to section (a) of FIG. 4A, the third antenna module 246 may include a PCB 410, an antenna array 430, an RFIC 452, and a PMIC 454. Optionally, the third antenna module 246 may further include a shield member 490. At least one of the above-mentioned components may be omitted, or at least two of the above-mentioned components may be integrally formed.

The PCB 410 may include a plurality of conductive layers and a plurality of non-conductive layers alternately stacked with the conductive layers. The PCB 410 may provide electrical connections between the PCB 410 and/or various electronic components disposed outside using wires and conductive vias formed on the conductive layer.

The antenna array 430 may include a plurality of antenna elements 432, 434, 436, and 438 (e.g., conductive patches) arranged to form directional beams. The antenna elements 432, 434, 436, or 438 may be formed on the first surface of the PCB 410 as shown. The antenna array 430 may be formed inside the PCB 410. According to some embodiments, the antenna array 430 may include a plurality of antenna arrays (e.g., dipole antenna arrays and/or patch antenna arrays) having the same shape or different shapes and/or different types.

The RFIC 452 may be disposed in another area of the PCB 410 (e.g., the second surface opposite the first surface), which is spaced apart from the antenna array 430. The RFIC 452 is configured to process a signal in a selected frequency band, which is transmitted/received through the antenna array 430. In transmission, the RFIC 452 may convert a baseband signal obtained from a communication processor into an RF signal in a specified band. In reception, the RFIC 452 may convert an RF signal received through the antenna array 430 into a baseband signal and transmit the RF signal to the communication processor.

In transmission, the RFIC 452 may up-convert an IF signal (e.g., about 9 GHz to about 11 GHz) obtained from an intermediate frequency integrated circuit (IFIC) into an RF signal in a selected band. When reception, the RFIC 452 may down-convert an RF signal obtained through the antenna array 430 into an IF signal and transmit the RF signal to the IFIC.

The PMIC 454 may be disposed in the second surface of the PCB 410, which is spaced apart from the antenna array 430. The PMIC 454 may receive a voltage from a main PCB, and provide necessary power to various components on the antenna module.

The shield member 490 may be disposed in the second surface of the PCB 410 to electromagnetically shield at least one of the RFIC 452 and the PMIC 454. The shield member 490 may include a shield can.

The third antenna module 246 may be electrically connected to another PCB (e.g., a main circuit substrate) through a module interface. The module interface may include a connection member such as a coaxial cable connector, a board-to-board connector, an interposer, or a flexible PCB (FPCB). The RFIC 452 and/or the PMIC 454 of the antenna module may be electrically connected to the PCB through the connection member.

Figure 4B:
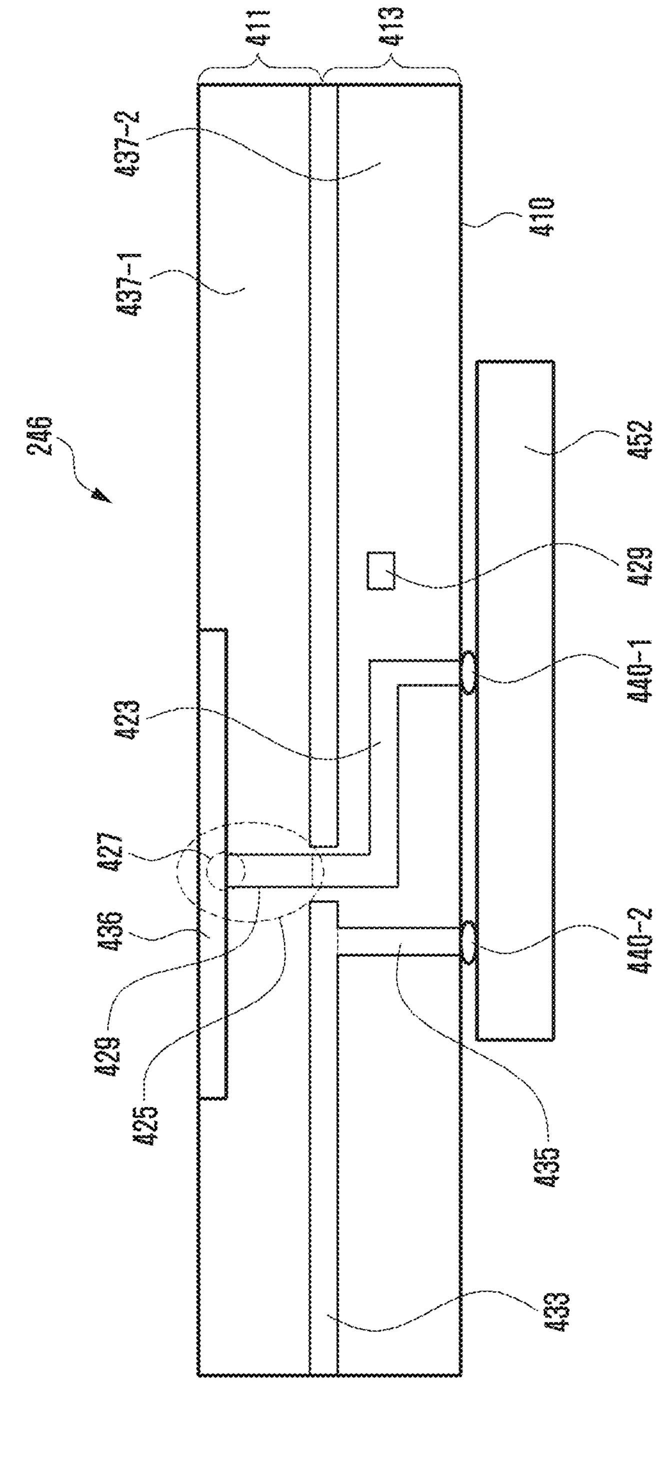
FIG. 4B illustrates the third antenna module taken along Y-Y' in (a) in FIG. 4A according to an embodiment.

FIG. 4B illustrates the third antenna module 246 taken along Y-Y' in section (a) in FIG. 4A, according to an embodiment. The PCB 410 may include an antenna layer 411 and a network layer 413.

Referring to FIG. 4B, the antenna layer 411 may include at least one dielectric layer 437-1, and an antenna element 436 and/or a feeder 425, which is formed inside or on the outer surface of the dielectric layer 437-1. The feeder 425 may include a feed point 427 and/or a feed line 429.

The network layer 413 may include at least one dielectric layer 437-2, and at least one ground layer 433, at least one conductive via 435, a transmission line 423, and/or a signal line 429, which is formed inside or on the outer surface of the dielectric layer 437-2.

The RFIC 452 shown in section (c) of FIG. 4A may be electrically connected to the network layer 413 through first and second solder bumps 440-1 and 440-2. Various connection structures (e.g., solder or ball grid array (BGA)) may be used instead of the solder bumps. The RFIC 452 may be electrically connected to the antenna element 436 through the first solder bump 440-1, the transmission line 423, and the feeder 425, to the ground layer 433 through the second solder bump 440-2 and the conductive via 435, and to the above-mentioned module interface through the signal line 429.

Figure 5:
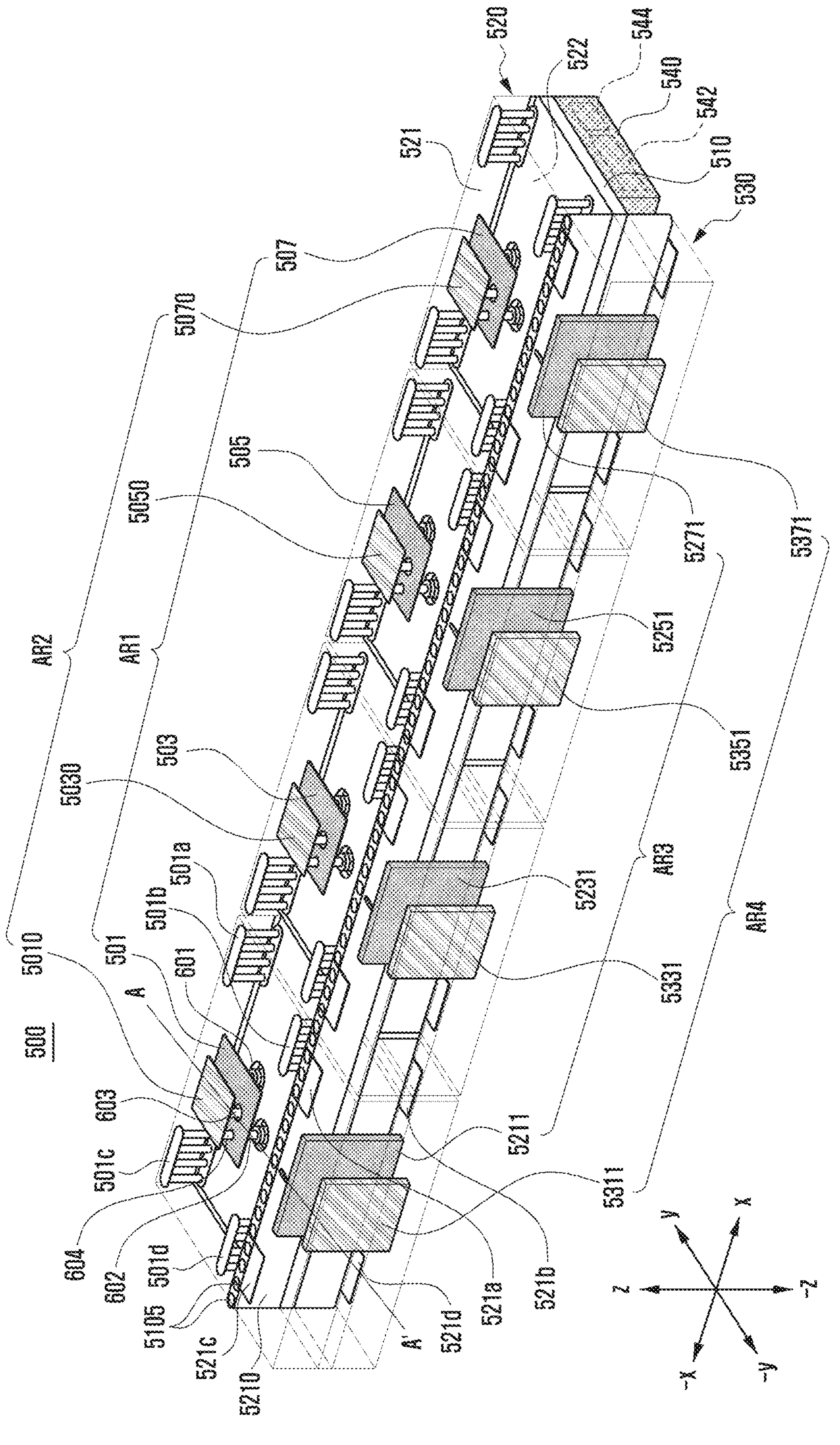
FIG. 5 illustrates an antenna module according to an embodiment.
Figure 6A:
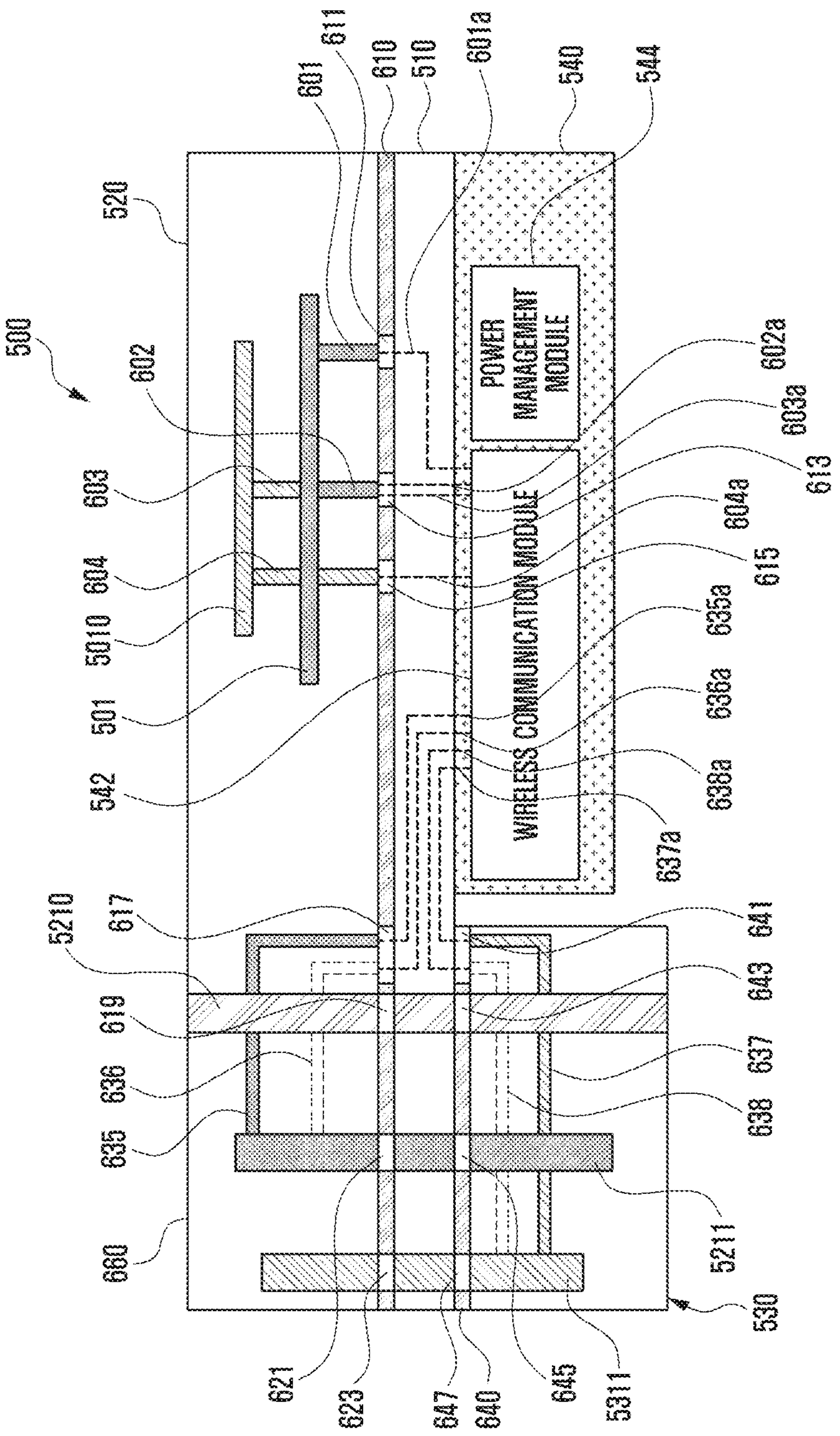
FIG. 6A illustrates the antenna module taken along line A-A' shown in FIG. 5 according to an embodiment.

FIG. 5 illustrates an antenna module according to an embodiment. FIG. 6A illustrates the antenna module taken along line A-A' shown in FIG. 5 according to an embodiment.

The antenna module 500 shown in FIGS. 5 and 6A may include the antenna module 197 shown in FIG. 1, and the third antenna module 246 shown in FIG. 2, 4A, or 4B. The antenna module 500 may be electrically connected to the wireless communication module 192 or the processor 120 shown in FIG. 1 or 2. The antenna module 500 may be provided in the electronic device 101 shown in FIG. 1 or 2 or the electronic device 300 shown in FIGS. 3A to 3C.

At least one antenna module 500 shown in FIGS. 5 and 6A may be disposed inside the housing 310 (e.g., the side member or the side bezel structure) of the electronic device 300 shown in FIG. 3C. The antenna module 500 may be operatively connected to the PCB 340 (e.g., a main board) of the electronic device 300 shown in FIG. 3C using a signal connection member (e.g., an FPCB.

The antenna module 500 shown in FIGS. 5 and 6A may perform 5G mmWave communication using a frequency band in the range of about 3 GHz to 300 GHz.

Referring to FIGS. 5 and 6A, the antenna module 500 may include a first substrate 510, a second substrate 520, a third substrate 530, and/or a shield member 540.

The first substrate 510 may include a first surface (e.g., the top surface) directed in a first direction (e.g., the z-axis direction) and a second surface (e.g., the bottom surface) directed in a second direction (e.g., the −z-axis direction) opposite the first direction. A second substrate 520 may be disposed on the first surface (e.g., the top surface) of the first substrate 510. The third substrate 530 and the shield member 540 may be disposed on the second surface (e.g., the bottom surface) of the first substrate 510. The third substrate 530 may be disposed on the rear surface of the second substrate 520.

The first substrate 510 may include an FPCB and at least one feed line and a logic circuit.

The second substrate 520 may be disposed on the first surface (e.g., the top surface) of the first substrate 510. The second substrate 520 may include a first surface 521 (e.g., the top surface) directed in a first direction (e.g., the z-axis direction) and a second surface 522 (e.g., the bottom surface) directed in a second direction (e.g., the −z-axis direction) opposite the first surface 521.

The second substrate 520 may include a PCB and a plurality of layers. The second substrate 510 may include the PCB 410 shown in FIG. 4A. The second substrate 520 may be formed of a material having higher permittivity than the first substrate 510, such as permittivity of at least 7. The second substrate 520 may be configured as a chip made of a ceramic material. Since the second substrate 520 is formed of a material (e.g., ceramic) having higher permittivity than the first substrate 510, the sizes of the first antenna elements 501, 503, 505, and 507 and/or second antenna elements 5010, 5030, 5050, and 5070 disposed on the second substrate 520 may be reduced.

A first antenna array AR1 including the first antenna elements 501, 503, 505, and 507 may be disposed in an area adjacent to the second surface 522 of the second substrate 520. A second antenna array AR2 including the second antenna elements 5010, 5030, 5050, and 5070 may be disposed in an area adjacent to the first surface 521 of the second substrate 520. The first antenna array AR1 and the second antenna array AR2 may be disposed inside the second substrate 520 so as to be spaced apart from each other. The first antenna array AR1 and the second antenna array AR2 may be operatively connected to the wireless communication module 542 disposed in the shield member 540. The wireless communication module 542 may be configured to transmit and/or receive a radio frequency in the range of about 3 GHz to 300 GHz using the first antenna array AR1 and/or the second antenna array AR2.

The first antenna array AR1 or the second antenna array AR2 may include the antenna array 430 shown in FIG. 4A. The first antenna elements 501, 503, 505, and 507 of the first antenna array AR1 or the second antenna elements 5010, 5030, 5050, and 5070 of the second antenna array AR2 may include a plurality of antenna elements 432, 434, 436, and 438 shown in FIG. 4A.

The first antenna elements 501, 503, 505, and 507 may be disposed at regular intervals in the area adjacent to the second surface 522 of the second substrate 520. The first antenna elements may include a first conductive patch 501, a second conductive patch 503, a third conductive patch 505, and/or a fourth conductive patch 507. The second antenna elements 5010, 5030, 5050, and 5070 may be disposed at regular intervals in the area adjacent to the first surface 521 of the second substrate 520. The second antenna elements may include a fifth conductive patch 5010, a sixth conductive patch 5030, a seventh conductive patch 5050, and/or an eighth conductive patch 5070. The first antenna elements 501, 503, 505, and 507 of the first antenna array AR1 may operate in a lower band area than the second antenna elements 5010, 5030, 5050, and 5070 of the second antenna array AR2. For example, the first antenna elements 501, 503, 505, and 507 of the first antenna array AR1 may operate in a band of about 25 GHz to 30 GHz. The second antenna elements 5010, 5030, 5050, and 5070 of the second antenna array AR2 may operate in a band of about 35 GHz to 40 GHz. The first antenna array AR1 and the second antenna array AR2 may transmit and receive a polarized wave of plus or minus ninety degrees (±90°), respectively.

Although it is described that the second substrate 520 of the antenna module 500 in which the first antenna array AR1 includes four conductive patches and in which the second antenna array AR2 includes four conductive patches, the disclosure is not limited thereto, and each array may include four or more conductive patches.

The first antenna elements 501, 503, 505, and 507 may include substantially the same shape or different shapes and may form directional beams. Each of the first antenna elements 501, 503, 505, and 507 may radiate a dual-polarized wave (e.g., a vertically polarized wave and a horizontally polarized wave) in a predetermined direction of the antenna module 500 through a first feeder 601 and a second feeder 602. For example, the first feeder 601 and the second feeder 602 may support the first conductive patch 501 to transmit and receive radio signals and may electrically connect the first conductive patch 501 and the wireless communication module 542 using a first feed line 601*a* and a second feed line 602*a*. Accordingly, the first conductive patch 501 may act as an antenna radiator to transmit and receive radio signals. The first feeder 601 and the second feeder 602 may include a portion of a conductive pattern formed on the second substrate 520.

The second antenna elements 5010, 5030, 5050, and 5070 may include substantially the same shape or different shapes and may form directional beams. Each of the second antenna elements 5010, 5030, 5050, and 5070 may radiate a dual-polarized wave (e.g., a vertically polarized wave and a horizontally polarized wave) in a predetermined direction of the antenna module 500 through a third feeder 603 and a fourth feeder 604. For example, the third feeder 603 and the fourth feeder 604 may support the fifth conductive patch 5010 to transmit and receive radio signals. The third feeder 603 and the fourth feeder 604 electrically connect the fifth conductive patch 5010 and the wireless communication module 542 using a third feed line 603*a* and a fourth feed line 604*a*. Accordingly, the fifth conductive patch 5010 may act as an antenna radiator to transmit and receive radio signals. The third feeder 603 and the fourth feeder 604 may include a portion of a conductive pattern formed on the second substrate 520.

Each of the first antenna elements 501, 503, 505, and 507 or second antenna elements 5010, 5030, 5050, and 5070 may have at least one ground path (e.g., a first ground path 501*a*, a second ground path 501*b*, a third ground path 501*c*, and/or a fourth ground path 501*d*) disposed adjacent to the corner thereof around the first conductive patch 501 or the fifth conductive patch 5010. For example, the first ground path 501*a* to the fourth ground path 501*d* may be disposed adjacent to four corners of the first conductive patch 501 or the fifth conductive patch 5010. The first ground path 501*a* to the fourth ground path 501*d* may be electrically connected to the ground layer of the second substrate 520 using at least one via. At least one ground path may support the first antenna elements 501, 503, 505, and 507 and/or the second antenna elements 5010, 5030, 5050, and 5070 disposed on the second substrate 520 to have broadband characteristics. At least one ground path may form an indirect ground with the ground layer around each of the first antenna elements 501, 503, 505, and 507 and/or second antenna elements 5010, 5030, 5050, and 5070, thereby expanding the bandwidth without reducing radiation efficiency.

Although an example in which at least one ground path is disposed around the first conductive patch 501 or the fifth conductive patch 5010 has been described above, at least one ground path may also be disposed in each of the second conductive patch 503 or sixth conductive patch 5030, the third conductive patch 505 or seventh conductive patch 5050, and the fourth conductive patch 507 or eighth conductive patch 5070.

At least a portion of the third substrate 530 may be disposed on the second surface of the first substrate 510 or below (e.g., in the −z-axis direction) the second substrate 520. At least a portion of the third substrate 530 may be disposed on one side surface of the shield member 540. The third substrate 530 may include a PCB and a plurality of layers. The third substrate 530 may be formed of a material having higher permittivity than the first substrate 510, such as a permittivity of a least 7. The third substrate 530 may be configured as a chip made of a ceramic material. Since the third substrate 530 is formed of a material (e.g., ceramic) having higher permittivity than the first substrate 510, the sizes of the third antenna elements 5211, 5231, 5251, and 5271 and/or the fourth antenna elements 5311, 5331, 5351, and 5371 may be reduced.

The second substrate 520 and the third substrate 530 may be integrally formed of a ceramic material and may be coupled to the first substrate 510 using a chip bonding method. The second substrate 520 and the third substrate 530 may be formed of a ceramic material to be separate from each other, and may be coupled to the first substrate 510 using a chip bonding method, respectively.

A ground layer 5210 may be disposed in a portion of the second substrate 520 and in a portion of the third substrate 530. At least one first via 5105 may be formed in the ground layer 5210. The third substrate 530 may include a third antenna array AR3 disposed to be spaced apart in an area adjacent to one side surface of the ground layer 5210. The third antenna array AR3 may include third antenna elements 5211, 5231, 5251, and 5271. The third substrate 530 may include a fourth antenna array AR4 disposed to be spaced apart from the third antenna array AR3. The fourth antenna array AR4 may include fourth antenna elements 5311, 5331, 5351, and 5371. The third antenna array AR3 including the third antenna elements 5211, 5231, 5251, and 5271 and the fourth antenna array AR4 including the fourth antenna elements 5311, 5331, 5351, and 5371 may be disposed inside the second substrate 520 and/or inside the third substrate 530 so as to be spaced apart from each other. The third antenna array AR3 and the fourth antenna array AR4 may be operatively connected to the wireless communication module 542 disposed in the shield member 540. The wireless communication module 542 may be configured to transmit and/or receive a radio frequency in the range of about 3 GHz to 300 GHz using the third antenna array AR3 and/or the fourth antenna array AR4.

The third antenna array AR3 or the fourth antenna array AR4 may include the antenna array 430 shown in FIG. 4A. The third antenna elements 5211, 5231, 5251, and 5271 of the third antenna array AR3 or the fourth antenna elements 5311, 5331, 5351, and 5371 of the fourth antenna array AR4 may include the plurality of antenna elements 432, 434, 436, and 438 shown in FIG. 4A.

The third antenna elements 5211, 5231, 5251, and 5271 may be spaced apart from the ground layer 5210 disposed inside the second substrate 520 and/or third substrate 530 and may be disposed at regular intervals. The third antenna elements may include a ninth conductive patch 5211, a tenth conductive patch 5231, an eleventh conductive patch 5251, and/or a twelfth conductive patch 5271. The fourth antenna elements 5311, 5331, 5351, and 5371 may be spaced apart from the third antenna elements 5211, 5231, 5251, and 5271, and may be disposed at regular intervals. The fourth antenna elements may include a thirteenth conductive patch 5311, a fourteenth conductive patch 5331, a fifteenth conductive patch 5351, and/or a sixteenth conductive patch 5371. The third antenna elements 5211, 5231, 5251, and 5271 of the third antenna array AR3 may operate in a lower band area than the fourth antenna elements 5311, 5331, 5351, and 5371 of the fourth antenna array AR4, such as about 25 GHz to 30 GHz. The fourth antenna elements 5311, 5331, 5351, and 5371 of the fourth antenna array AR4 may operate in a band of about 35 GHz to 40 GHz. The third antenna array AR3 and the fourth antenna array AR4 may transmit and receive a polarized wave of plus or minus forty-five degrees (±45°), respectively.

Although it has been described that the third antenna array AR3 includes four conductive patches and the fourth antenna array AR4 includes four conductive patches in the second substrate 520 and/or the third substrate 530 of the antenna module 500, the disclosure is not limited thereto, and each array may include four or more conductive patches.

The third antenna elements 5211, 5231, 5251, and 5271 may include substantially the same shape or different shapes. The third antenna elements 5211, 5231, 5251, and 5271 may form directional beams. Each of the third antenna elements 5211, 5231, 5251, and 5271 may radiate a dual-polarized wave (e.g., a vertically polarized wave and a horizontally polarized wave) in a predetermined direction of the antenna module 500 through a fifth feeder 635 and a sixth feeder 636. For example, the fifth feeder 635 and the sixth feeder 636 may support the ninth conductive patch 5211 to transmit and receive radio signals. The fifth feeder 635 and the sixth feeder 636 may electrically connect the ninth conductive patch 5211 and the wireless communication module 542 using a fifth feed line 635*a* and a sixth feed line 636*a*. Accordingly, the ninth conductive patch 5211 may act as an antenna radiator to transmit and receive radio signals. The fifth feeder 635*a* and the sixth feeder 636*a* may include a portion of a conductive pattern formed on the third substrate 530.

The fourth antenna elements 5311, 5331, 5351, and 5371 may include substantially the same shape or different shapes and may form directional beams. Each of the fourth antenna elements 5311, 5331, 5351, and 5371 may radiate a dual-polarized wave (e.g., a vertically polarized wave and a horizontally polarized wave) in a predetermined direction of the antenna module 500 through a seventh feeder 637 and an eighth feeder 638. For example, the seventh feeder 637 and the eighth feeder 638 may support the thirteenth conductive patch 5311 to transmit and receive radio signals. The seventh feeder 637 and the eighth feeder 638 may electrically connect the thirteenth conductive patch 5311 and the wireless communication module 542 using a seventh feed line 637*a* and an eighth feed line 638*a*. Accordingly, the thirteenth conductive patch 5311 may act as an antenna radiator to transmit and receive radio signals. The seventh feeder 637 and the eighth feeder 638 may include a portion of a conductive pattern formed on the third substrate 530.

At least one ground plate (e.g., a first ground plate 521*a*, a second ground plate 521*b*, a third ground plate 521*c*, and/or a fourth ground plate 521*d*) may be disposed adjacent to the corner of each of the third antenna elements 5211, 5231, 5251, and 5271 or fourth antenna elements 5311, 5331, 5351, and 5371. At least one ground plate may be disposed around the ninth conductive patch 5211 or the thirteenth conductive patch 5311. For example, the first ground plate 521*a* to the fourth ground plate 521*d* may be disposed adjacent to four corners of the ninth conductive patch 5211 or the thirteenth conductive patch 5311 and may be electrically connected to the ground layer 5210. At least one ground plate may support the third antenna elements 5211, 5231, 5251, and 5271 or the fourth antenna elements 5311, 5331, 5351, and 5371 disposed in a portion of the second substrate 520 and/or in a portion of the third substrate 530 so as to have broadband characteristics. At least one ground plate may form a ground with the ground layer 5210 around each of the third antenna elements 5211, 5231, 5251, and 5271 and/or fourth antenna elements 5311, 5331, 5351, and 5371, thereby expanding the bandwidth without reducing radiation efficiency.

Although an example in which at least one ground plate is disposed around the ninth conductive patch 5211 or the thirteenth conductive patch 5311 has been described above, at least one ground plate may also be disposed in each of the tenth conductive patch 5231 or fourteenth conductive patch 5331, the eleventh conductive patch 5251 or fifteenth conductive patch 5351, and the twelfth conductive patch 5271 or sixteenth conductive patch 5371, respectively.

The shield member 540 may include a wireless communication module 542 and a power management module 544. The wireless communication module 542 and the power management module 544 may be surrounded by the shield member 540. The shield member 540 may be disposed on the second surface (e.g., the bottom surface) of the first substrate 510 to electromagnetically shield the wireless communication module 542 and the power management module 544. The shield member 540 may include a conductive molding member or shield can.

The wireless communication module 542 may be configured to process a signal in a frequency band to be transmitted and/or received through the first antenna array AR1, the second antenna array AR2, the third antenna array AR3, and/or the fourth antenna array AR4, respectively. For example, is transmission, the wireless communication module 542 may convert a baseband signal obtained from a processor into an RF signal in a specified band. In reception, the wireless communication module 542 may convert an RF signal received through the first antenna array AR1, the second antenna array AR2, the third antenna array AR3, and/or the fourth antenna array AR4 into a baseband signal and transmit the same to the processor. The wireless communication module 542 may be electrically connected to the first antenna array AR1, the antenna array AR2, the third antenna array AR3, and/or the fourth antenna array AR4 using the first feed line 601*a* to the eighth feed line 638*a* and the first feeder 601 to the eighth feeder 638.

The wireless communication module 542 may transmit and/or receive a dual-polarized wave using the first antenna elements 501, 503, 505, and 507, the second antenna elements 5010, 5030, 5050, and 5070, the third antenna elements 5211, 5231, 5251, and 5271, and/or the fourth antenna elements 5311, 5331, 5351, and 5371.

The wireless communication module 542 may include an RFIC 452, an IFIC, and/or a CP.

The power management module 544 may receive a voltage from a PCB, and provide necessary power to various elements on the antenna module 500.

Referring to FIG. 6A, the antenna module 500 may include a first filling layer 610 disposed on the first surface (e.g., the top surface) of the first substrate 510 and a second filling layer 640 partially disposed on the second surface (e.g., the bottom surface) of the first substrate 510. A portion of the first filling layer 610 may be disposed between the first substrate 510 and the second substrate 520. The second filling layer 640 may be disposed inside and/or on one surface of the third substrate 530.

The first filling layer 610 may include a first solder 611, a second solder 613, a third solder 615, a fourth solder 617, a fifth solder 619, a sixth solder 621, and/or a seventh solder 623. The second filling layer 640 may include an eighth solder 641, a ninth solder 643, a tenth solder 645, and/or an eleventh solder 647.

The first solder 611 may connect the first feeder 601 of the first conductive patch 501 with the first substrate 510. The first feeder 601 of the first conductive patch 501 may be electrically connected to the wireless communication module 542 using the first solder 611 and the first feed line 601*a*. The second solder 613 may connect the second feeder 602 of the first conductive patch 501 and the third feeder 603 of the fifth conductive patch 5010 with the first substrate 510. The second feeder 602 of the first conductive patch 501 and the third feeder 603 of the fifth conductive patch 5010 may be electrically connected to the wireless communication module 542 using the second feed line 602*a* and the third feed line 603*a*. The third solder 615 may connect the fourth feeder 604 of the fifth conductive patch 5010 with the first substrate 510. The fourth feeder 604 of the fifth conductive patch 5010 may be electrically connected to the wireless communication module 542 using the third solder 615 and the fourth feed line 604*a*. The fourth solder 617 may connect the fifth feeder 635 and the sixth feeder 636 of the ninth conductive patch 5211 with the first substrate 510. The fifth feeder 635 and the sixth feeder 636 of the ninth conductive patch 5211 may pass through the ground layer 5210 to be electrically connected to the wireless communication module 542 using the fifth feed line 635*a* and the sixth feed line 636*a*.

The fifth solder 619 may connect a portion of the ground layer 5210 with the first substrate 510 and the second substrate 520. The sixth solder 621 may connect a portion of the ninth conductive patch 5211 with the second substrate 520. The seventh solder 623 may connect a portion of the thirteenth conductive patch 5311 with the second substrate 520.

The eighth solder 641 of the second filling layer 640 may connect the seventh feeder 637 and the eighth feeder 638 of the thirteenth conductive patch 5311 with the first substrate 510. The seventh feeder 637 and the eighth feeder 638 of the thirteenth conductive patch 5311 may pass through the ninth conductive patch 5211 and the ground layer 5210 to be electrically connected to the wireless communication module 542 using the seventh feed line 637*a* and the eighth feed line 638*a*. The ninth solder 643 may connect a portion of the ground layer 5210 with the third substrate 530. The tenth solder 645 may connect a portion of the ninth conductive patch 5211 with the third substrate 530. The eleventh solder 647 may connect a portion of the thirteenth conductive patch 5311 with the third substrate 530.

The first solder 611 to the eleventh solder 647 may be mounted or disposed on the first filling layer 610 and the second filling layer 640 using a surface mounted device (SMD). The second substrate 520 may be connected to the first substrate 510 using at least one solder. The second substrate 520 may include a rigid body and may be coupled to the first substrate 510 in a chip manner. The third substrate 530 may be connected to the first substrate 510 using at least one solder, the fifth feeder 635, the sixth feeder 636, the seventh feeder 637, and/or the eighth feeder 638. The third substrate 530 may include a rigid body. The third substrate

530 may be coupled to the first substrate 510 and/or the second substrate 520 in a chip manner.

Figure 6B:
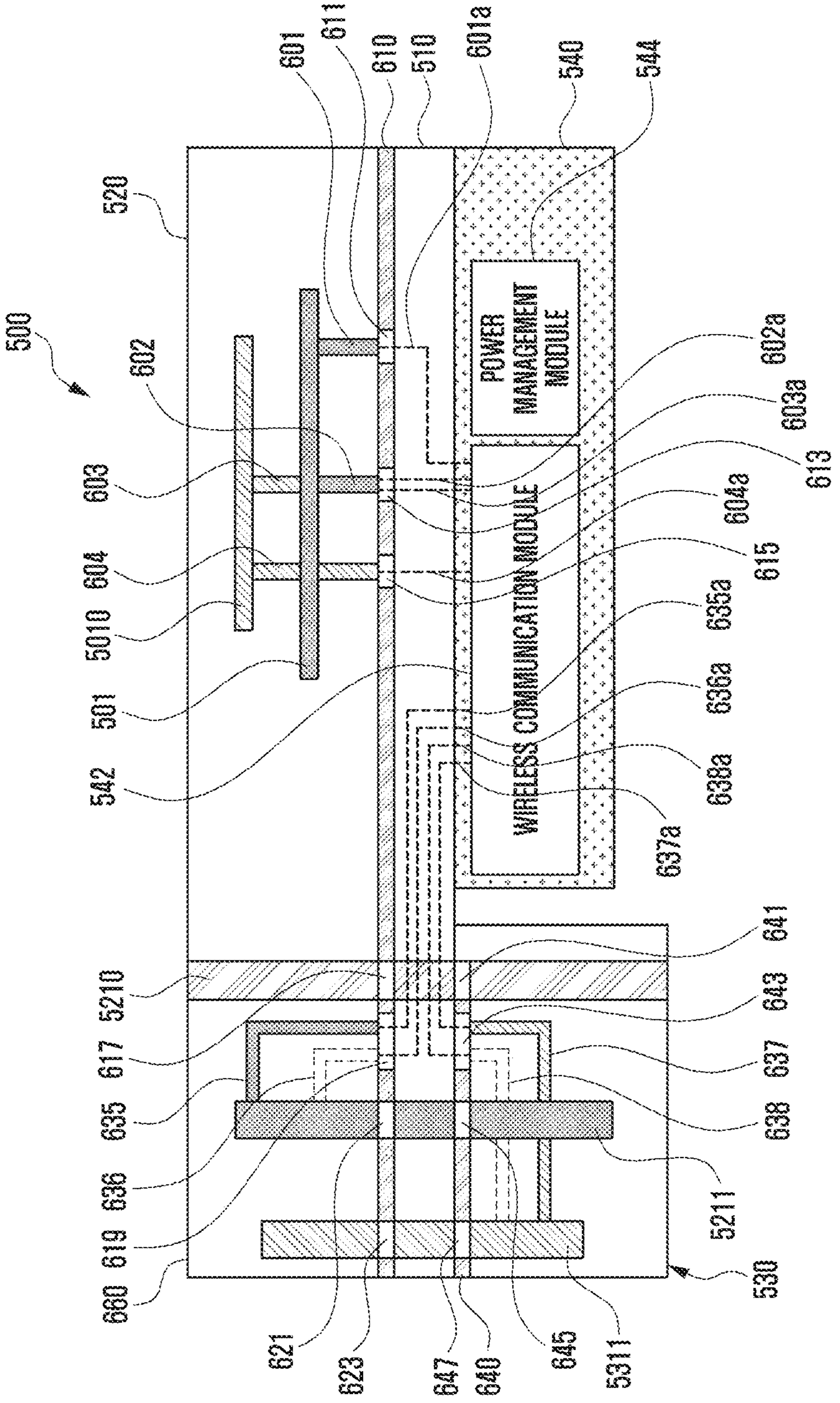
FIG. 6B illustrates the antenna module taken along line A-A' shown in FIG. 5 according to an embodiment.

FIG. 6B illustrates a feeding method for the antenna module taken along line A-A' shown in FIG. 5 according to an embodiment.

Referring to FIG. 6B, the antenna module 500 may include a first filling layer 610 disposed on the first surface (e.g., the top surface) of the first substrate 510 and a second filling layer 640 partially disposed on the second surface (e.g., the bottom surface) of the first substrate 510. A portion of the first filling layer 610 may be disposed between the first substrate 510 and the second substrate 520. The second filling layer 640 may be disposed inside or on one surface of the third substrate 530.

The first filling layer 610 may include a first solder 611, a second solder 613, a third solder 615, a fourth solder 617, a fifth solder 619, a sixth solder 621, and/or a seventh solder 623. The second filling layer 640 may include an eighth solder 641, a ninth solder 643, a tenth solder 645, and/or an eleventh solder 647.

The first solder 611 may connect the first feeder 601 of the first conductive patch 501 with the first substrate 510. The first feeder 601 of the first conductive patch 501 may be electrically connected to the wireless communication module 542 using the first solder 611 and the first feed line 601*a*. The second solder 613 may connect the second feeder 602 of the first conductive patch 501 and the third feeder 603 of the fifth conductive patch 5010 with the first substrate 510. The second feeder 602 of the first conductive patch 501 and the third feeder 603 of the fifth conductive patch 5010 may be electrically connected to the wireless communication module 542 using the second solder 613, the second feed line 602*a*, and the third feed line 603*a*. The third solder 615 may connect the fourth feeder 604 of the fifth conductive patch 5010 with the first substrate 510. The fourth feeder 604 of the fifth conductive patch 5010 may be electrically connected to the wireless communication module 542 using the third solder 615 and the fourth feed line 604*a*.

The fourth solder 617 may connect a portion of the ground layer 5210 with the first substrate 510 and/or the second substrate 520. The fifth solder 619 may connect the fifth feeder 635 and the sixth feeder 636 of the ninth conductive patch 5211 with the first substrate 510. The fifth feeder 635 and the sixth feeder 636 of the ninth conductive patch 5211 may be electrically connected to the wireless communication module 542 using the fifth feed line 635*a* and the sixth feed line 636*a*, which pass through the ground layer 5210. The sixth solder 621 may connect a portion of the ninth conductive patch 5211 with the second substrate 520. The seventh solder 623 may connect a portion of the thirteenth conductive patch 5311 with the second substrate 520.

The eighth solder 641 of the second filling layer 640 may connect a portion of the ground layer 5210 with the first substrate 510 and/or the third substrate 530. The ninth solder 643 may connect the seventh feeder 637 and the eighth feeder 638 of the thirteenth conductive patch 5311 with the first substrate 510. The seventh feeder 637 and the eighth feeder 638 of the thirteenth conductive patch 5311 may pass through the ninth conductive patch 5211 and may be electrically connected to the wireless communication module 542 using the seventh feed line 637*a* and the eighth feed line 638*a*, which pass through the ground layer 5210. The tenth solder 645 may connect a portion of the ninth conductive patch 5211 with the third substrate 530. The eleventh solder 647 may connect a portion of the thirteenth conductive patch 5311 with the third substrate 530.

Figure 6C:
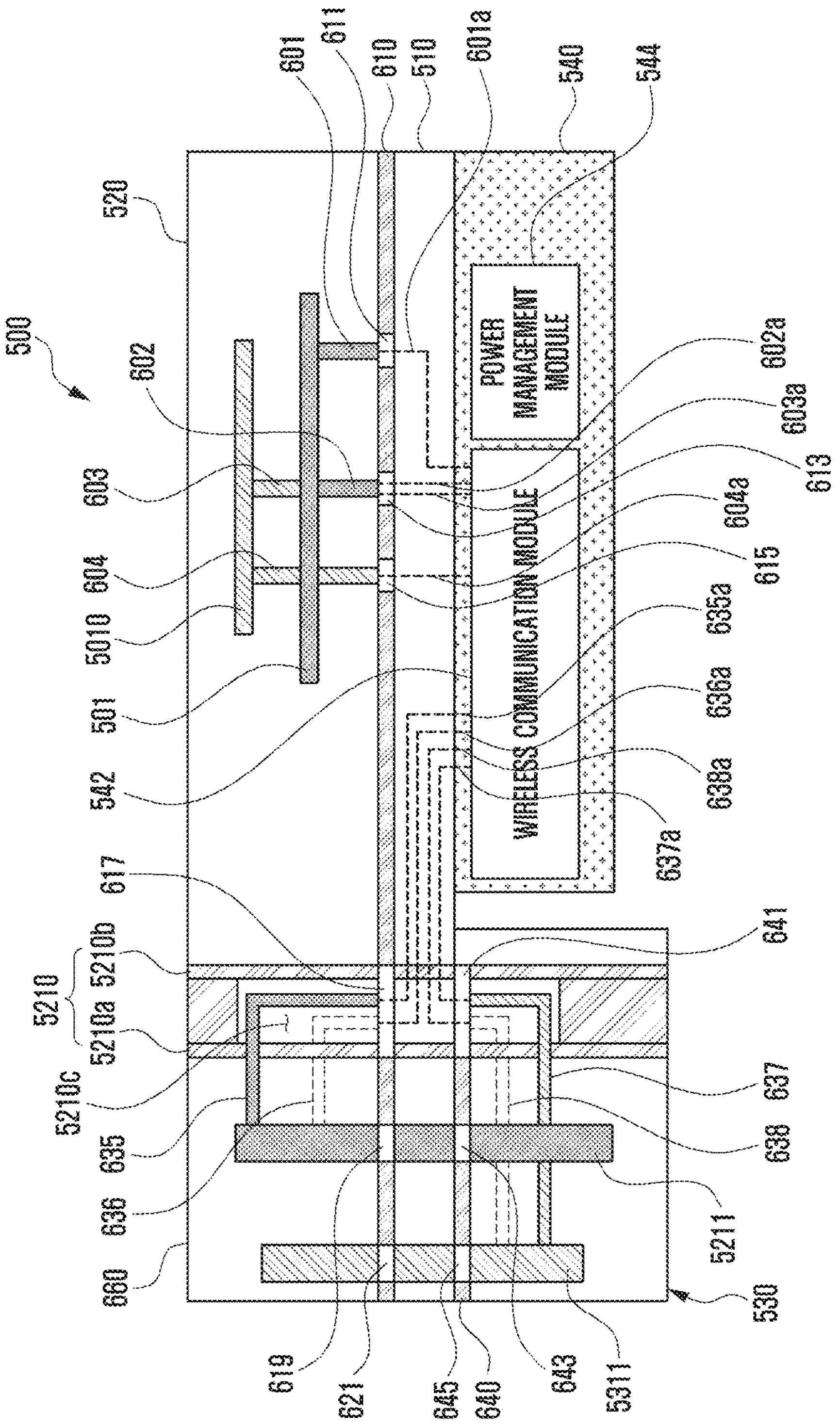
FIG. 6C illustrates a feeding method of the antenna module taken along line A-A' shown in FIG. 5 according to an embodiment.

FIG. 6C illustrates a feeding method for the antenna module taken along line A-A' shown in FIG. 5 according to an embodiment.

In FIG. 6C, the ground layer 5210 may be divided into a first ground layer 5210*a* and a second ground layer 5210*b*. A space 5210*c* may be formed between the first ground layer 5210*a* and the second ground layer 5210*b*. In FIG. 6C, feeding may be performed in a space 5210*c* formed between the first ground layer 5210*a* and the second ground layer 5210*b*.

Referring to FIG. 6C, the antenna module 500 may include a first filling layer 610 disposed on the first surface (e.g., the top surface) of the first substrate 510 and a second filling layer 640 partially disposed on the second surface (e.g., the bottom surface) of the first substrate 510. A portion of the first filling layer 610 may be disposed between the first substrate 510 and the second substrate 520. The second filling layer 640 may be disposed inside the third substrate 530 and/or on one surface thereof.

The first filling layer 610 may include a first solder 611, a second solder 613, a third solder 615, a fourth solder 617, a fifth solder 619, and/or a sixth solder 621. The second filling layer 640 may include an eighth solder 641, a ninth solder 643, and/or a tenth solder 645.

The first solder 611 may connect the first feeder 601 of the first conductive patch 501 with the first substrate 510. The first feeder 601 of the first conductive patch 501 may be electrically connected to the wireless communication module 542 using the first solder 611 and the first feed line 601*a*. The second solder 613 may connect the second feeder 602 of the first conductive patch 501 and the third feeder 603 of the fifth conductive patch 5010 with the first substrate 510. The second feeder 602 of the first conductive patch 501 and the third feeder 603 of the fifth conductive patch 5010 may be electrically connected to the wireless communication module 542 using the second solder 613, the second feed line 602*a*, and the third feed line 603*a*. The third solder 615 may connect the fourth feeder 604 of the fifth conductive patch 5010 with the first substrate 510. The fourth feeder 604 of the fifth conductive patch 5010 may be electrically connected to the wireless communication module 542 using the third solder 615 and the fourth feed line 604*a*.

The ground layer 5210 shown in FIG. 6C may be divided into a first ground layer 5210*a* and a second ground layer 5210*b*, and upper ends and lower ends thereof may be closed. A feed space 5210*c* may be formed between the first ground layer 5210*a* and the second ground layer 5210*b*.

The fourth solder 617 may be disposed in a portion of the feed space 5210*c* formed in the ground layer 5210. The fourth solder 617 may connect the fifth feeder 635 and the sixth feeder 636 of the ninth conductive patch 5211 with the first substrate 510. The fifth feeder 635 and the sixth feeder 636 of the ninth conductive patch 5211 may pass through the first ground layer 5210*a* to be electrically connected to the wireless communication module 542 using the fifth feed line 635*a* and the sixth feed line 636*a*. The fifth solder 619 may connect a portion of the ninth conductive patch 5211 with the second substrate 520. The sixth solder 621 may connect a portion of the thirteenth conductive patch 5311 with the second substrate 520.

The eighth solder 641 of the second filling layer 640 may be disposed in a portion of the feed space 5210*c* formed in the ground layer 5210. The feed space 5210*c* may be configured in a form similar to a coaxial cable. The feed space 5210*c* may have a cylindrical shape using the first ground layer 5210*a* and the second ground layer 5210*b*. The ground layer 5210 may have a cylindrical shape using the first ground layer 5210*a*, the feed space 5210*c*, and the second ground layer 5210*b*. At least a portion of the fifth feeder 635 may be disposed in the feed space 5210*c*. The eighth solder 641 may connect the seventh feeder 637 and the eighth feeder 638 of the thirteenth conductive patch 5311 with the first substrate 510. The seventh feeder 637 and the eighth feeder 638 of the thirteenth conductive patch 5311 may pass through the ninth conductive patch 5211. The seventh feeder 637 and the eighth feeder 638 of the thirteenth conductive patch 5311 may pass through the first ground layer 5210*a* to be electrically connected to the wireless communication module 542 using the seventh feed line 637*a* and the eighth feed line 638*a*. The ninth solder 643 may connect a portion of the ninth conductive patch 5211 with the third substrate 530. The tenth solder 645 may connect a portion of the thirteenth conductive patch 5311 with the third substrate 530.

Figure 6D:
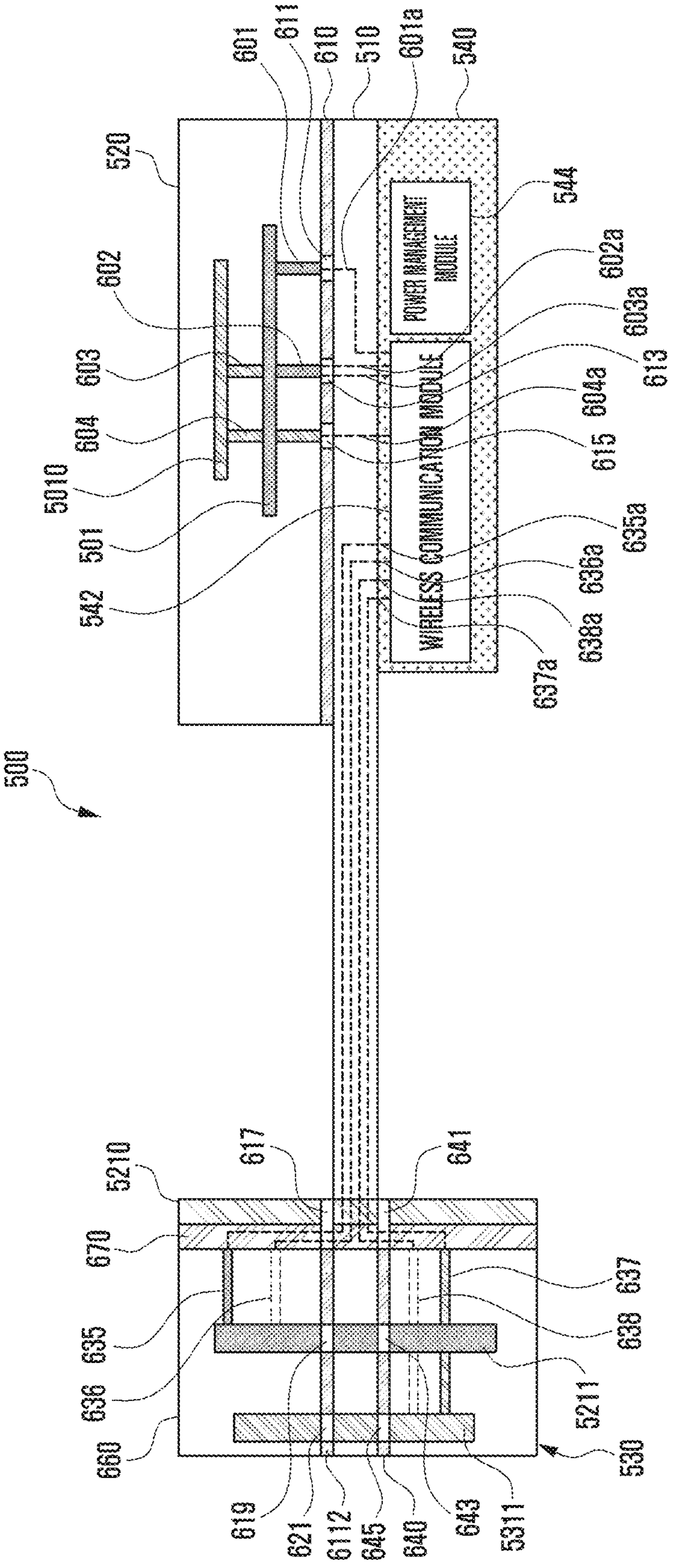
FIG. 6D illustrates substrates of the antenna module taken along line A-A' shown in FIG. 5 according to an embodiment.

FIG. 6D illustrates substrates of the antenna module taken along line A-A' shown in FIG. 5 according to an embodiment.

The antenna module 500 shown in FIG. 6D may exclude a portion of the second substrate 520, which be spaced apart from the fourth substrate 660 and disposed on the first surface of the first substrate 510. In the antenna module 500 shown in FIG. 6D, a fourth substrate 660 may be disposed on the third substrate 530. In the antenna module 500 shown in FIG. 6D, a wiring pattern layer 670 may be disposed on one side surface of the ground layer 5210.

Referring to FIG. 6D, the antenna module 500 may include a first filling layer 610 disposed on the first surface (e.g., the top surface) of the first substrate 510, a second filling layer 640 partially disposed on the second surface (e.g., the bottom surface) of the first substrate 510, and a third filling layer 6112 partially disposed on the first surface (e.g., the top surface) of the first substrate 510 and spaced apart from the first filling layer 610. The first filling layer 610 may be disposed between the first substrate 510 and the second substrate 520. The second filling layer 640 may be disposed inside the third substrate 530 and/or on one surface thereof. The third filling layer 6112 may be disposed inside or on one surface of the fourth substrate 660.

The first filling layer 610 may include a first solder 611, a second solder 613, and/or a third solder 615. The second filling layer 640 may include an eighth solder 641, a ninth solder 643, and/or a tenth solder 645. The third filling layer 6112 may include a fourth solder 617, a fifth solder 619, and/or a sixth solder 621.

The first solder 611 may connect the first feeder 601 of the first conductive patch 501 with the first substrate 510. The first feeder 601 of the first conductive patch 501 may be electrically connected to the wireless communication module 542 using the first solder 611 and the first feed line 601*a*. The second solder 613 may connect the second feeder 602 of the first conductive patch 501 and the third feeder 603 of the fifth conductive patch 5010 with the first substrate 510. The second feeder 602 of the first conductive patch 501 and the third feeder 603 of the fifth conductive patch 5010 may be electrically connected to the wireless communication module 542 using the second solder 613, the second feed line 602*a*, and the third feed line 603*a*. The third solder 615 may connect the fourth feeder 604 of the fifth conductive patch 5010 with the first substrate 510. The fourth feeder 604 of the fifth conductive patch 5010 may be electrically connected to the wireless communication module 542 using the third solder 615 and the fourth feed line 604*a*.

The second substrate 520 may be disposed to be spaced apart from the third substrate 530 and the fourth substrate 660. A wiring pattern layer 670 may be disposed on one side surface (e.g., a rear surface) of the ground layer 5210 disposed in a portion of the third substrate 530 and in a portion of the fourth substrate 660.

The fourth solder 617 disposed on the fourth substrate 660 may be disposed in a portion of the wiring pattern layer 670 and in a portion of the ground layer 5210. The fourth solder 617 may connect the fifth feeder 635 and the sixth feeder 636 of the ninth conductive patch 5211 with the first substrate 510. The fifth feeder 635 and the sixth feeder 636 of the ninth conductive patch 5211 may pass through the ground layer 5210 to be electrically connected to the wireless communication module 542 using the fifth feed line 635*a* and the sixth feed line 636*a*. The fifth solder 619 may connect a portion of the ninth conductive patch 5211 with the fourth substrate 660. The sixth solder 621 may connect a portion of the thirteenth conductive patch 5311 with the fourth substrate 660.

The eighth solder 641 of the second filling layer 640 may be disposed in a portion of the wiring pattern layer 670 and in a portion of the ground layer 5210. The eighth solder 641 may connect the seventh feeder 637 and the eighth feeder 638 of the thirteenth conductive patch 5311 with the first substrate 510. The seventh feeder 637 and the eighth feeder 638 of the thirteenth conductive patch 5311 may pass through the ninth conductive patch 5211 and through the ground layer 5210 to be electrically connected to the wireless communication module 542 using the seventh feed line 637*a* and the eighth feed line 638*a*. The ninth solder 643 may connect a portion of the ninth conductive patch 5211 with the third substrate 530. The tenth solder 645 may connect a portion of the thirteenth conductive patch 5311 with the third substrate 530.

Figure 6E:
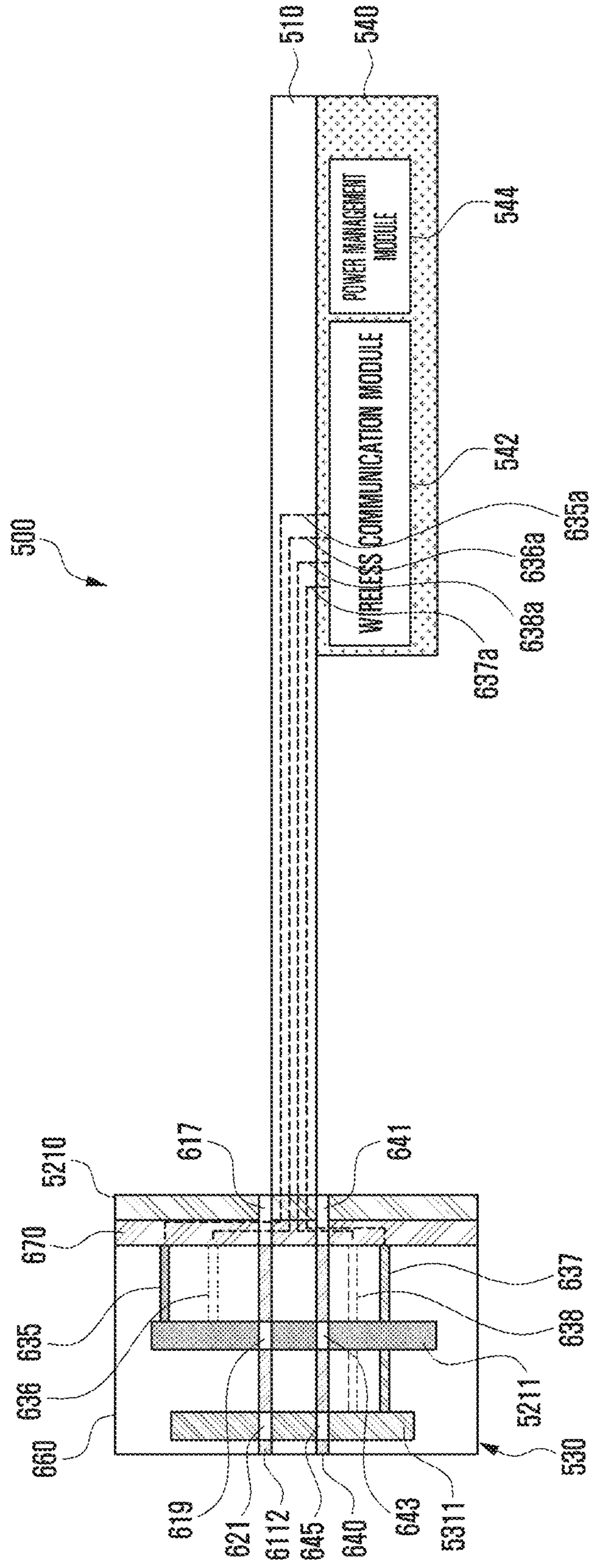
FIG. 6E illustrates substrates of the antenna module taken along line A-A' shown in FIG. 5 according to an embodiment.

FIG. 6E illustrates substrates of the antenna module taken along line A-A' shown in FIG. 5 according to an embodiment.

Referring to FIG. 6E, an antenna module 500 may exclude the first filling layer 610 and the second substrate 520 from the embodiment shown in FIG. 6D.

The antenna module 500 may include a second filling layer 640 partially disposed on the second surface (e.g., the bottom surface) of the first substrate 510 and a third filling layer 6112 partially disposed on the first surface (e.g., the top surface) of the first substrate 510. The third filling layer 6112 may be disposed inside the fourth substrate 660, and the second filling layer 640 may be disposed inside the third substrate 530.

The second filling layer 640 may include an eighth solder 641, a ninth solder 643, and/or a tenth solder 645. The third filling layer 6112 may include a fourth solder 617, a fifth solder 619, and/or a sixth solder 621.

The fourth solder 617 disposed on the fourth substrate 660 may be disposed in a portion of the wiring pattern layer 670 and in a portion of the ground layer 5210. The fourth solder 617 may connect the fifth feeder 635 and the sixth feeder 636 of the ninth conductive patch 5211 with the first substrate 510. The fifth feeder 635 and the sixth feeder 636 of the ninth conductive patch 5211 may pass through the ground layer 5210 to be electrically connected to the wireless communication module 542 using the fifth feed line 635*a* and the sixth feed line 636*a*. The fifth solder 619 may connect a portion of the ninth conductive patch 5211 with the fourth substrate 660. The sixth solder 621 may connect a portion of the thirteenth conductive patch 5311 with the fourth substrate 660.

The eighth solder 641 of the second filling layer 640 may be disposed in a portion of the wiring pattern layer 670 and in a portion of the ground layer 5210. The eighth solder 641 may connect the seventh feeder 637 and the eighth feeder 638 of the thirteenth conductive patch 5311 with the first substrate 510. The seventh feeder 637 and the eighth feeder 638 of the thirteenth conductive patch 5311 may pass through the ninth conductive patch 5211 and through the ground layer 5210 to be electrically connected to the wireless communication module 542 using the seventh feed line 637*a* and the eighth feed line 638*a*. The ninth solder 643 may connect a portion of the ninth conductive patch 5211 with the third substrate 530. The tenth solder 645 may connect a portion of the thirteenth conductive patch 5311 with the third substrate 530.

Figure 6F:
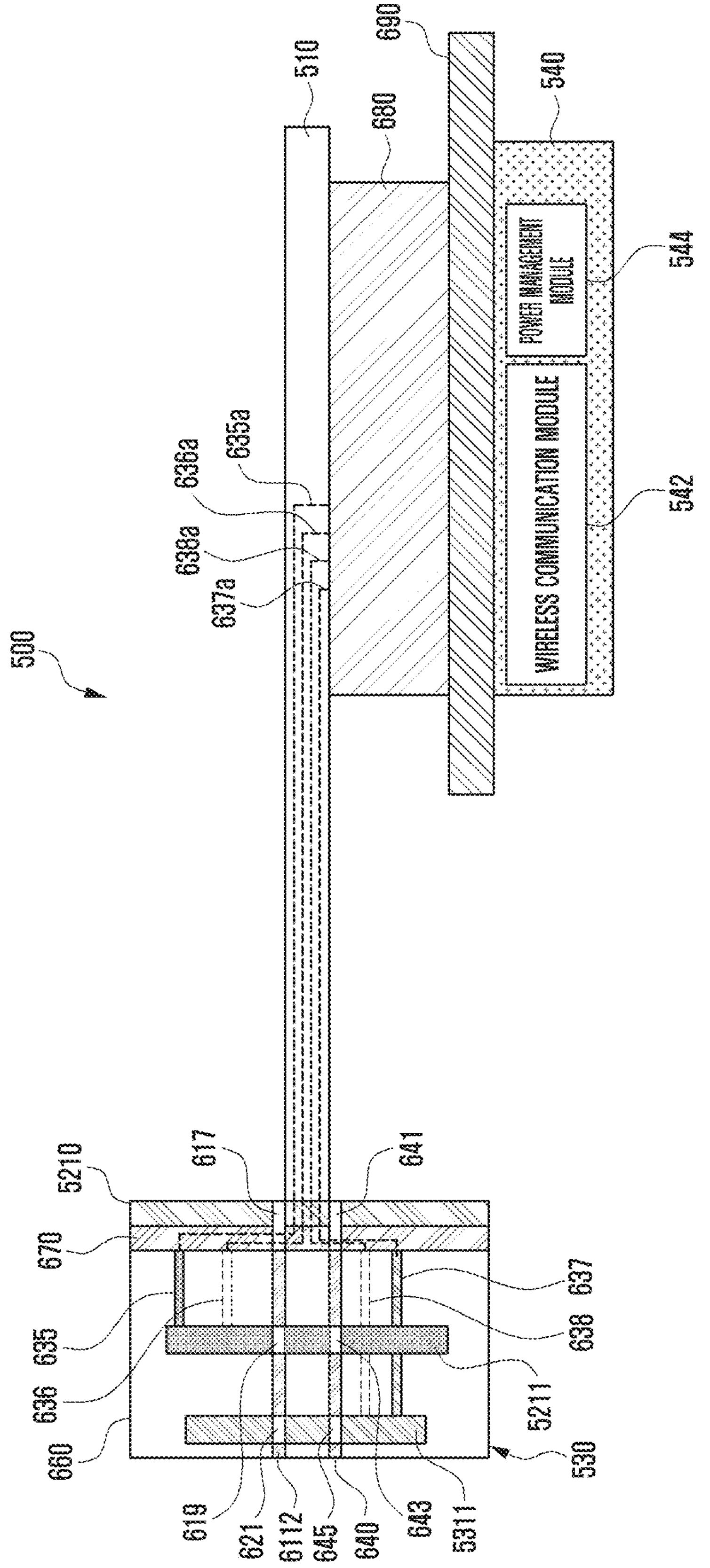
FIG. 6F illustrates the antenna module shown as the cross-sectional view in FIG. 6E according to an embodiment.

FIG. 6F illustrates the antenna module shown as the cross-sectional view in FIG. 6E according to an embodiment.

Referring to FIG. 6F, in an antenna module 500, a fifth substrate 690 may be disposed on the second surface (e.g., the bottom surface) of the first substrate 510. The first substrate 510 and the fifth substrate 690 may be electrically connected using a connector 680, such as a board-to-board connector.

The shield member 540 described with reference to FIG. 6A may be disposed on the rear surface of the fifth substrate 690. The shield member 540 may include a wireless communication module 542 and a power management module 544.

The fifth feeder 635 and the sixth feeder 636 of the ninth conductive patch 5211 may be electrically connected to the first substrate 510 using the fifth feed line 635*a* and the sixth feed line 636*a*. The seventh feeder 637 and the eighth feeder 638 of the thirteenth conductive patch 5311 may be electrically connected to the first substrate 510 using the seventh feed line 637*a* and the eighth feed line 638*a*. The fifth feeder 635 and the sixth feeder 636 of the ninth conductive patch 5211 and the seventh feeder 637 and the eighth feeder 638 of the thirteenth conductive patch 5311 may be electrically connected to the wireless communication module 542 through the fifth feed line 635*a* and sixth feed line 636*a*, the seventh feed line 637*a* and eighth feed line 638*a*, the first substrate 510, the connector 680, and the fifth substrate 690 and may operate to transmit and receive radio signals.

Figure 7:
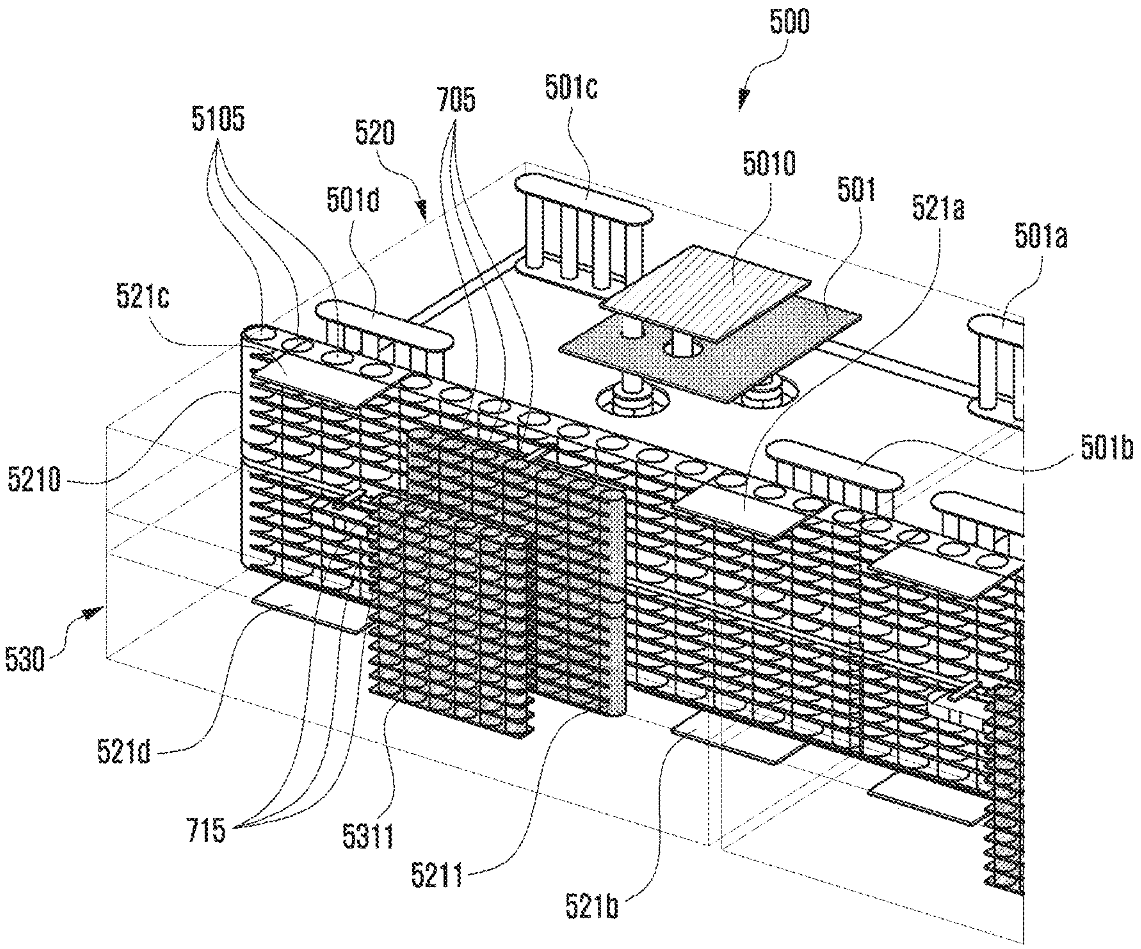
FIG. 7 illustrates a portion of an antenna module according to an embodiment.

FIG. 7 illustrates a portion of an antenna module according to an embodiment.

In FIG. 7, the same reference numerals will be assigned to the same elements as those of the above-described embodiments shown in FIGS. 5 and 6A, and redundant descriptions of their functions will be omitted.

Referring to FIG. 7, the ground layer 5210 disposed between the second substrate 520 and the third substrate 530 may include at least one first via 5105 formed in a direction perpendicular to the ground layer 5210.

The ninth conductive patch 5211 disposed in a portion of the second substrate 520 and in a portion of the third substrate 530 may include at least one second via 705 formed in a direction perpendicular to the ninth conductive patch 5211.

The thirteenth conductive patch 5311 disposed in a portion of the second substrate 520 and in a portion of the third substrate 530 may include at least one third via 715 formed in a direction perpendicular to the thirteenth conductive patch 5311.

The ninth conductive patch 5211 and the thirteenth conductive patch 5311 disposed in a portion of the second substrate 520 and in a portion of the third substrate 530 may be operatively connected to the wireless communication module 542 using electrical paths formed using at least one second via 705 and at least one third via 715.

Figure 8A:
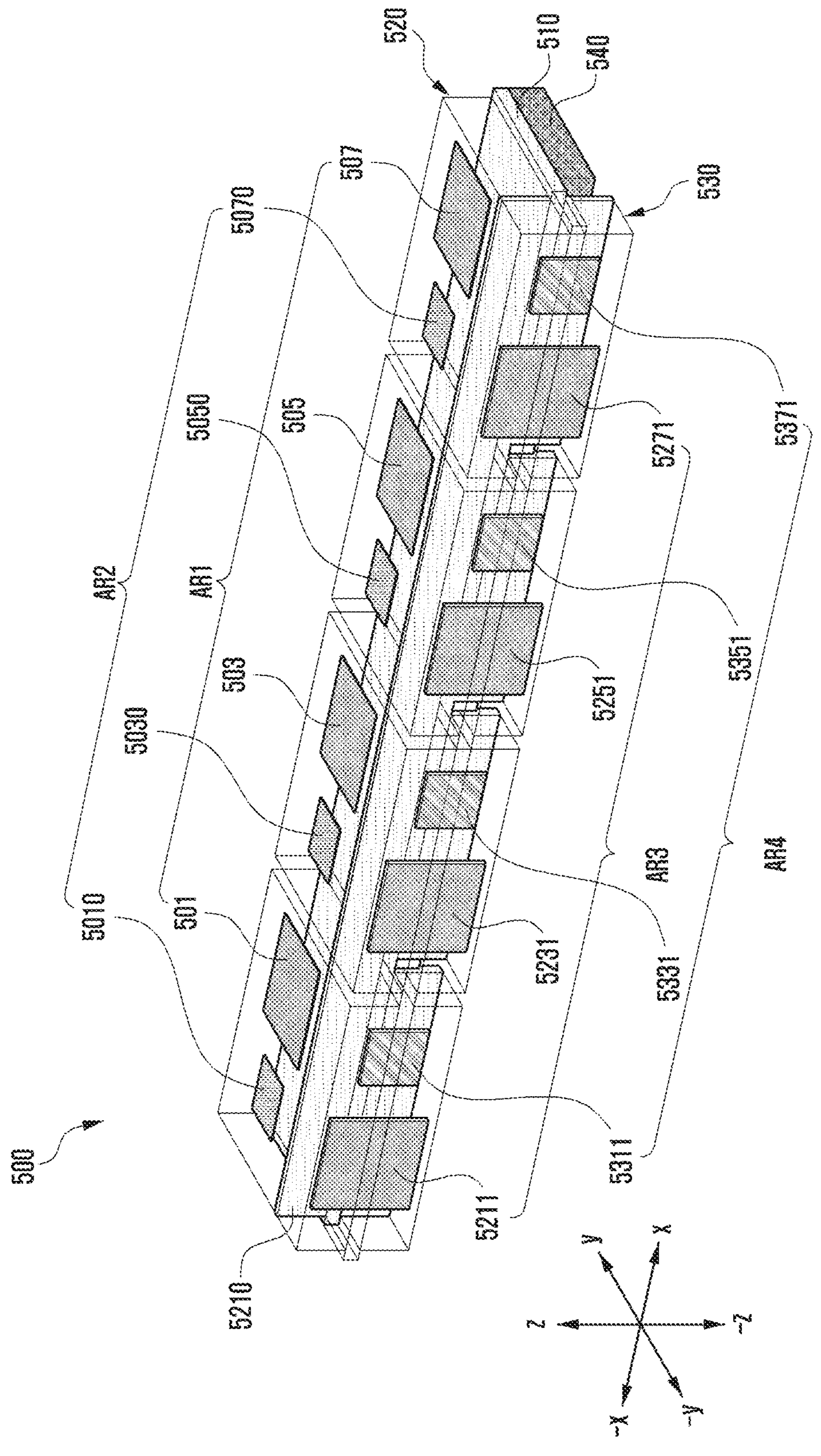
FIG. 8A is a view schematically illustrating an antenna module according to an embodiment.
Figure 8B:
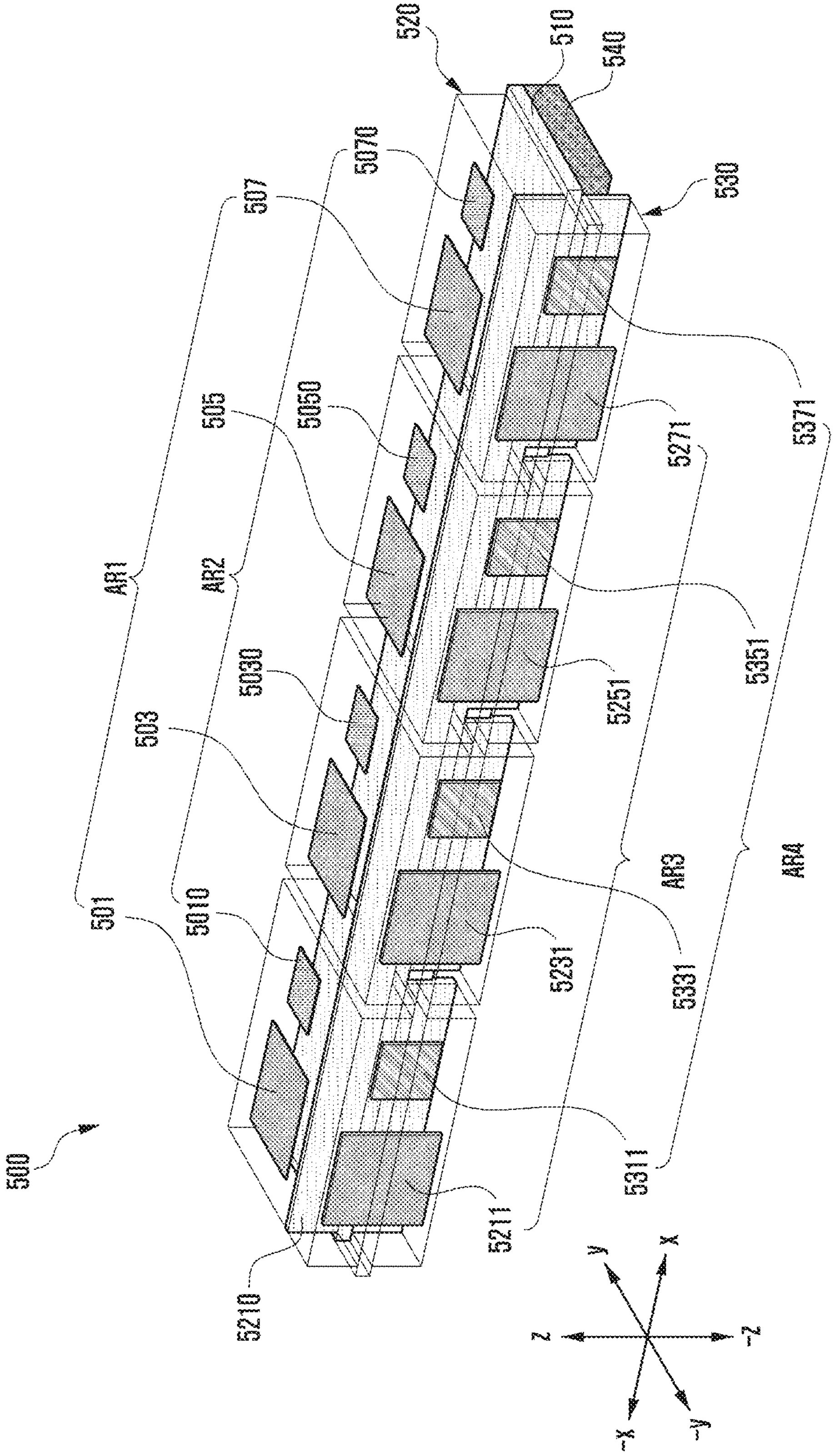
FIG. 8B illustrates an antenna module according to an embodiment.

FIG. 8A illustrates an antenna module according to an embodiment. FIG. 8B illustrates an antenna module according to an embodiment.

In the description with reference to FIGS. 8A and 8B, the same reference numerals will be assigned to the elements substantially the same as those of the embodiment shown in FIG. 5, and redundant descriptions thereof will be omitted. The embodiments shown in FIGS. 8A and 8B may be applied to the antenna module 500 in FIG. 5.

Referring to FIG. 8A, an antenna module 500 may include a first substrate 510, a second substrate 520, a third substrate 530, and/or a shield member 540.

The first substrate 510 may include a first surface (e.g., the top surface) directed in a first direction (e.g., the z-axis direction) and a second surface (e.g., the bottom surface) directed in a second direction (e.g., the −z-axis direction) opposite the first surface. The second substrate 520 may be disposed on the first surface (e.g., the top surface) of the first substrate 510. The shield member 540 may be disposed on the second surface (e.g., the bottom surface) of the first substrate 510. The third substrate 530 may be disposed under the second surface of the first substrate 510 and/or the second substrate 520.

A first antenna array AR1 including first antenna elements 501, 503, 505 and 507 may be disposed in a first area inside the second substrate 520. A second antenna array AR2 including second antenna elements 5010, 5030, 5050, and 5070 may be disposed in a second area inside the second substrate 520. The first antenna array AR1 and the second antenna array AR2 may be disposed inside the second substrate 520 to be spaced apart from each other. The first antenna array AR1 and the second antenna array AR2 may be operatively connected to the wireless communication module 542 disposed in the shield member 540.

The first antenna elements 501, 503, 505, and 507 of the first antenna array AR1 and the second antenna elements 5010, 5030, 5050, and 5070 of the second antenna array AR2 may be alternately disposed on the left and right sides on a parallel plane, respectively.

The first antenna elements of the first antenna array AR1 may include a first conductive patch 501, a second conductive patch 503, a third conductive patch 505, and/or a fourth conductive patch 507. The second antenna elements of the second antenna array AR2 may include a fifth conductive patch 5010, a sixth conductive patch 5030, a seventh conductive patch 5050, and/or an eighth conductive patch 5070.

The fifth conductive patch 5010, the first conductive patch 501, the sixth conductive patch 5030, the second conductive patch 503, the seventh conductive patch 5050, the third conductive patch 505, the eighth conductive patch 5070, and the fourth conductive patch 507 may be disposed inside the second substrate 520 to be spaced a predetermined distance apart from each other in the −x-axis direction or the x-axis direction.

At least a portion of the third substrate 530 may be disposed on the second surface of the first substrate 510 and/or one side surface (e.g., the −y-axis direction) of the second substrate 520. At least a portion of the third substrate 530 may be disposed on one side surface of the shield member 540.

A third antenna array AR3 including third antenna elements 5211, 5231, 5251, and 5271 may be disposed in a second area of a portion of the second substrate 520 and a portion of the third substrate 530. A fourth antenna array AR4 including fourth antenna elements 5311, 5331, 5351, and 5371 may be disposed in a first area of a portion of the second substrate 520 and a portion of the third substrate 530. The third antenna array AR3 and the fourth antenna array AR4 may be disposed inside the third substrate 530 to be spaced apart from each other. The third antenna array AR3 and the fourth antenna array AR4 may be operatively connected to the wireless communication module 542 disposed in the shield member 540.

The third antenna elements 5211, 5231, 5251, and 5271 of the third antenna array AR3 and the fourth antenna elements 5311, 5331, 5351, and 5371 of the fourth antenna array AR4 may be alternately disposed on the left and right sides on a parallel plane, respectively.

The third antenna elements of the third antenna array AR3 may include a ninth conductive patch 5211, a tenth conductive patch 5231, an eleventh conductive patch 5251, and/or a twelfth conductive patch 5271. The fourth antenna elements of the fourth antenna array AR4 may include a thirteenth conductive patch 5311, a fourteenth conductive patch 5331, a fifteenth conductive patch 5351, and/or a sixteenth conductive patch 5371.

The ninth conductive patch 5211, the thirteenth conductive patch 5311, the tenth conductive patch 5231, the fourteenth conductive patch 5331, the eleventh conductive patch 5251, the fifteenth conductive patch 5351, the twelfth conductive patch 5271, and the sixteenth conductive patch 5371 may be disposed inside the third substrate 530 to be parallel to each other and spaced a predetermined distance apart from each other in the −x-axis direction to the x-axis direction.

Referring to FIG. 8B, the antenna module 500 may include a first substrate 510, a second substrate 520, a third substrate 530, and/or a shield member 540.

The first substrate 510 may include a first surface (e.g., the top surface) directed in a first direction (e.g., the z-axis direction) and a second surface (e.g., the bottom surface) directed in a second direction (e.g., the −z-axis direction) opposite the first surface. A second substrate 520 may be disposed on the first surface (e.g., the top surface) of the first substrate 510. A shield member 540 may be disposed on the second surface (e.g., the bottom surface) of the first substrate 510. The third substrate 530 may be disposed under the second surface of the first substrate 510 and/or the second substrate 520.

A first antenna array AR1 including first antenna elements 501, 503, 505 and 507 may be disposed in a first area inside the second substrate 520. A second antenna array AR2 including second antenna elements 5010, 5030, 5050, and 5070 may be disposed in a second area inside the second substrate 520. The first antenna array AR1 and the second antenna array AR2 may be disposed inside the second substrate 520 to be spaced apart from each other. The first antenna array AR1 and the second antenna array AR2 may be operatively connected to the wireless communication module 542 disposed in the shield member 540.

The first antenna elements of the first antenna array AR1 may include a first conductive patch 501, a second conductive patch 503, a third conductive patch 505, and/or a fourth conductive patch 507. The second antenna elements of the second antenna array AR2 may include a fifth conductive patch 5010, a sixth conductive patch 5030, a seventh conductive patch 5050, and/or an eighth conductive patch 5070.

The first conductive patch 501, the fifth conductive patch 5010, the second conductive patch 503, the sixth conductive patch 5030, the third conductive patch 505, the seventh conductive patch 5050, the fourth conductive patch 507, and the eighth conductive patch 5070 may be disposed inside the second substrate 520 to be parallel to each other and spaced a predetermined distance apart from each other in the −x-axis direction to the x-axis direction.

At least a portion of the third substrate 530 may be disposed on the second surface of the first substrate 510 and/or on one side surface (e.g., the −y-axis direction) of the second substrate 520. At least a portion of the third substrate 530 may be disposed on one side surface of the shield member 540.

A third antenna array AR3 including third antenna elements 5211, 5231, 5251, and 5271 may be disposed in a first area of a portion of the second substrate 520 and a portion of the third substrate 530. A fourth antenna array AR4 including fourth antenna elements 5311, 5331, 5351, and 5371 may be disposed in a second area of a portion of the second substrate 520 and a portion of the third substrate 530. The third antenna array AR3 and the fourth antenna array AR4 may be disposed inside the third substrate 530 to be spaced apart from each other. The third antenna array AR3 and the fourth antenna array AR4 may be operatively connected to the wireless communication module 542 disposed in the shield member 540.

The third antenna elements of the third antenna array AR3 may include a ninth conductive patch 5211, a tenth conductive patch 5231, an eleventh conductive patch 5251, and/or a twelfth conductive patch 5271. The fourth antenna elements of the fourth antenna array AR4 may include a thirteenth conductive patch 5311, a fourteenth conductive patch 5331, a fifteenth conductive patch 5351, and/or a sixteenth conductive patch 5371.

The ninth conductive patch 5211, the thirteenth conductive patch 5311, the tenth conductive patch 5231, the fourteenth conductive patch 5331, the eleventh conductive patch 5251, the fifteenth conductive patch 5351, the twelfth conductive patch 5271, and the sixteenth conductive patch 5371 may be disposed inside the third substrate 530 to be parallel to each other and spaced a predetermined distance apart from each other in the −x-axis direction to the x-axis direction.

Figure 9:
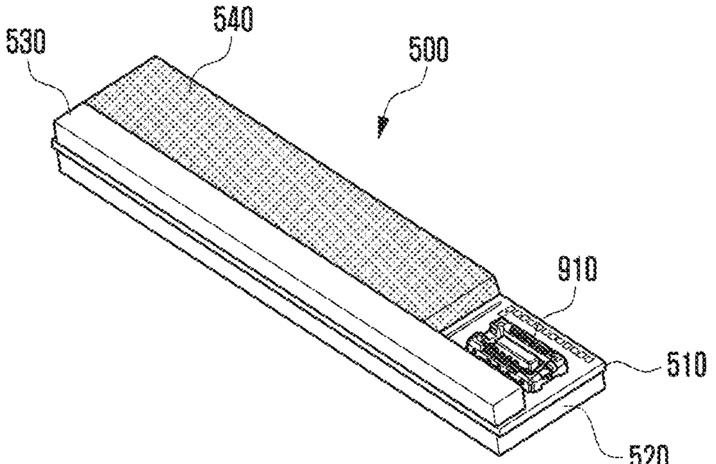
FIG. 9 is a view schematically illustrating the structure of substrates of an antenna module according to an embodiment.
Figure 9:
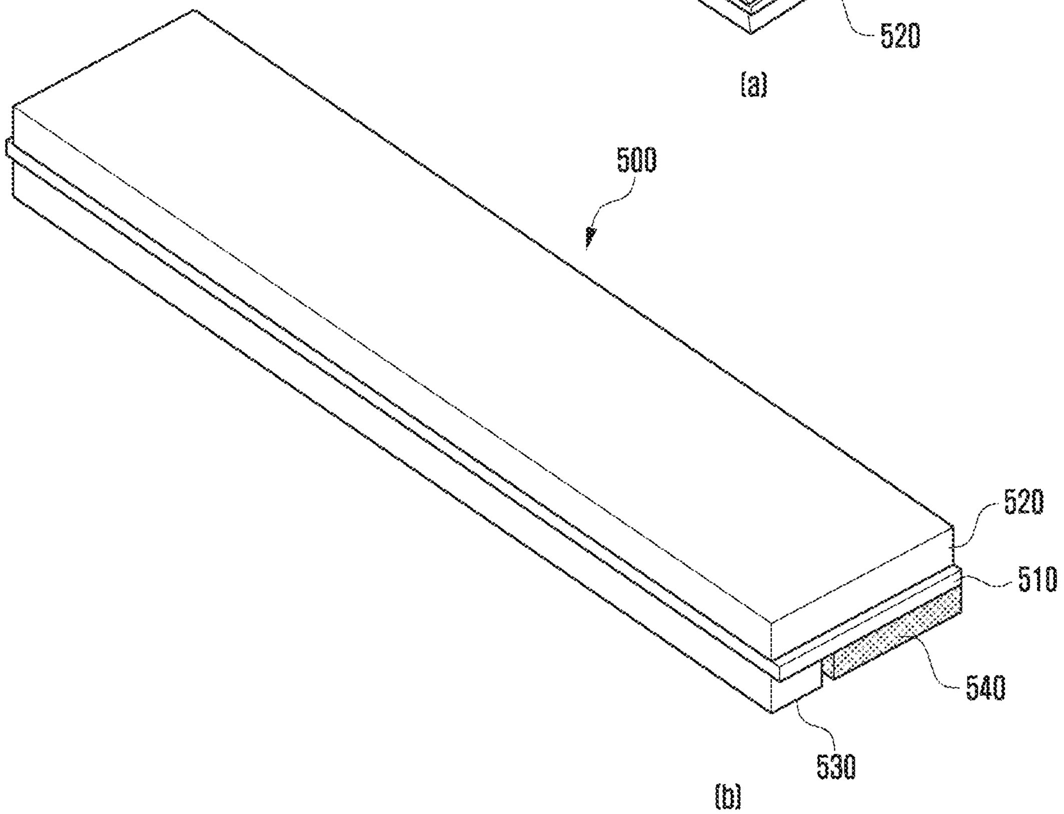

FIG. 9 illustrates substrates of an antenna module according to an embodiment. Section (a) of FIG. 9 illustrates an antenna module viewed from a rear side, and section (b) of FIG. 9 illustrates the antenna module viewed from a front side.

The first substrate 510, the second substrate 520, the third substrate 530, and/or the shield member 540 shown in the antenna module 500 in FIG. 5 above may be applied to embodiments to be described later with reference to FIGS. 9 to 14. With reference to FIGS. 10 to 14 to be described later, the same reference numerals will be assigned to the elements substantially the same as those of the embodiment shown in FIGS. 5 and 9, and redundant descriptions thereof will be omitted.

Referring to section (a) and section (b) in FIG. 9, an antenna module 500 may include a first substrate 510, a second substrate 520, a third substrate 530, a shield member 540, and/or a connection terminal 910 (e.g., a connector).

The first substrate 510 may include a first surface (e.g., the top surface) directed in a first direction and a second surface (e.g., the bottom surface) directed in a second direction opposite the first surface. The second substrate 520 may be disposed on the first surface (e.g., the top surface) of the first substrate 510. The third substrate 530, the shield member 540, and the connection terminal 910 may be disposed on the second surface (e.g., the bottom surface) of the first substrate 510.

The second substrate 520 may be formed in an integrated structure with third substrate 530. The second substrate 520 and the third substrate 530 may be formed of substantially the same material.

The second substrate 520 and/or the third substrate 530 may be configured as a rigid ceramic body and may be formed of a material (e.g., ceramic) having high permittivity of at least 7. The second substrate 520 may be configured as an integrated chip. The third substrate 530 may be configured as an integrated chip.

The first antenna array AR1 and/or the second antenna array AR2 shown in FIG. 5 may be disposed inside the second substrate 520. The third antenna array AR3 and/or the fourth antenna array AR4 shown in FIG. 5 may be disposed inside the third substrate 530.

The connection terminal 910 may be electrically connected to the PCB 340 (e.g., a main substrate) in FIG. 9C using a signal connection member (e.g., an FPCB). The shield member 540 may include the wireless communication module 542 and the power management module 544 shown in FIGS. 5 and 6A.

Figure 10:
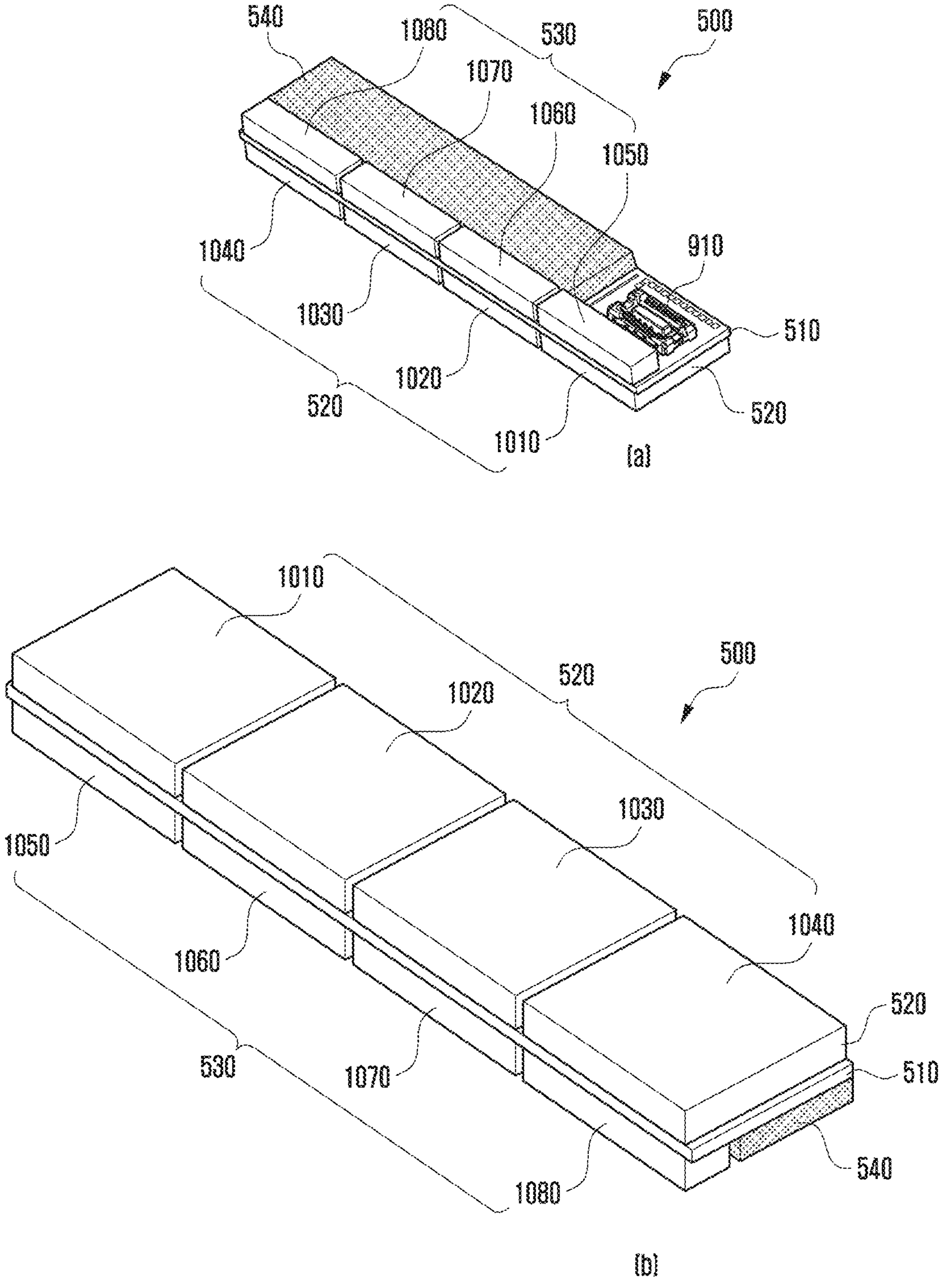
FIG. 10 illustrates the structure of substrates of an antenna module according to an embodiment.

FIG. 10 illustrates the structure of substrates of an antenna module according to an embodiment. Section (a) of FIG. 10 illustrates an antenna module viewed from a rear side, and section (b) of FIG. 10 illustrates the antenna module viewed from a front side.

Referring to sections (a) and (b) in FIG. 10, an antenna module 500 may include a first substrate 510, a second substrate 520, a third substrate 530, a shield member 540, and/or a connection terminal 910 (e.g., a connector).

The first substrate 510 may include a first surface (e.g., the top surface) directed in a first direction and a second surface (e.g., the bottom surface) directed in a second direction opposite the first surface. The second substrate 520 may be disposed on the first surface (e.g., the top surface) of the first substrate 510. The third substrate 530, the shield member 540, and the connection terminal 910 may be disposed on the second surface (e.g., the bottom surface) of the first substrate 510.

The second substrate 520 may be configured as a plurality of chips 1010, 1020, 1030, and 1040 made of substantially the same material and disposed to be spaced apart from each other.

Each of the plurality of chips 1010, 1020, 1030, and 1040 of the second substrate 520 may be configured as a rigid ceramic body. The plurality of chips 1010, 1020, 1030, and 1040 may be made of a material (e.g., ceramic) having high permittivity of at least 7.

The first conductive patch 501 and/or the fifth conductive patch 5010 shown in FIG. 5 may be disposed on the first chip 1010. The second conductive patch 503 and/or the sixth conductive patch 5030 shown in FIG. 5 may be disposed on the second chip 1020. The third conductive patch 505 and/or the seventh conductive patch 5050 shown in FIG. 5 may be disposed on the third chip 1030. The fourth conductive patch 507 and/or the eighth conductive patch 5070 shown in FIG. 5 may be disposed on the fourth chip 1040.

The third substrate 530 may include a plurality of chips 1050, 1060, 1070, and 1080 made of substantially the same material and disposed to be spaced apart from each other.

The plurality of chips 1050, 1060, 1070, and 1080 of the third substrate 530 may be configured as a rigid body made of a ceramic material, respectively. The plurality of chips 1050, 1060, 1070, and 1080 may be formed of a material (e.g., ceramic) having high permittivity of at least 7.

The ninth conductive patch 5211 and/or the thirteenth conductive patch 5311 shown in FIG. 5 may be disposed on the fifth chip 1050. The tenth conductive patch 5231 and/or the fourteenth conductive patch 5331 shown in FIG. 5 may be disposed on the sixth chip 1060. The eleventh conductive patch 5251 and/or the fifteenth conductive patch 5351 shown in FIG. 5 may be disposed on the seventh chip 1070. The twelfth conductive patch 5271 and/or the sixteenth conductive patch 5371 shown in FIG. 5 may be disposed on the eighth chip 1080.

Figure 11:
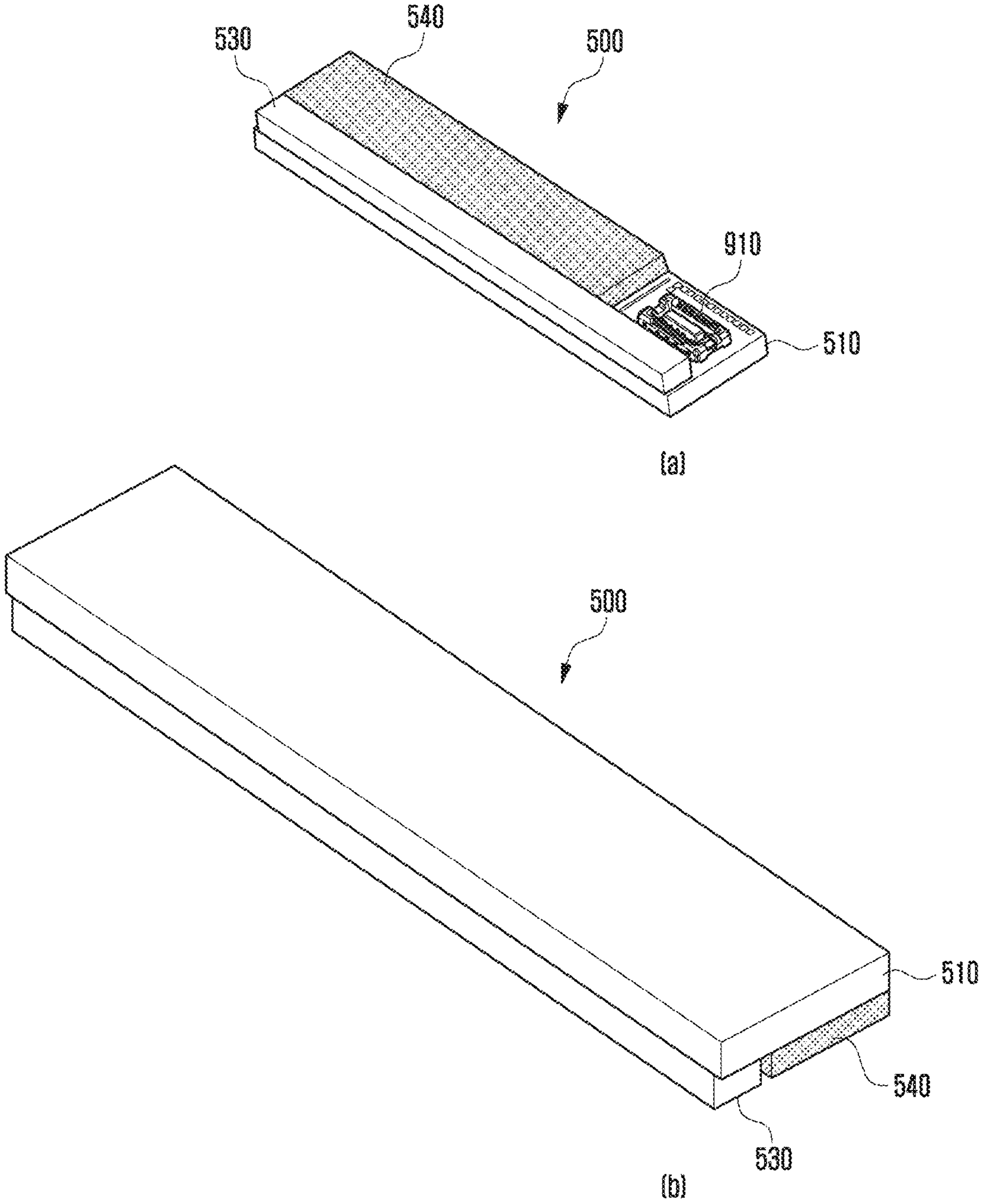
FIG. 11 illustrates the structure of substrates of an antenna module according to an embodiment.

FIG. 11 illustrates substrates of an antenna module according to an embodiment. Section (a) of FIG. 11 illustrates an antenna module viewed from a rear side, and section (b) of FIG. 11 illustrates the antenna module viewed from a front side.

Referring to sections (a) and (b) in FIG. 11, an antenna module 500 may include a first substrate 510, a third substrate 530, a shield member 540, and/or a connection terminal 910 (e.g., a connector). The antenna module 500 shown in FIG. 11 may exclude the second substrate 520 from the antenna module shown in FIG. 9.

The second substrate 520 shown in FIG. 9 may not be disposed on the first surface (e.g., the top surface) of the first substrate 510. The third substrate 530, the shield member 540, and the connection terminal 910 may be disposed on the second surface (e.g., the bottom surface) of the first substrate 510.

The third substrate 530 may be configured in an integrated structure. The third substrate 530 may be configured as a rigid ceramic body formed of a material (e.g., ceramic) having high permittivity of at least 7. The third substrate 530 may be configured as an integrated chip.

The third antenna array AR3 and/or the fourth antenna array AR4 shown in FIG. 5 may be disposed inside the third substrate 530.

Figure 12:
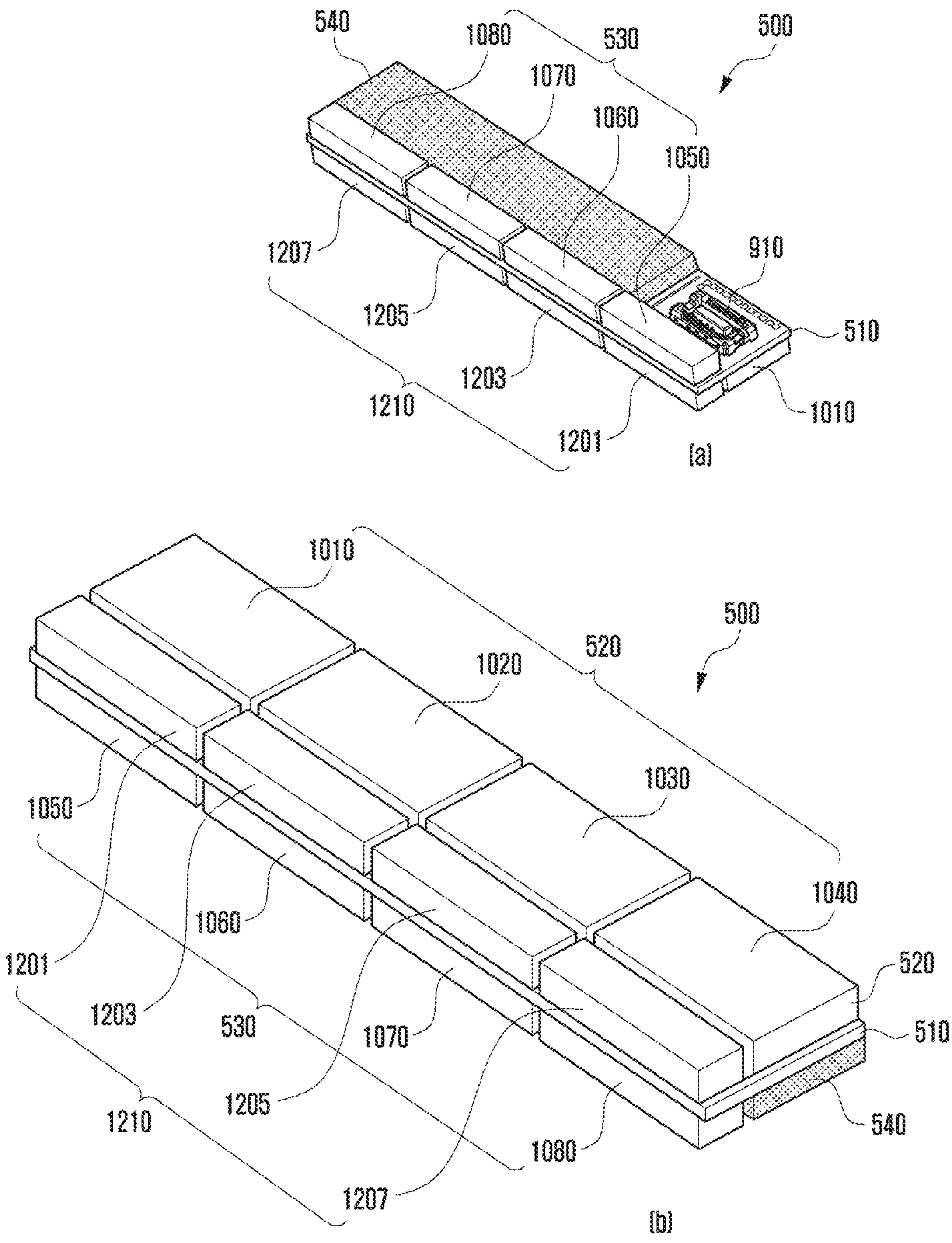
FIG. 12 illustrates the structure of substrates of an antenna module according to an embodiment.

FIG. 12 illustrates the structure of substrates of an antenna module according to an embodiment. Section (a) of FIG. 12 illustrates an antenna module viewed from a rear side, and section (b) of FIG. 12 illustrates the antenna module viewed from a front side.

Referring to sections (a) and (b) in FIG. 12, an antenna module 500 may include a first substrate 510, a second substrate 520, a third substrate 530, a fourth substrate 1210, a shield member 540, and/or a connection terminal 910 (e.g., a connector).

The first substrate 510 may include a first surface (e.g., the top surface) directed in a first direction and a second surface (e.g., the bottom surface) directed in a second direction opposite the first surface. The second substrate 520 and/or the fourth substrate 1210 may be disposed on the first surface (e.g., the top surface) of the first substrate 510. The third substrate 530, the shield member 540, and the connection terminal 910 may be disposed on the second surface (e.g., the bottom surface) of the first substrate 510.

The second substrate 520 may be configured as a plurality of chips 1010, 1020, 1030, and 1040 formed of substantially the same material and disposed to be spaced apart from each other.

The plurality of chips 1010, 1020, 1030, and 1040 of the second substrate 520 may be configured as a rigid ceramic body, respectively. The plurality of chips 1010, 1020, 1030, and 1040 may be formed of a material (e.g., ceramic) having high permittivity of at least 7.

The first conductive patch 501 and/or the fifth conductive patch 5010 shown in FIG. 5 may be disposed on the first chip 1010. The second conductive patch 503 and/or the sixth conductive patch 5030 shown in FIG. 5 may be disposed on the second chip 1020. The third conductive patch 505 and/or the seventh conductive patch 5050 shown in FIG. 5 may be disposed on the third chip 1030. The fourth conductive patch 507 and/or the eighth conductive patch 5070 shown in FIG. 5 may be disposed on the fourth chip 1040.

The third substrate 530 may be configured as a plurality of chips 1050, 1060, 1070, and 1080 made of substantially the same material and disposed to be spaced apart from each other.

The plurality of chips 1050, 1060, 1070, and 1080 of the third substrate 530 may be configured as a rigid ceramic body, respectively. The plurality of chips 1050, 1060, 1070, and 1080 may be formed of a material (e.g., ceramic) having high permittivity of at least 7.

The ninth conductive patch 5211 and/or the thirteenth conductive patch 5311 shown in FIG. 5 may be disposed on the fifth chip 1050. The tenth conductive patch 5231 and/or the fourteenth conductive patch 5331 shown in FIG. 5 may be disposed on the sixth chip 1060. The eleventh conductive patch 5251 and/or the fifteenth conductive patch 5351 shown in FIG. 5 may be disposed on the seventh chip 1070. The twelfth conductive patch 5271 and/or the sixteenth conductive patch 5371 shown in FIG. 5 may be disposed on the eighth chip 1080.

The fourth substrate 1210 may be configured as a plurality of chips 1201, 1203, 1205, and 1207 made of substantially the same material and disposed to be spaced apart from each other. The plurality of chips 1201, 1203, 1205, and 1207 of the fourth substrate 1210 may be disposed to be spaced apart from the plurality of chips 1010, 1020, 1030 and 1040 of the second substrate 520, respectively.

The plurality of chips 1201, 1203, 1205, and 1207 of the fourth substrate 1210 may be configured as a rigid ceramic body, respectively. The plurality of chips 1201, 1203, 1205 and 1207 may be formed of a material (e.g., ceramic) having high permittivity of at least 7.

At least one conductive patch may be disposed on the ninth chip 1201. At least one conductive patch may be disposed on the tenth chip 1203. At least one conductive patch may be disposed on the eleventh chip 1205. At least one conductive patch may be disposed on the twelfth chip 1205.

Figure 13:
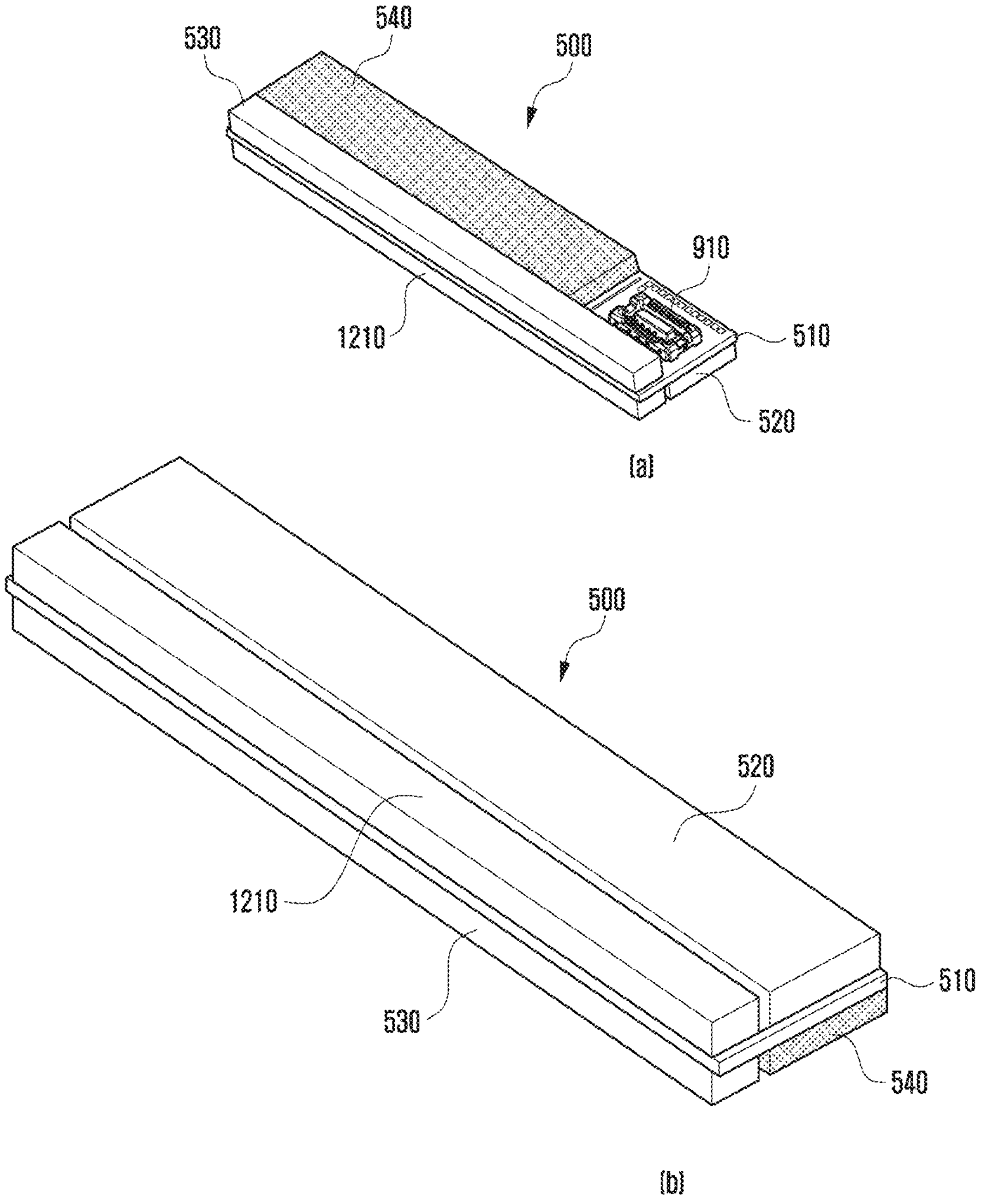
FIG. 13 illustrates the structure of substrates of an antenna module according to an embodiment.

FIG. 13 illustrates the structure of substrates of an antenna module according to an embodiment. Section (a) of FIG. 13 illustrates an antenna module viewed from a rear side, and section (b) of FIG. 13 illustrates the antenna module viewed from a front side.

Referring to sections (a) and (b) in FIG. 13, an antenna module 500 may include a first substrate 510, a second substrate 520, a third substrate 530, a fourth substrate 1210, a shield member 540, and/or a connection terminal 910 (e.g., a connector).

The first substrate 510 may include a first surface (e.g., the top surface) directed in a first direction and a second surface (e.g., the bottom surface) directed in a second direction opposite the first surface. The second substrate 520 and/or the fourth substrate 1210 may be disposed on the first surface (e.g., the top surface) of the first substrate 510. The third substrate 530, the shield member 540, and the connection terminal 910 may be disposed on the second surface (e.g., the bottom surface) of the first substrate 510.

The second substrate 520 may be configured in an integrated structure with the third substrate 530 and the fourth substrate 1210. The second substrate 520, the third substrate 530, and the fourth substrate 1210 may be formed of substantially the same material.

The second substrate 520, the third substrate 530, and the fourth substrate 1210 may be configured as a rigid ceramic material. The second substrate 520, the third substrate 530, and the fourth substrate 1210 may be formed of a material (e.g., ceramic) having high permittivity of at least 7, respectively. The second substrate 520, the third substrate 530, and the fourth substrate 1210 may be configured as an integrated chip, respectively.

The first antenna array AR1 and/or the second antenna array AR2 shown in FIG. 5 may be disposed inside the second substrate 520. The third antenna array AR3 and/or the fourth antenna array AR4 shown in FIG. 5 may be disposed inside the third substrate 530. At least one conductive patch array substantially the same as or different from the antenna arrays shown in FIG. 5 may be disposed inside the fourth substrate 1210.

Figure 14:
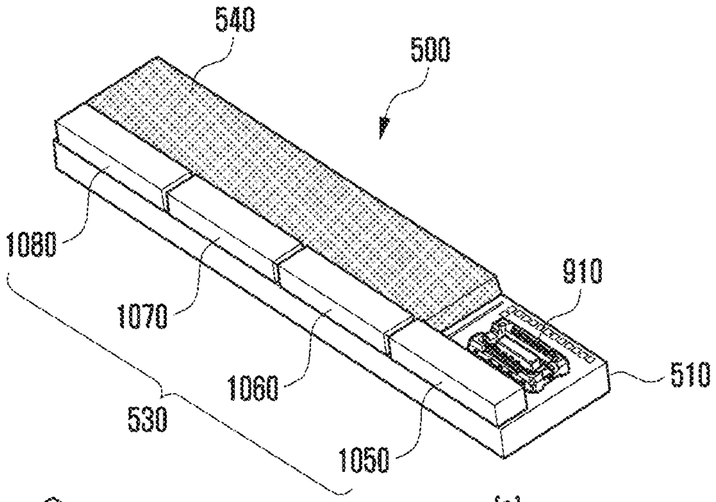
FIG. 14 illustrates the structure of substrates of an antenna module according to an embodiment.
Figure 14:
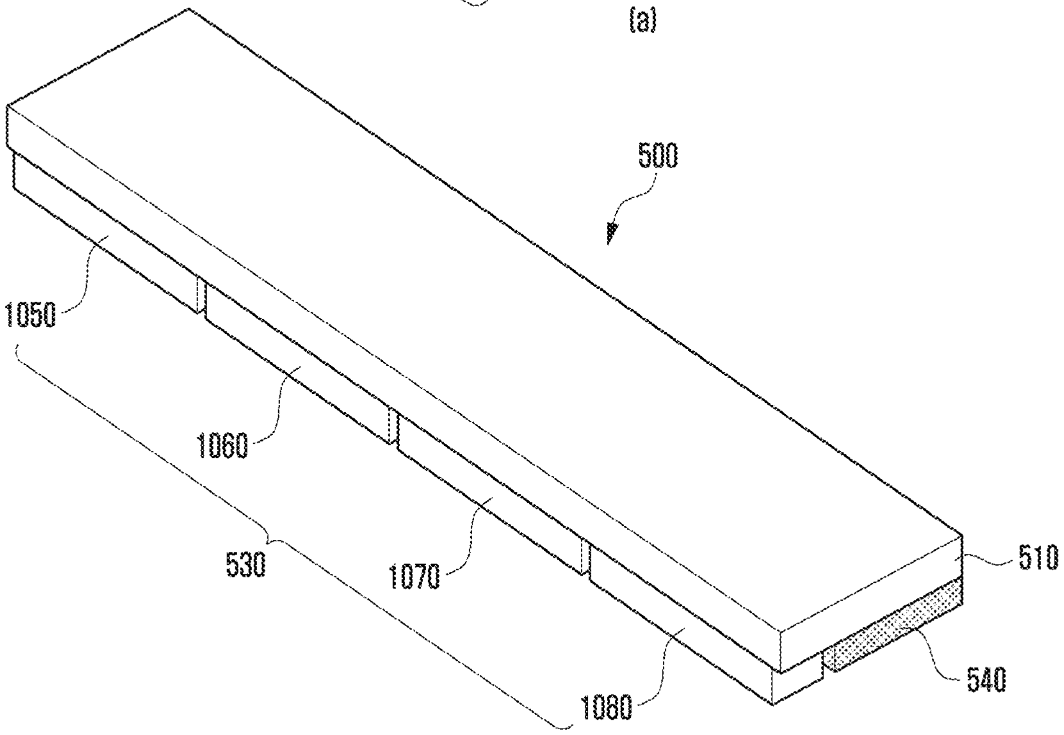

FIG. 14 illustrates the structure of substrates of an antenna module according to an embodiment. Section (a) of FIG. 14 illustrates an antenna module viewed from a rear side, and section (b) of FIG. 14 illustrates the antenna module viewed from a front side.

Referring to sections (a) and (b) in FIG. 14, an antenna module 500 may include a first substrate 510, a third substrate 530, a shield member 540, and/or a connection terminal 910 (e.g., a connector). The antenna module 500 shown in FIG. 14 may exclude the second substrate 520 and the fourth substrate 1210 from the antenna module shown in FIG. 12.

The second substrate 520 and the fourth substrate 1210 shown in FIG. 11 may not be disposed on the first surface (e.g., the top surface) of the first substrate 510. The third substrate 530, the shield member 540, and the connection terminal 910 may be disposed on the second surface (e.g., the bottom surface) of the first substrate 510.

The third substrate 530 may be configured as a plurality of chips 1050, 1060, 1070, and 1080 made of substantially the same material and disposed to be spaced apart from each other.

The plurality of chips 1050, 1060, 1070, and 1080 of the third substrate 530 may be configured as a rigid ceramic body, respectively. The plurality of chips 1050, 1060, 1070, and 1080 may be configured as a material (e.g., ceramic) having high permittivity of at least 7.

The ninth conductive patch 5211 and/or the thirteenth conductive patch 5311 shown in FIG. 5 may be disposed on the fifth chip 1050. The tenth conductive patch 5231 and/or the fourteenth conductive patch 5331 shown in FIG. 5 may be disposed on the sixth chip 1060. The eleventh conductive patch 5251 and/or the fifteenth conductive patch 5351 shown in FIG. 5 may be disposed on the seventh chip 1070. The twelfth conductive patch 5271 and/or the sixteenth conductive patch 5371 shown in FIG. 5 may be disposed on the eighth chip 1080.

Figure 15:
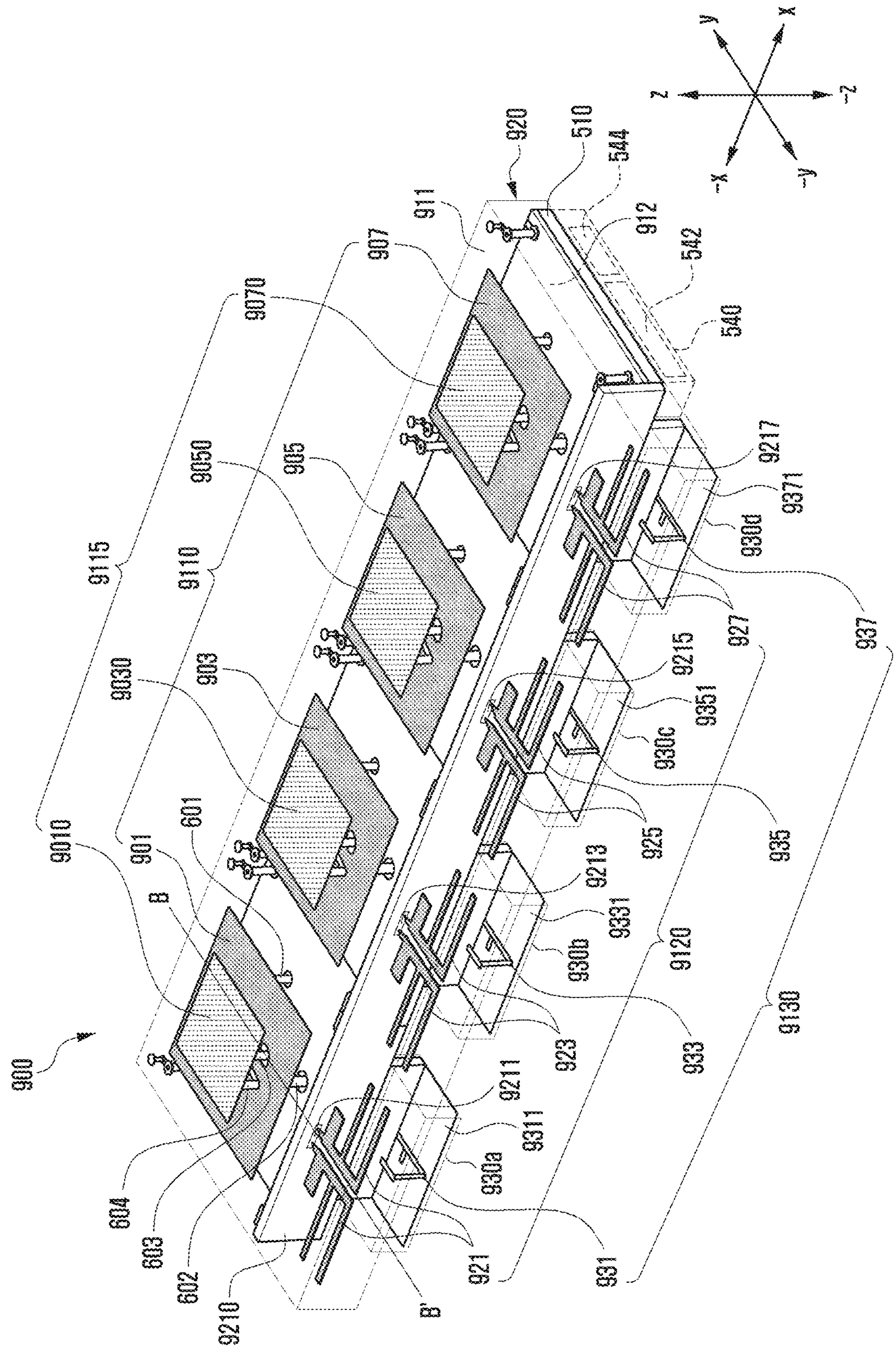
FIG. 15 illustrates an antenna module including a plurality of antenna arrays according to an embodiment.
Figure 16:
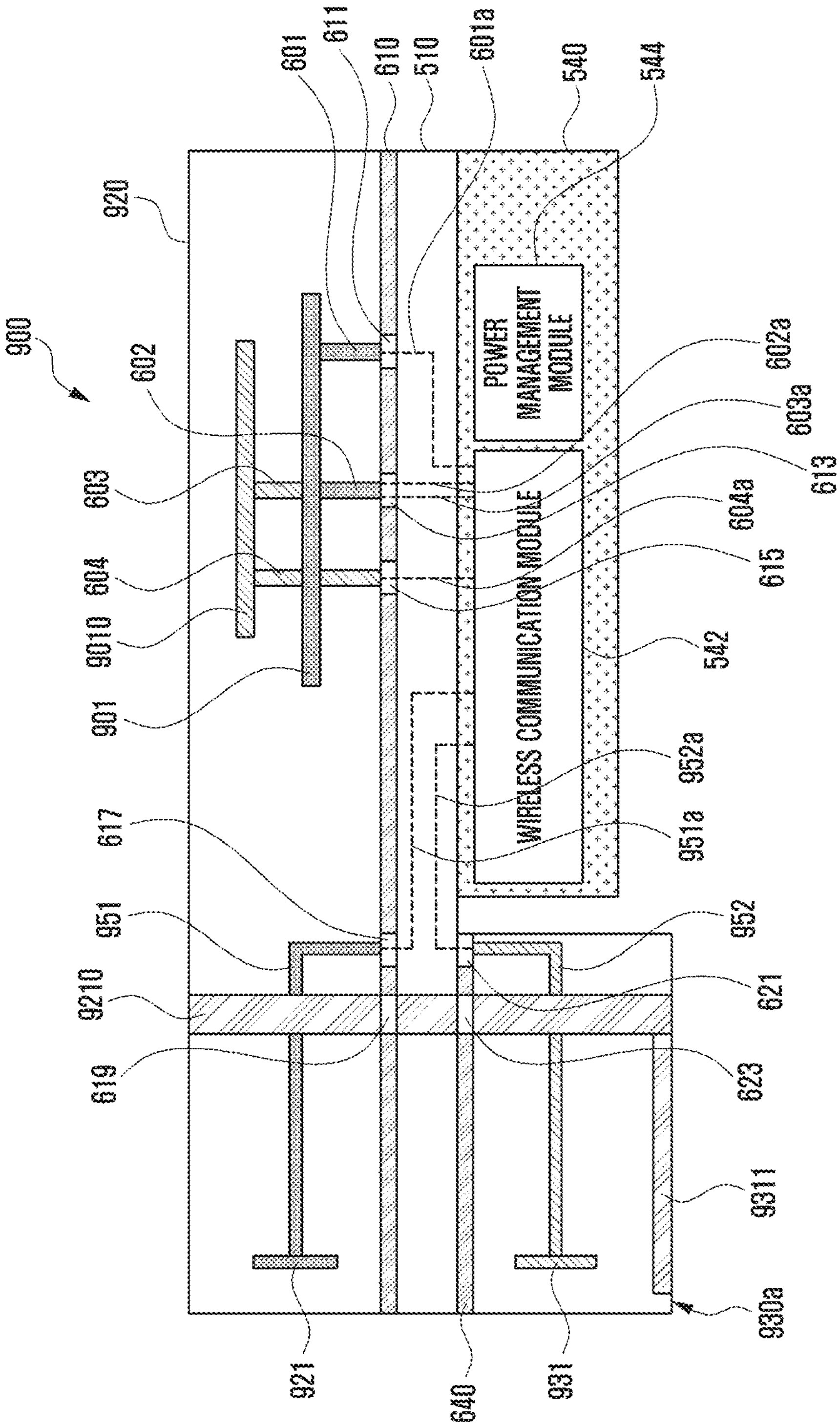
FIG. 16 illustrates a cross-section of the antenna module taken along line B-B' shown in FIG. 15 according to an embodiment.

FIG. 15 illustrates an antenna module including a plurality of antenna arrays according to an embodiment. FIG. 16 illustrates a cross-section of the antenna module taken along line B-B' shown in FIG. 15 according to an embodiment.

At least one antenna module 900 shown in FIGS. 15 and 16 may be disposed inside the housing 310 of the electronic device 300 shown in FIG. 3C. The antenna module 900 may be operatively connected to the printed circuit board 340 (e.g., a main board) of the electronic device 300 shown in FIG. 3C using a conductive connection member (e.g., an FPCB).

The antenna module 900 shown in FIGS. 15 and 16 may partially include the elements and structures of the antenna module 500 shown in FIGS. 5 to 14. In the description of FIGS. 15 and 16, the same reference numerals will be assigned to the elements substantially the same as those of the antenna module 500 shown in FIGS. 5 to 14, and redundant descriptions thereof will be omitted.

Referring to FIG. 15 and FIG. 16, an antenna module 900 may include a first substrate 510, a second substrate 920, a third substrate 930*a*, a fourth substrate 930*b*, a fifth substrate 930*c*, a sixth substrate 930*d*, and/or a shield member 540.

The first substrate 510 may include a first surface (e.g., the top surface) directed in a first direction (e.g., the z-axis direction) and a second surface (e.g., the bottom surface) directed in a second direction (e.g., the −z-axis direction) opposite the first surface. The second substrate 920 may be disposed on the first surface (e.g., the top surface) of the first substrate 510. The third substrate 930*a*, the fourth substrate 930*b*, the fifth substrate 930*c*, the sixth substrate 930*d*, and/or the shield member 540 may be disposed on the second surface (e.g., the bottom surface) of the first substrate 510.

The first substrate 510 may include an FPCB and at least one feed line and a logic circuit.

The second substrate 920 may include a first surface 911 (e.g., the top surface) directed in a first direction (e.g., the z-axis direction) and a second surface 912 (e.g., the bottom surface) directed in a second direction (e.g., the −z-axis direction) opposite the first surface 911. The second substrate 920 may include a first antenna array 9110 and a second antenna array 9115 disposed on the second surface 912 to be spaced a predetermined distance apart from each other. The second substrate 920 may include a third antenna array 9120 disposed on one side surface (e.g., an outer surface of the ground layer 9210).

The second substrate 920 may be configured as a plurality of layers. The second substrate 920 may include the PCB 410 shown in FIG. 4A. The second substrate 920 may be formed of a material having higher permittivity than the first substrate 510. The second substrate 920 may be formed of a material (e.g., ceramic) having high permittivity of at least 7. The second substrate 920 may be configured as a chip made of a ceramic material. Since the second substrate 920 is formed of a material (e.g., ceramic) having higher permittivity than the first substrate 510, the sizes of the first antenna elements 901, 903, 905, and 907 and/or second antenna elements 9010, 9030, 9050, and 9070 disposed on the second substrate 920 may be reduced.

The first antenna array 9110 including the first antenna elements 901, 903, 905, and 907 may be disposed in an area adjacent to the second surface 912 of the second substrate 920. The second antenna array 9115 including the second antenna elements 9010, 9030, 9050, and 9070 may be disposed in an area adjacent to the first surface 911 of the second substrate 920. The first antenna array 9110 and the second antenna array 9115 may be disposed inside the second substrate 920 to be spaced apart from each other. The first antenna array 9110 and the second antenna array 9115 may be operatively connected to the wireless communication module 542 disposed in the shield member 540.

The first antenna elements 901, 903, 905, and 907 may be disposed at regular intervals in an area adjacent to the second surface 912 of the second substrate 920. The first antenna elements may include a first conductive patch 901, a second conductive patch 903, a third conductive patch 905, and/or a fourth conductive patch 907. The second antenna elements 9010, 9030, 9050, and 9070 may be disposed at regular intervals in an area adjacent to the first surface 911 of the second substrate 920. The second antenna elements may include a fifth conductive patch 9010, a sixth conductive patch 9030, a seventh conductive patch 9050, and/or an eighth conductive patch 9070.

The first antenna elements 901, 903, 905, and 907 of the first antenna array 9110 may operate in a lower band area than the second antenna elements 9010, 9030, 9050, and 9070 of the second antenna array 9115, such as about 25 GHz to 30 GHz. The second antenna elements 9010, 9030, 9050, and 9070 of the second antenna array 9115 may operate in a band of about 35 GHz to 40 GHz. The first antenna array 9110 and the second antenna array 9115 may transmit and receive a polarized wave of ±90°, respectively.

Although it has been described that the second substrate 920 of the antenna module 900 in which the first antenna array 9110 includes four conductive patches and the second antenna array 9115 includes four conductive patches, the disclosure is not limited thereto, and each array may include four or more conductive patches.

The first antenna elements 901, 903, 905, and 907 may include substantially the same shape or different shapes. The first antenna elements 901, 903, 905, and 907 may form directional beams. Each of the first antenna elements 901, 903, 905, and 907 may radiate a dual-polarized wave in a predetermined direction of the antenna module 900 through the first feeder 601 and the second feeder 602. For example, the first feeder 601 and the second feeder 602 may support the first conductive patch 901 to transmit and receive radio signals and may electrically connect the first conductive patch 901 and the wireless communication module 542 using the first feed line 601*a* and the second feed line 602*a*. Accordingly, the first conductive patch 901 may act as an antenna radiator to transmit and receive radio signals. The first feeder 601 and the second feeder 602 may include a portion of a conductive pattern formed on the second substrate 920.

The second antenna elements 9010, 9030, 9050, and 9070 may include substantially the same shape or different shapes and may form directional beam. Each of the second antenna elements 9010, 9030, 9050, and 9070 may radiate a dual-polarized wave in a predetermined direction of the antenna module 900 through the third feeder 603 and the fourth feeder 604. For example, the third feeder 603 and the fourth feeder 604 may support the fifth conductive patch 9010 to transmit and receive radio signals. The third feeder 603 and the fourth feeder 604 may electrically connect the fifth conductive patch 9010 and the wireless communication module 542 using the third feed line 603*a* and the fourth feed line 604*a*. Accordingly, the fifth conductive patch 9010 may act as an antenna radiator to transmit and receive radio signals. The third feeder 603 and the fourth feeder 604 may include a portion of a conductive pattern formed on the second substrate 920.

A ground layer 9210 may be disposed in the second substrate 920 in one direction (e.g., the −y-axis direction) of the second substrate 920. The ground layer 9210 may include a first slit 9211, a second slit 9213, a third slit 9215, and/or a fourth slit 9217 which are disposed to be spaced a predetermined distance apart from each other.

The third antenna array 9120 including third antenna elements 921, 923, 925, and 927 may be disposed in the first slit 9211 to the fourth slit 9217 so as to protrude from the first slit 9211 to the fourth slit 9217. The third antenna array 9120 may be operatively connected to the wireless communication module 542. The third antenna elements 921, 923, 925, and 927 of the third antenna array 9120 may include a first dipole antenna 921 disposed in the first slit 9211, a second dipole antenna 923 disposed in the second slit 9213, a third dipole antenna 925 disposed in the third slit 9215, and a fourth dipole antenna 927 disposed in the fourth slit 9217.

The third antenna elements 921, 923, 925, and 927 may include substantially the same shape or different shapes and may form directional beams. Each of the third antenna elements 921, 923, 925, and 927 may radiate a horizontally polarized wave in a predetermined direction of the antenna module 900 using the fifth feeder 951.

The third substrate 930*a*, the fourth substrate 930*b*, the fifth substrate 930*c*, and/or the sixth substrate 930*d* may be formed of a material having higher permittivity than the first substrate 510. The third substrate 930*a*, the fourth substrate 930*b*, the fifth substrate 930*c*, and/or the sixth substrate 930*d* may be formed of a material (e.g., ceramic) having high permittivity of at least 7. Each of the third substrate 930*a*, the fourth substrate 930*b*, the fifth substrate 930*c*, and/or the sixth substrate 930*d* may be configured as a chip made of a ceramic material. In another embodiment, the second substrate 920, the third substrate 930*a*, the fourth substrate 930*b*, the fifth substrate 930*c*, and/or the sixth substrate 930*d* may also be formed of a material (e.g., ceramic) having high permittivity of at least 7. The second substrate 920, the third substrate 930*a*, the fourth substrate 930*b*, the fifth substrate 930*c*, and/or the sixth substrate 930*d* may be integrally formed using a ceramic material.

The third substrate 930*a*, the fourth substrate 930*b*, the fifth substrate 930*c*, and/or the sixth substrate 930*d* may include a rigid ceramic material and may be combined with the first substrate 510 in a chip manner. The third substrate 930*a*, the fourth substrate 930*b*, the fifth substrate 930*c*, and the sixth substrate 930*d* may be disposed to be spaced a predetermined distance apart from each other and may be integrally combined.

The third substrate 930*a* may be disposed under the first dipole antenna 921 and may be integrally combined with the first substrate 910. The fourth substrate 930*b* may be disposed under the second dipole antenna 923 and may be integrally combined with the first substrate 910. The fifth substrate 930*c* may be disposed under the third dipole antenna 925 and may be integrally combined with the first substrate 910. The sixth substrate 930*d* may be disposed under the fourth dipole antenna 927 and may be integrally combined with the first substrate 910.

The third substrate 930*a* may include a first monopole antenna 931. The fourth substrate 930*b* may include a second monopole antenna 933. The fifth substrate 930*c* may include a third monopole antenna 935. The sixth substrate 930*d* may include a fourth monopole antenna 937. The first monopole antenna 931 to the fourth monopole antenna 937 may configure the fourth antenna array 9130. The fourth antenna array 9130 may be operatively connected to the wireless communication module 540.

The first monopole antenna 931 to the fourth monopole antenna 937 may include substantially the same shape or different shapes. The first monopole antenna 931 to the fourth monopole antenna 937 may form directional beams. Each of the first monopole antenna 931 to the fourth monopole antenna 937 may radiate a vertically polarized wave in a predetermined direction of the antenna module 900 using the sixth feeder 952.

The third substrate 930*a* may include a first ground portion 9311 disposed under the first monopole antenna 931 and operating as the ground of the first monopole antenna 931. The fourth substrate 930*b* may include a second ground portion 9331 disposed under the second monopole antenna 933 and operating as the ground of the second monopole antenna 933. The fifth substrate 930*c* may include a third ground portion 9351 disposed under the third monopole antenna 935 and operating as the ground of the third monopole antenna 935. The sixth substrate 930*d* may include a fourth ground portion 9371 disposed under the fourth monopole antenna 937 and operating as the ground of the fourth monopole antenna 937.

The first ground portion 9311, the second ground portion 9331, the third ground portion 9351, and the fourth ground portion 9371 may be electrically connected to the ground layer 9210 and may be configured such that a vertically polarized wave is possible in each of the first monopole antenna 931, the second monopole antenna 933, the third monopole antenna 935, and the fourth monopole antenna 937.

Referring to FIG. 16, an antenna module 900 may include a first filling layer 610 disposed on the first surface (e.g., the top surface) of the first substrate 510 and a second filling layer 640 partially disposed on the second surface (e.g., the bottom surface) of the first substrate 510. The first filling layer 610 may be partially disposed between the first substrate 510 and the second substrate 920. A portion of the first filling layer 610 may be disposed inside the second substrate 920. A portion of the second filling layer 640 may be disposed inside the third substrate 930*a*. Other filling layers may be provided addition to the first filling layer 610 and the second filling layer 640. For example, an additional filling layer may be further included between the third monopole antenna 935 and the first ground portion 9311 of the third substrate 930*a*.

The first filling layer 610 may include a first solder 611, a second solder 613, a third solder 615, a fourth solder 617, and/or a fifth solder 619. The second filling layer 640 may include a sixth solder 621 and a seventh solder 623.

The first solder 611 may connect the first feeder 601 of the first conductive patch 901 and the first substrate 510. The first feeder 601 of the first conductive patch 901 may be electrically connected to the wireless communication module 542 using the first solder 611 and the first feed line 601*a*. The second solder 613 may connect the second feeder 602 of the first conductive patch 901 and the third feeder 603 of the fifth conductive patch 9010 with the first substrate 510. The second feeder 602 of the first conductive patch 901 and the third feeder 603 of the fifth conductive patch 9010 may be electrically connected to the wireless communication module 542 using the second feed line 602*a* and the third feed line 603*a*. The third solder 615 may connect the fourth feeder 604 of the fifth conductive patch 9010 and the first substrate 510. The fourth feeder 604 of the fifth conductive patch 9010 may be electrically connected to the wireless communication module 542 using the third solder 615 and the fourth feed line 604*a*. The fourth solder 617 may connect the fifth feeder 951 of the first dipole antenna 921 with the first substrate 510. The fifth feeder 951 of the first dipole antenna 921 may pass through the ground layer 9210 to be electrically connected to the wireless communication module 542 using the fifth feed line 951*a*. The fifth solder 619 may combine a portion of the ground layer 9210 with the first substrate 510 and the second substrate 920.

The sixth solder 621 of the second filling layer 640 may connect the sixth feeder 952 of the first monopole antenna 931 with the first substrate 510. The sixth feeder 952 of the first monopole antenna 931 may pass through the ground layer 9210 to be electrically connected to the wireless communication module 542 using the sixth feed line 952*a*. The seventh solder 623 may combine a portion of the ground layer 9210 with the first substrate 510 and the third substrate 930*a*.

The antenna module 900 may radiate a horizontally polarized wave and a vertically polarized wave in the upper direction (e.g., the z-axis direction) of the antenna module 900 through the first antenna elements 901, 903, 905, and 907 electrically connected to the first feeder 601 and the second feeder 902. The antenna module 900 may radiate a horizontally polarized wave and a vertically polarized wave in the upper direction (e.g., the z-axis direction) of the antenna module 900 through the second antenna elements 9010, 9030, 9050, and 9070 electrically connected to the third feeder 603 and the fourth feeder 604.

The antenna module 900 may radiate a horizontally polarized wave in the lateral direction (e.g., the −y-axis direction) of the antenna module 900 through the third antenna elements 921, 923, 925, and 927 electrically connected to the fifth feeder 951. The antenna module 900 may radiate a vertically polarized wave in the lateral direction (e.g., the −y-axis direction) of the antenna module 900 through the first monopole antenna 931 to the fourth monopole antenna 937 electrically connected to the sixth feeder 952.

Figure 17:
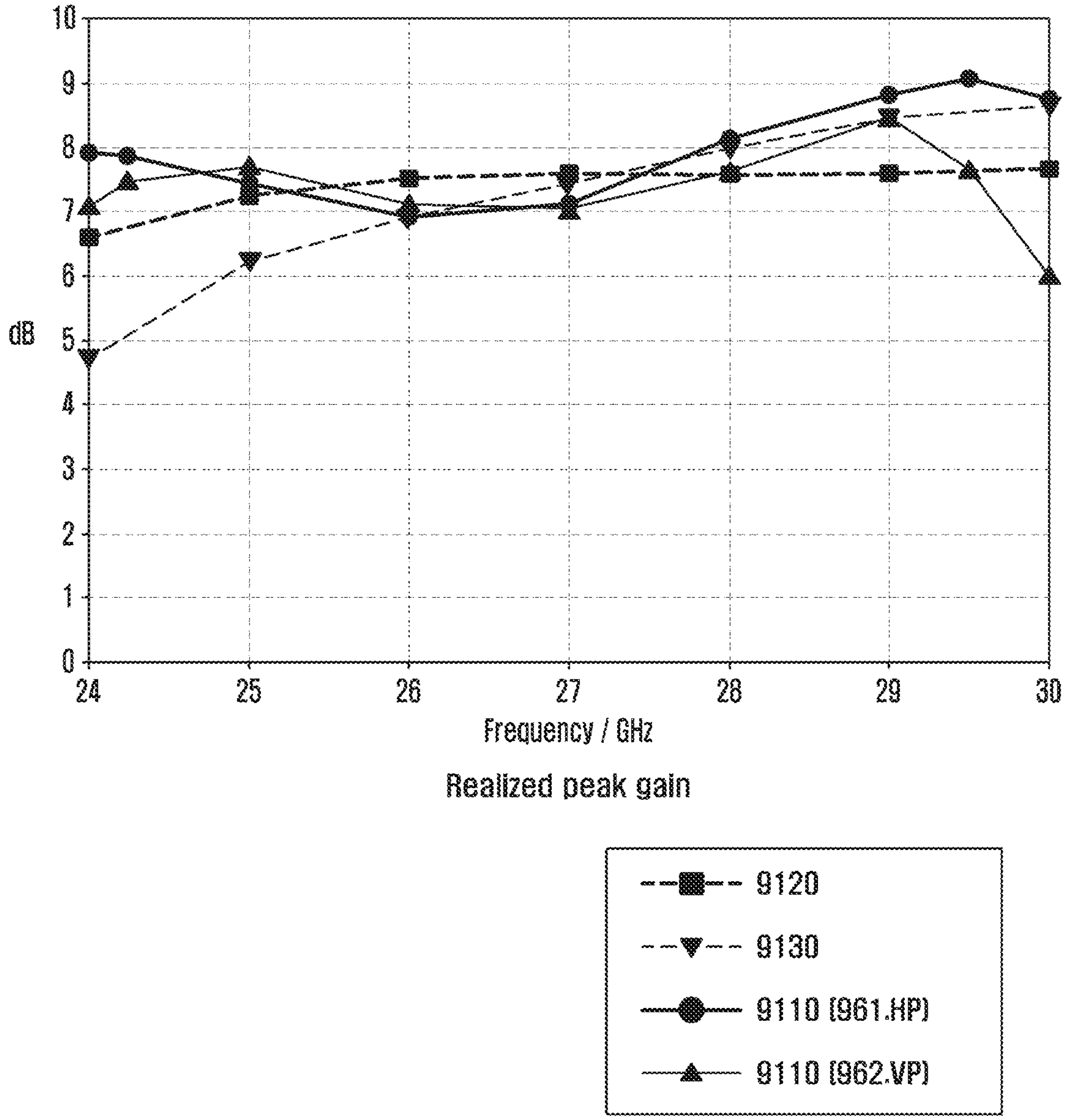
FIG. 17 illustrates a gain of the antenna module shown in FIG. 15 according to an embodiment.
Figure 18:
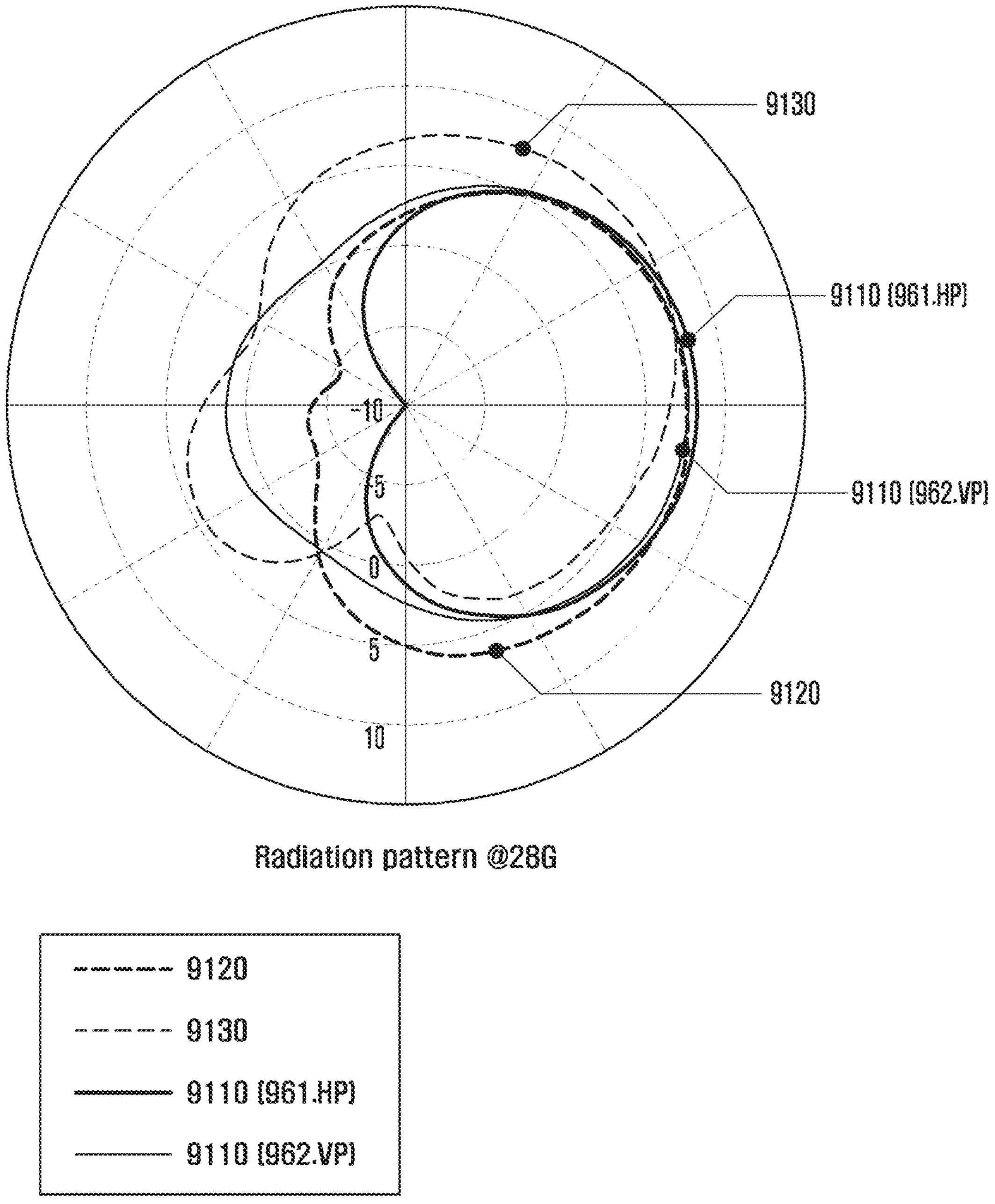
FIG. 18 illustrates a radiation pattern of the antenna module shown in FIG. 15 according to an embodiment.

FIG. 17 illustrates a gain of the antenna module shown in FIG. 15 according to an embodiment. FIG. 18 illustrates a radiation pattern of the antenna module shown in FIG. 15 according to an embodiment.

FIGS. 17 and 18 illustrate a gain and a radiation pattern using the first antenna array 9110, the third antenna array 9120, and the fourth antenna array 9130 in the embodiment of FIG. 15, excluding the second antenna array 9115.

Referring to FIGS. 17 and 18, the antenna module 900 may obtain gains shown Table 1 below in a band of n258 (e.g., 24.25 GHz to 27.5 GHz) and in a band of n257 (e.g., 26.5 GHz to 29.5 GHz).

TABLE 1

| | Dipole type + Monopole type | | First antenna array (9110) | |
|---|---|---|---|---|
| Frequency band | Third antenna array (9120) | Fourth antenna array (9130) | Horizontally polarized wave (961) | Vertically polarized wave (962) |
| n258 | 6.8 dB | 5.1 dB | 7.0 dB | 7.1 dB |
| n257 | 7.6 dB | 7.7 dB | 7.6 dB | 7.3 dB |

The antenna module 900 may radiate a horizontally polarized wave (HP) and a vertically polarized wave (VP) in the upper direction using the first antenna array 9110, radiate a horizontally polarized wave in the lateral direction using the third antenna array 9120, and radiate a vertically polarized wave in the lateral direction using the fourth antenna array 9130, thereby confirming that, as shown in Table 1 and FIG. 17, a gain of approximately 5 decibels (dB) to 7.7 dB is obtained in a band of n258 (e.g., about 24.25 GHz to 27.5 GHz) and in a band of n257 (e.g., about 26.5 GHz to 29.5 GHz). Referring to FIG. 18, it is identified that a good radiation pattern is formed according to various beam radiation of the antenna module 900 through the gain obtained in the band of n258 and the band of n257.

Figure 19:
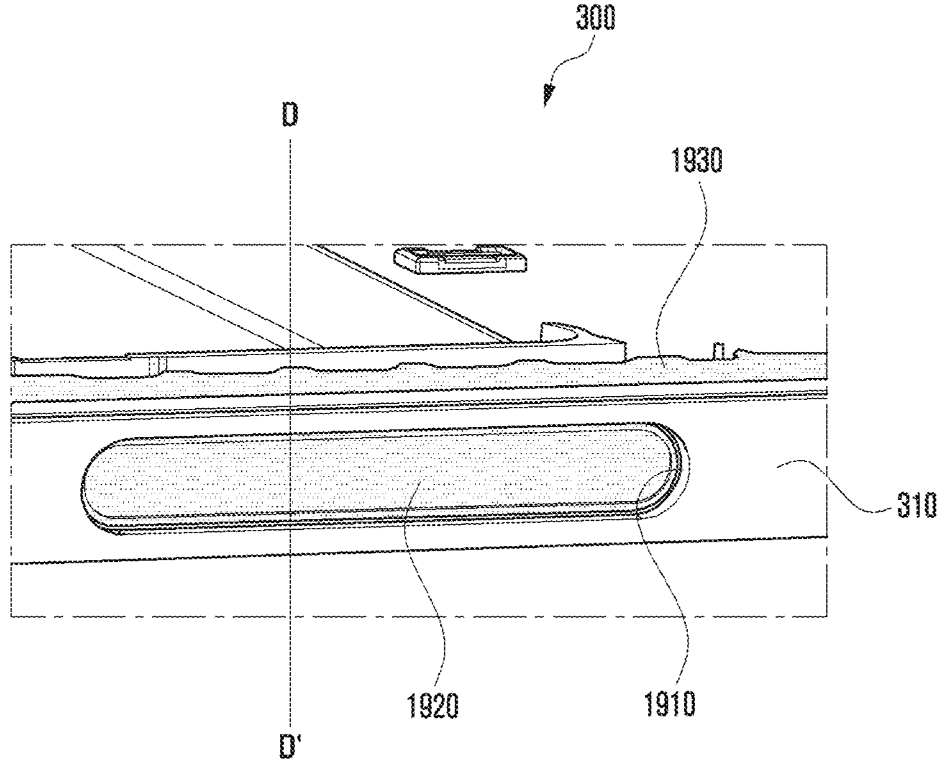
FIG. 19 illustrates a portion of an electronic device including an antenna module according to an embodiment.

FIG. 19 illustrates a portion of an electronic device including an antenna module according to an embodiment. For example, FIG. 19 may be an enlarged view schematically illustrating a portion of the region C of the electronic device 300 shown in FIG. 3A.

In the description of FIG. 19 and subsequently FIGS. 20 to 25, the same reference numerals will be assigned to the same elements as those of the above-described embodiments shown in FIGS. 3A to 3C and 5, and redundant descriptions of their functions will be omitted.

Referring to FIG. 19, in the electronic device 300, a hole 1910 may be formed in one surface of the housing 310. The hole 1910 may form a radiation path of the antenna module 500 disposed inside the electronic device 300.

A non-conductive cover 1920 may be disposed in the hole 1910. The non-conductive cover 1920 may include a dielectric. The non-conductive cover 1920 may protect the antenna module 500 disposed inside the housing 310. A non-conductive injection-molded part 1930 may be disposed inside the housing 310.

Figure 20:
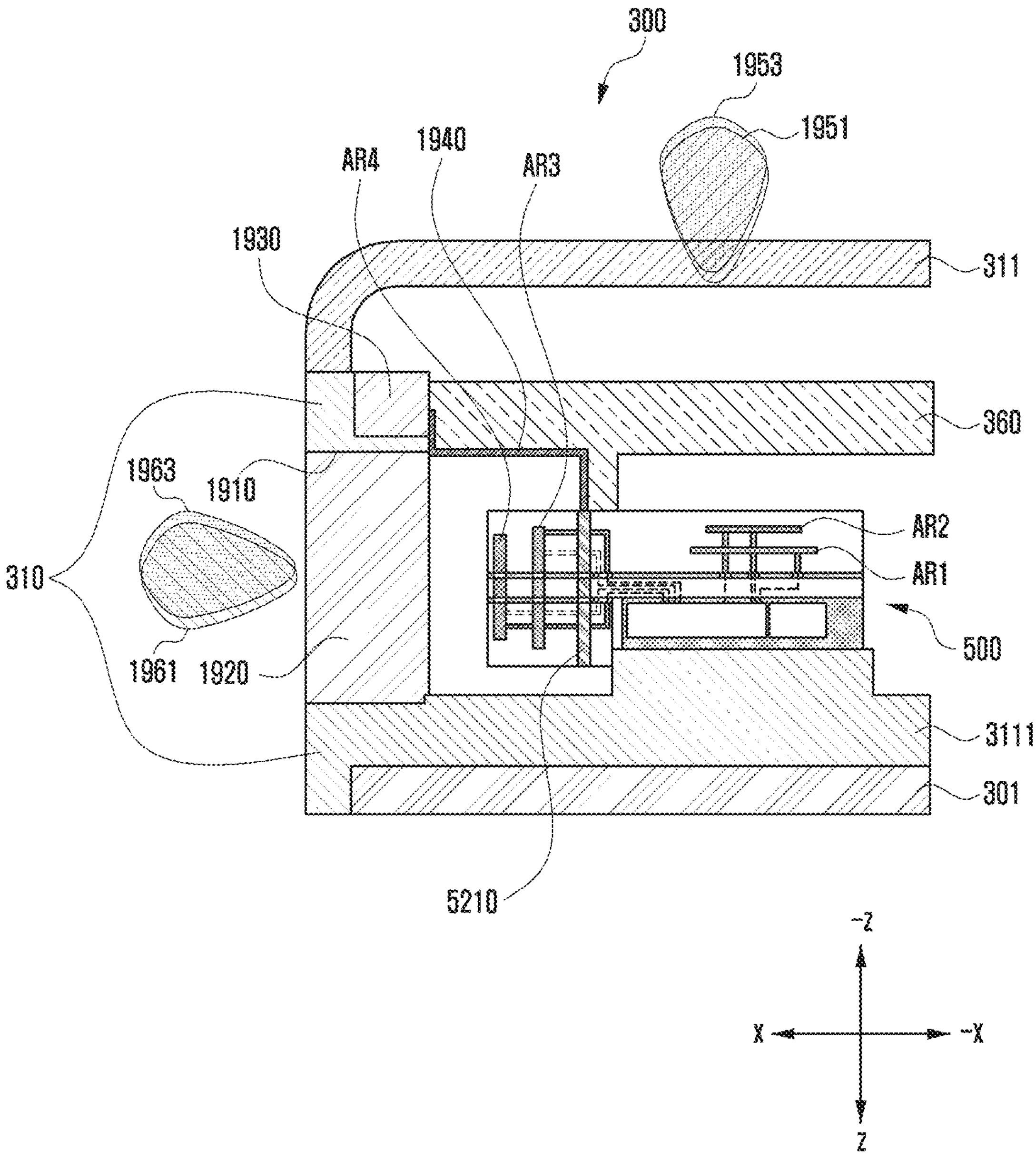
FIG. 20 illustrates the electronic device taken along line D-D' shown in FIG. 19 according to an embodiment.
Figure 21:
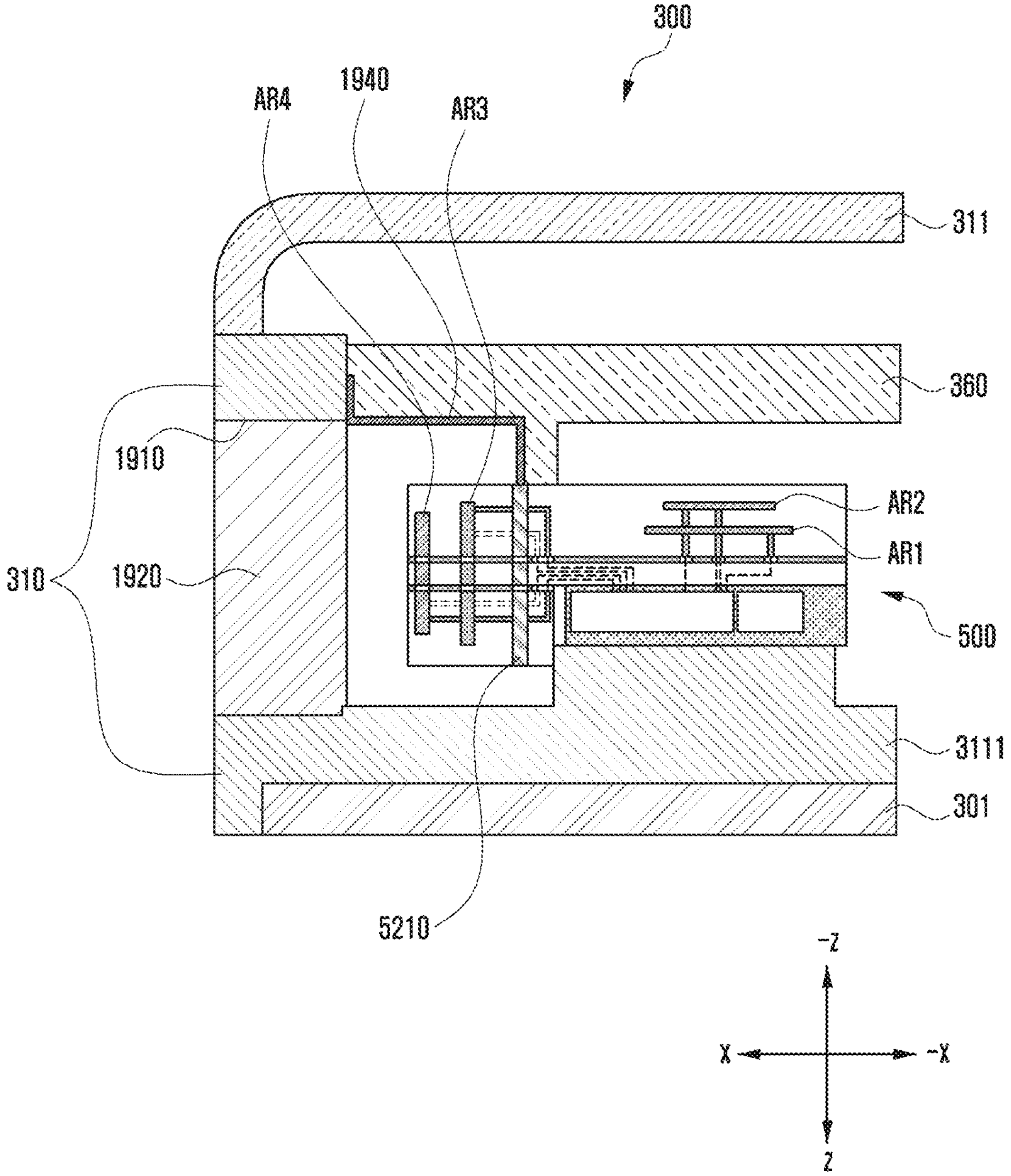
FIG. 21 illustrates the electronic device taken along line D-D' shown in FIG. 19 according to an embodiment.

FIG. 20 illustrates the electronic device taken along line D-D' shown in FIG. 19 according to an embodiment. FIG. 21 illustrates the electronic device taken along line D-D' shown in FIG. 19 in according to an embodiment.

Referring to FIGS. 20 and 21, the electronic device 300 may include an antenna module 500 disposed in the horizontal direction between a first support member 3111 and a second support member 360 (e.g., the rear case).

The display 301 may be disposed on one surface (e.g., the z-axis direction) of the first support member 3111. The first support member 3111 may be integrally formed with the housing 310. A rear plate 311 may be disposed on one surface (e.g., the −z-axis direction) of the second support member 360.

Referring to FIG. 20, a non-conductive injection-molded part 1930 may be disposed between the second support member 360 and the housing 310. Referring to FIG. 21, a non-conductive injection-molded part 1930 may not be disposed between the second support member 360 and the housing 310.

The antenna module 500 may be disposed inside the non-conductive cover 1920 disposed in the hole 1910 of the housing 310. The ground layer 5210 of the antenna module 500 may be electrically connected to the second support member 360 and a portion of the housing 310 using a conductive solder bump material 1940. The ground layer 5210 of the antenna module 500 may be coupled to the second support member 360 and the housing 310, instead of being directly connected with the conductive solder bump material 1940.

The antenna module 500 may perform radiation of a first vertically polarized wave 1951 and a first horizontally polarized wave 1953 in the direction (e.g., the −z-axis direction) in which the rear plate 311 of the electronic device 300 is disposed using the first antenna array AR1 (e.g., the first conductive patch 501, the second conductive patch 503, the third conductive patch 505, and/or the fourth conductive patch 507 in FIG. 5).

The antenna module 500 may perform radiation of a first vertically polarized wave 1951 and a first horizontally polarized wave 1953 in the direction (e.g., the −z-axis direction) in which the rear plate 311 of the electronic device 300 is disposed using the second antenna array AR2 (e.g., the fifth conductive patch 5010, the sixth conductive patch 5030, the seventh conductive patch 5050, and/or the eighth conductive patch 5070 in FIG. 5).

The antenna module 500 may perform radiation of a second vertically polarized wave 1961 and a second horizontally polarized wave 1963 in the lateral direction (e.g., the x-axis direction) in which the non-conductive cover 1920 of the electronic device 300 is disposed using the third antenna array AR3 (e.g., the ninth conductive patch 5211, the tenth conductive patch 5231, the eleventh conductive patch 5251, and/or the twelfth conductive patch 5271 in FIG. 5).

The antenna module 500 may perform radiation of a second vertically polarized wave 1961 and a second horizontally polarized wave 1963 in the lateral direction (e.g., the x-axis direction) in which the non-conductive cover 1920 of the electronic device 300 is disposed using the fourth antenna array AR4 (e.g., the thirteenth conductive patch 5311, the fourteenth conductive patch 5331, the fifteenth conductive patch 5351, and/or the sixteenth conductive patch 5371 in FIG. 5).

Figure 22:
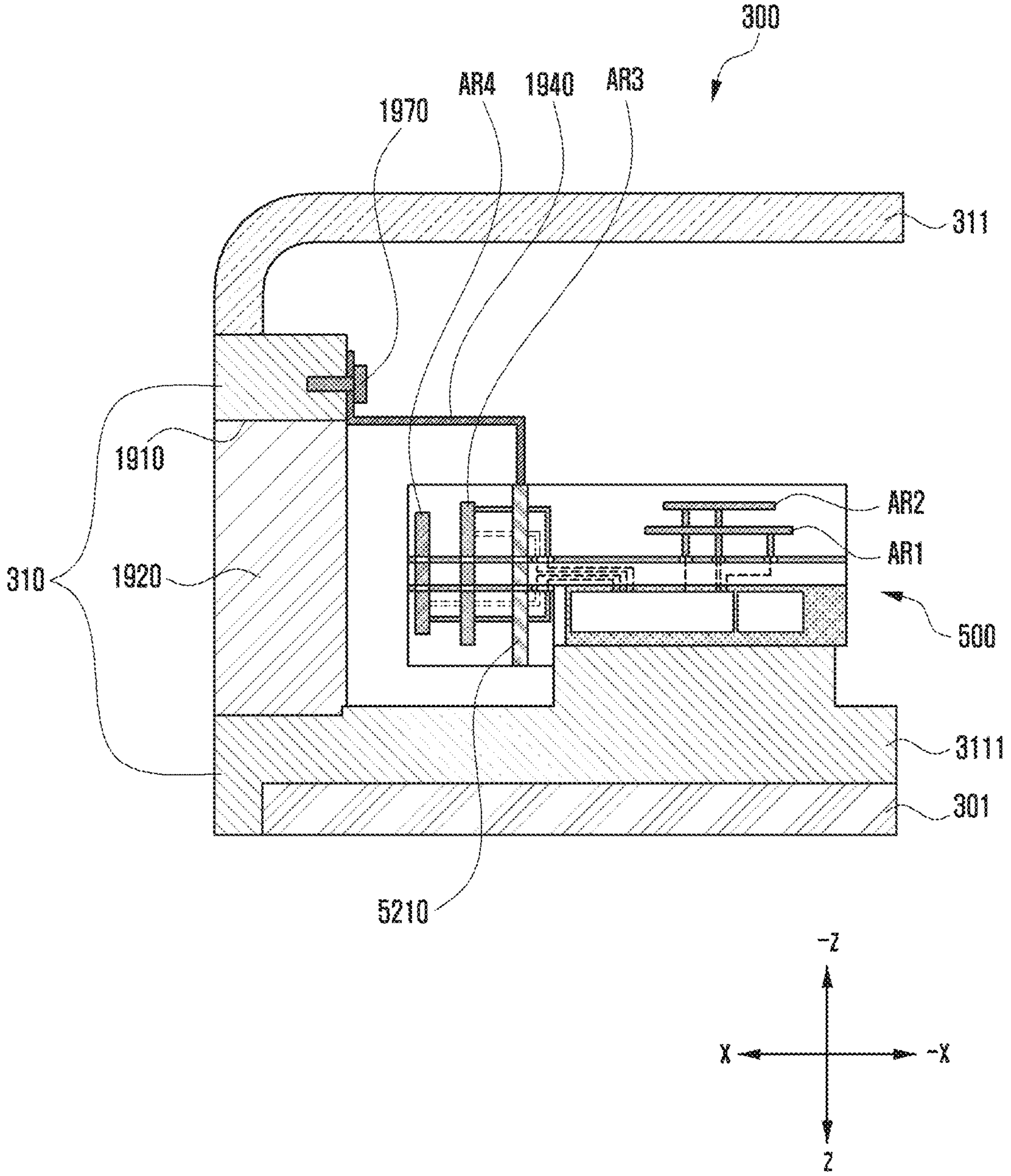
FIG. 22 illustrates the electronic device taken along line D-D' shown in FIG. 19 according to an embodiment.

FIG. 22 illustrates the electronic device taken along line D-D' shown in FIG. 19 according to an embodiment.

Referring to FIG. 22, the electronic device 300 may include an antenna module 500 disposed in the horizontal direction with respect to one direction (e.g., the −z-axis direction) of the first support member 3111 (e.g., the first support member in FIG. 3C).

The display 301 may be disposed on one surface (e.g., the z-axis direction) of the first support member 3111. The first support member 3111 may be integrally formed with the housing 310.

The electronic device 300 shown in FIG. 22 may exclude the second support member 360, compared to the electronic device shown in FIG. 20. In this case, the antenna module 500 may be spaced a predetermined distance apart from the rear plate 311 while facing each other.

The antenna module 500 may be disposed inside the non-conductive cover 1920 disposed in the hole 1910 of the housing 310. The ground layer 5210 of the antenna module 500 may be electrically connected to a portion of the housing 310 using a conductive solder bump material 1940 and a conductive screw 1970. The conductive screw 1970 may couple a portion of the conductive solder bump material 1940 to the housing 310.

Figure 23:
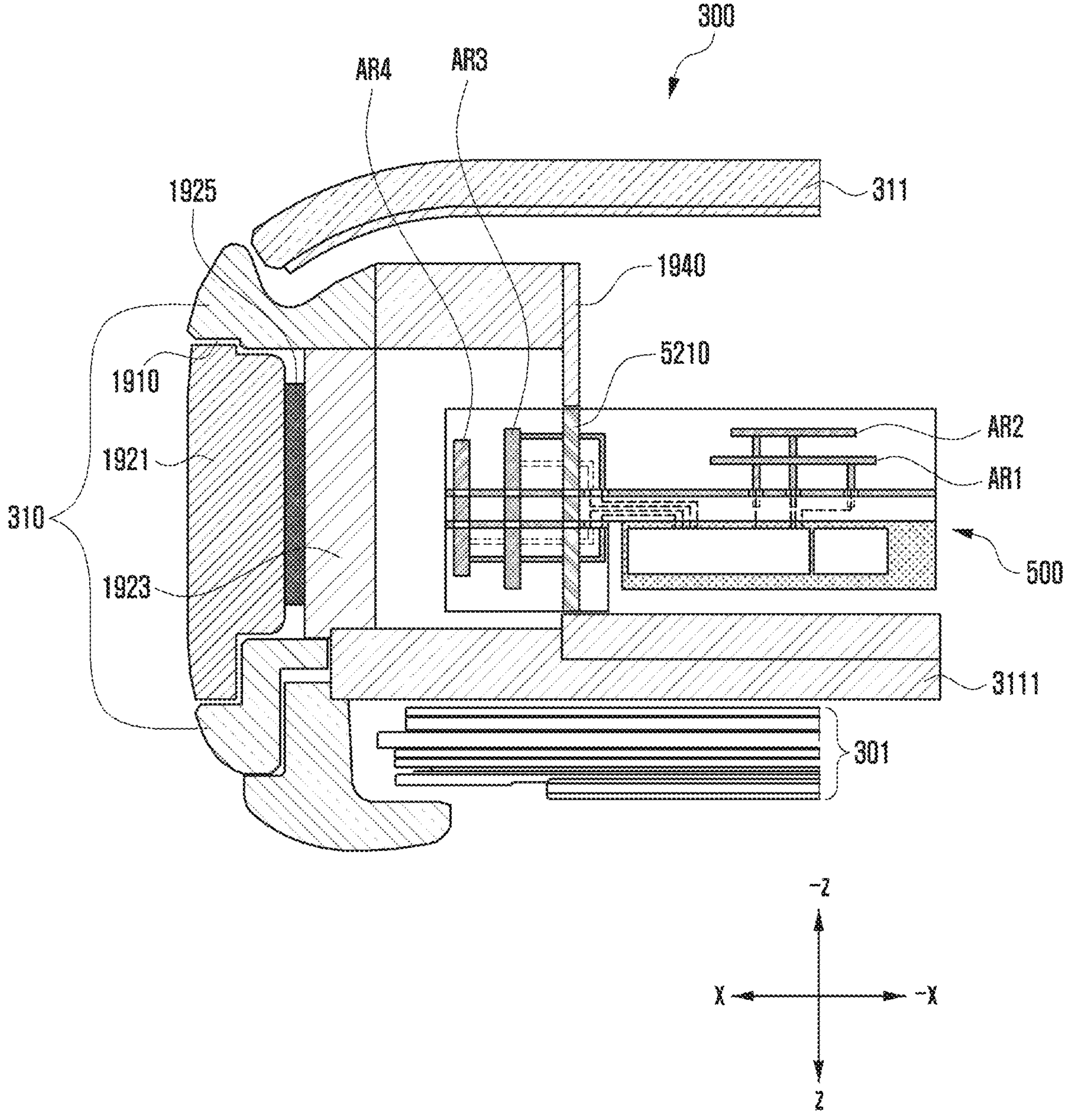
FIG. 23 illustrates a portion of an electronic device including an antenna module according to an embodiment.
Figure 24:
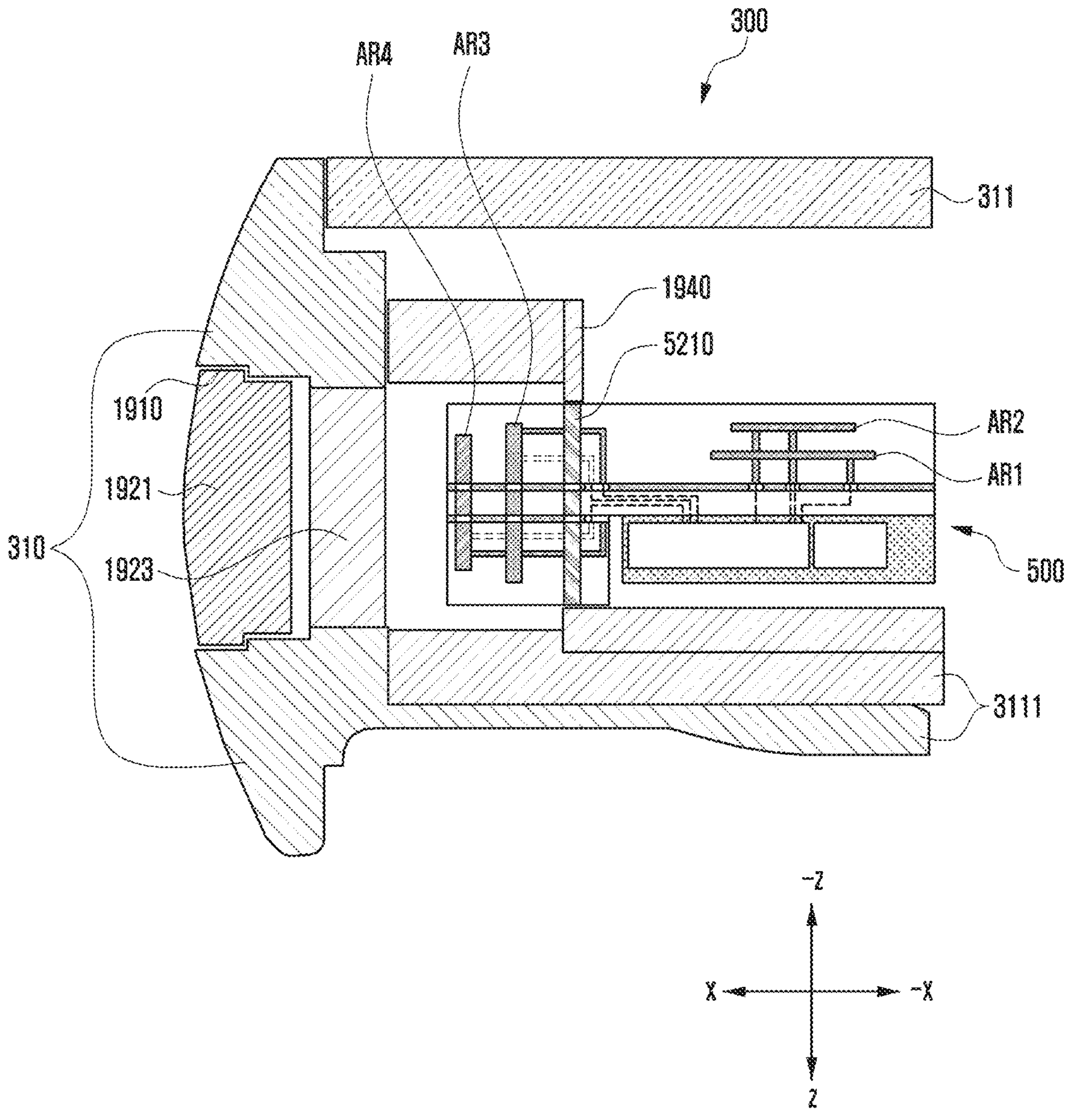
FIG. 24 illustrates a portion of an electronic device including an antenna module according to an embodiment.

FIG. 23 illustrates a portion of an electronic device including an antenna module according to an embodiment. FIG. 24 illustrates a portion of an electronic device including an antenna module according to an embodiment.

FIG. 23 may illustrate when an antenna module is disposed in a foldable type electronic device. FIG. 24 may illustrate when an antenna module is disposed in a bar-type electronic device.

Referring to FIGS. 23 and 24, the electronic device 300 may include an antenna module 500 disposed in the horizontal direction between the first support member 3111 and the rear plate 311.

The display 301 may be disposed on one surface (e.g., the z-axis direction) of the first support member 3111 which may be integrally formed with the housing 310. The first support member 3111 may be combined with the housing 310 to be separate.

A first non-conductive cover 1921 and a second non-conductive cover 1923 may be disposed in the hole 1910 formed on one surface of the housing 310. The first non-conductive cover 1921 and the second non-conductive cover 1923 may be coupled using a bonding portion 1925. The first non-conductive cover 1921 and the second non-conductive cover 1923 may be different from each other in permittivity. The antenna module 500 may be disposed inside the second non-conductive cover 1923 disposed in the hole 1910 of the housing 310. The ground layer 5210 of the antenna module 500 may be electrically connected to a portion of the housing 310 using a conductive solder bump material 1940.

Figure 25:
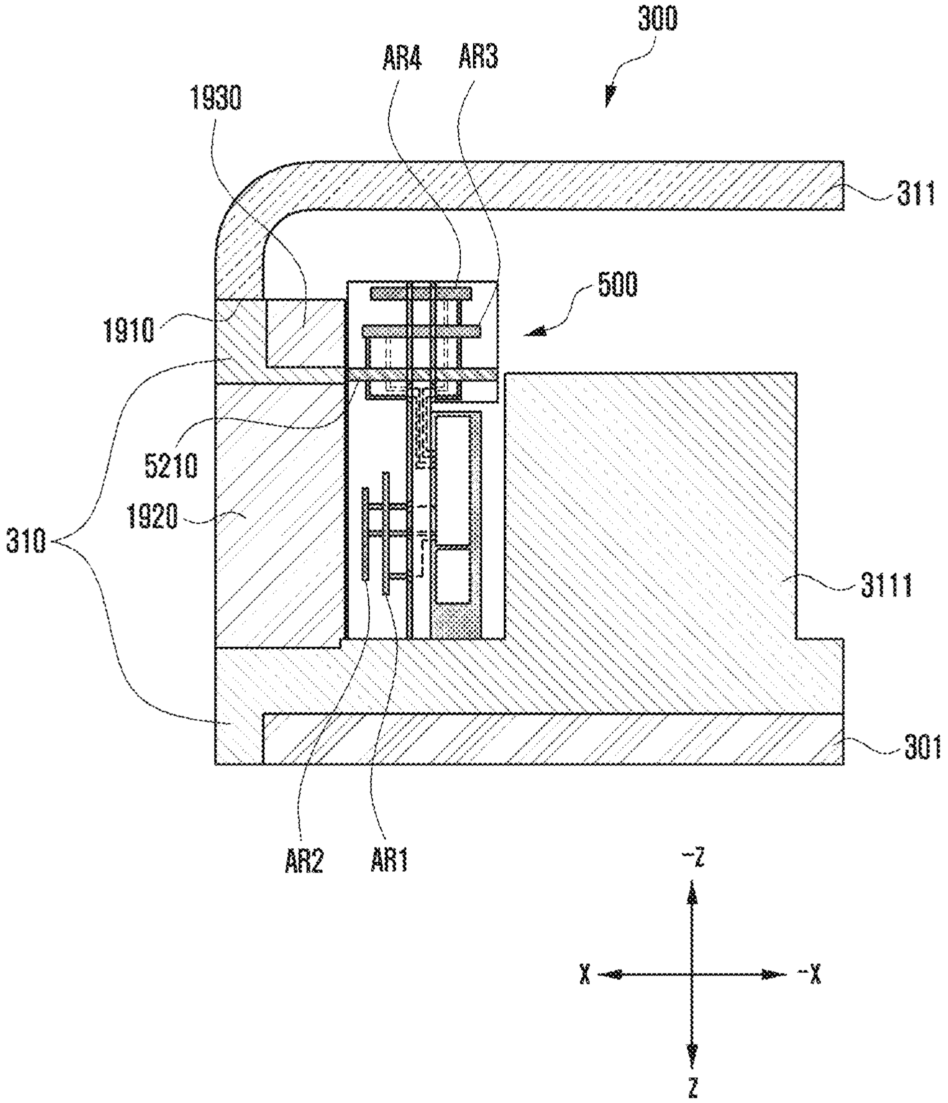
FIG. 25 illustrates an antenna module vertically disposed in an electronic device according to an embodiment.

FIG. 25 illustrates when an antenna module is vertically disposed in an electronic device according to an embodiment.

Referring to FIG. 25, the electronic device may include an antenna module 500 disposed in the vertical direction between the non-conductive cover 1920, a first support member 3111, and a rear plate 311.

The display 301 may be disposed on one surface (e.g., the z-axis direction) of the first support member 3111. The first support member 3111 may be integrally formed with the housing 310. The first support member 3111 may have a height extending in one direction (e.g., the −z-axis direction) to support the antenna module 500. A non-conductive injection-molded part 1930 may be disposed inside a portion of the housing 310. The non-conductive injection-molded part 1930 may be disposed between a portion of the housing 310 and a portion of the antenna module 500.

A non-conductive cover 1920 may be disposed in the hole 1910 formed on one surface of the housing 310. The antenna module 500 erected in the vertical direction may be disposed between the non-conductive cover 1920 and the first support member 3111. The ground layer 5210 of the antenna module 500 may be electrically connected to a portion of the housing 310.

As described above, an electronic device may include a housing, a wireless communication module, and an antenna module operatively connected to the wireless communication module and disposed inside the housing, wherein the antenna module may include a first substrate including at least one feed line, a first surface directed in a first direction, and a second surface directed in a second direction opposite the first surface, a second substrate disposed on the first surface of the first substrate and having a first antenna array and a second antenna array disposed thereon, and a third substrate disposed in a portion of the second surface of the first substrate and having a third antenna array and a fourth antenna array disposed thereon, and wherein the second substrate and/or the third substrate may be formed of a material having higher permittivity than the first substrate.

The second substrate and/or the third substrate may be formed of a ceramic material having permittivity of 7 or more.

The second substrate may be configured as a plurality of ceramic substrates, and the third substrate may be configured as a plurality of ceramic substrates.

The first antenna array may include a plurality of first antenna elements, and the plurality of first antenna elements, and may be configured to radiate a dual-polarized wave (e.g., a vertically polarized wave and a horizontally polarized wave) orthogonal to each other in an upper direction of the second substrate using a first feeder and a second feeder operatively connected to the wireless communication module, respectively, and the second antenna array may include a plurality of second antenna elements, and the plurality of second antenna elements may be configured to radiate a dual-polarized wave orthogonal to each other in the upper direction of the second substrate using a third feeder and a fourth feeder operatively connected to the wireless communication module, respectively.

At least one ground path may be disposed around each of the plurality of first antenna elements and/or each of the plurality of second antenna elements.

The third antenna array may include a plurality of third antenna elements, and the plurality of third antenna elements may be configured radiate a dual-polarized wave orthogonal to each other in a lateral direction of the third substrate using a fifth feeder and a sixth feeder operatively connected to the wireless communication module, respectively, and the fourth antenna array may include. a plurality of fourth antenna elements that may be configured to radiate a dual-polarized wave orthogonal to each other in the lateral direction of the third substrate using a seventh feeder and an eighth feeder 638 operatively connected to the wireless communication module, respectively.

At least one ground plate may be disposed around each of the plurality of third antenna elements and/or each of the plurality of fourth antenna elements.

The first antenna array may be configured to operate in a lower band area than the second antenna array, and the third antenna array may be configured to operate in a lower band area than the fourth antenna array.

The second substrate may be integrally configured such that the first antenna elements of the first antenna array may be disposed on the integrally configured second substrate, or a plurality of second substrates may be provided such that the first antenna elements of the first antenna array may be respectively disposed on the plurality of second substrates.

The third substrate may be integrally configured such that the third antenna elements of the third antenna array may be disposed on the integrally configured third substrate, or a plurality of third substrates may be provided such that the fourth antenna elements of the fourth antenna array may be respectively disposed on the plurality of third substrates.

A ground layer having at least one first via formed therein may be disposed inside the second substrate, and at least one second via may be formed in each of the third antenna elements of the third antenna array.

The second substrate may be configured as an integrated chip or may be configured as a plurality of chips respectively corresponding to the first antenna elements of the first antenna array.

The third substrate may be configured as an integrated chip or may be configured as a plurality of chips respectively corresponding to the third antenna elements of the third antenna array.

The first antenna elements of the first antenna array disposed on the second substrate may be disposed under the second antenna elements of the second antenna array, and the third antenna elements of the third antenna array disposed on the third substrate may be disposed under the fourth antenna elements of the fourth antenna array.

The first antenna elements of the first antenna array and the second antenna elements of the second antenna array, which are disposed on the second substrate, may be alternately disposed on the left and right sides on a parallel plane, respectively, and the third antenna elements of the third antenna array and the fourth antenna elements of the fourth antenna array, which are disposed on the third substrate, may be alternately disposed on the left and right sides on a parallel plane, respectively.

As described above, an electronic device may include a housing, a wireless communication module, and an antenna module operatively connected to the wireless communication module and disposed inside the housing, wherein the antenna module may include a first substrate including at least one feed line, a first surface directed in a first direction, and a second surface directed in a second direction opposite the first surface, a second substrate disposed on the first surface of the first substrate and having a first antenna array, a second antenna array, and a third antenna array disposed thereon, a ground layer disposed inside the second substrate and including a plurality of slits, and a plurality of substrates disposed under the third antenna array and having a fourth antenna array disposed thereon, and wherein the second substrate and the plurality of substrates may be formed of a material having higher permittivity than the first substrate.

The second substrate and/or the plurality of substrates may be configured as a rigid body made of a ceramic material having permittivity of at least 7.

The first antenna array may include a plurality of first antenna elements, and the plurality of first antenna elements may be configured to radiate a dual-polarized wave orthogonal to each other in an upper direction of the second substrate using a first feeder and a second feeder operatively connected to the wireless communication module, respectively, and the second antenna array may include a plurality of second antenna elements, and the plurality of second antenna elements may be configured to radiate a dual-polarized wave orthogonal to each other in the upper direction of the second substrate using a third feeder and a fourth feeder operatively connected to the wireless communication module, respectively, and the third antenna array may include a plurality of third antenna elements, and the plurality of third antenna elements may be configured to radiate a horizontal polarized wave in a lateral direction of the second substrate using a fifth feeder operatively connected to the wireless communication module, respectively, and the fourth antenna array may be configured to radiate a vertically polarized wave in a lateral direction of the third substrate 930*a* using a sixth feeder operatively connected to the wireless communication module.

The first antenna array may be configured as a plurality of conductive patches, and the second antenna array may be configured as a plurality of conductive patches, and the third antenna array may be configured as a plurality of dipole antennas, and the fourth antenna array may be configured as a plurality of monopole antennas.

An antenna module according to various embodiments of the disclosure may include a first substrate including at least one feed line, a first surface directed in a first direction, and a second surface directed in a second direction opposite the first surface, a second substrate disposed on the first surface of the first substrate and having a first antenna array and a second antenna array disposed thereon, and a third substrate disposed in a portion of the second surface of the first substrate and having a third antenna array and a fourth antenna array disposed thereon, wherein the second substrate and/or the third substrate may be formed of a material having higher permittivity than the first substrate.

While the present disclosure has been described with reference to various embodiments, various changes may be made without departing from the spirit and the scope of the present disclosure, which is defined, not by the detailed description and embodiments, but by the appended claims and their equivalents.

What is claimed is:

1. An electronic device comprising:

a housing;

a wireless communication module; and an antenna module operatively connected to the wireless communication module and disposed inside the housing, wherein the antenna module comprises:

a first substrate comprising at least one feed line, a first surface disposed in a first direction, and a second surface disposed in a second direction opposite the first surface;

a second substrate disposed on the first surface of the first substrate and having a first antenna array and a second antenna array disposed on the second substrate; and a third substrate disposed in a portion of the second surface of the first substrate and having a third antenna array and a fourth antenna array disposed on the third substrate, wherein the second substrate and/or the third substrate is formed of a material having a higher permittivity than the first substrate.

2. The electronic device of claim 1, wherein the second substrate and/or the third substrate is formed of a ceramic material having a permittivity of at least 7.

3. The electronic device of claim 1, wherein the second substrate is configured as a plurality of ceramic substrates, and wherein the third substrate is configured as a plurality of ceramic substrates.

4. The electronic device of claim 1, wherein the first antenna array comprises a plurality of first antenna elements, wherein the plurality of first antenna elements is configured to radiate dual-polarized waves orthogonal to each other in an upper direction of the second substrate using a first feeder and a second feeder operatively connected to the wireless communication module, respectively, wherein the second antenna array comprises a plurality of second antenna elements, and wherein the plurality of second antenna elements is configured to radiate dual-polarized waves orthogonal to each other in the upper direction of the second substrate using a third feeder and a fourth feeder operatively connected to the wireless communication module, respectively.

5. The electronic device of claim 4, wherein at least one ground path is disposed around each of the plurality of first antenna elements and/or each of the plurality of second antenna elements.

6. The electronic device of claim 1, wherein the third antenna array comprises a plurality of third antenna elements, wherein the plurality of third antenna elements is configured radiate dual-polarized waves orthogonal to each other in a lateral direction of the third substrate using a fifth feeder and a sixth feeder operatively connected to the wireless communication module, respectively, wherein the fourth antenna array comprises a plurality of fourth antenna elements, and wherein the plurality of fourth antenna elements is configured to radiate dual-polarized waves orthogonal to each other in the lateral direction of the third substrate using a seventh feeder and an eighth feeder operatively connected to the wireless communication module, respectively.

7. The electronic device of claim 6, wherein at least one ground plate is disposed around each of the plurality of third antenna elements and/or each of the plurality of fourth antenna elements.

8. The electronic device of claim 1, wherein the first antenna array is configured to operate in a lower band area than the second antenna array, and wherein the third antenna array is configured to operate in a lower band area than the fourth antenna array.

9. The electronic device of claim 1, wherein the second substrate is integrally configured such that the first antenna elements of the first antenna array are disposed on the integrally configured second substrate, or wherein a plurality of second substrates is provided such that the first antenna elements of the first antenna array are respectively disposed on the plurality of second substrates.

10. The electronic device of claim 1, wherein the third substrate is integrally configured such that the third antenna elements of the third antenna array are disposed on the integrally configured third substrate, or wherein a plurality of third substrates is provided such that the fourth antenna elements of the fourth antenna array are respectively disposed on the plurality of third substrates.

11. The electronic device of claim 1, wherein a ground layer having at least one first via formed therein is disposed inside the second substrate, and wherein at least one second via is formed in each of the third antenna elements of the third antenna array.

12. The electronic device of claim 1, wherein the second substrate is configured as an integrated chip or as a plurality of chips respectively corresponding to the first antenna elements of the first antenna array.

13. The electronic device of claim 1, wherein the third substrate is configured as an integrated chip or as a plurality of chips respectively corresponding to the third antenna elements of the third antenna array.

14. The electronic device of claim 1, wherein the first antenna elements of the first antenna array disposed on the second substrate are disposed under the second antenna elements of the second antenna array, and wherein the third antenna elements of the third antenna array disposed on the third substrate are disposed under the fourth antenna elements of the fourth antenna array.

15. The electronic device of claim 1, wherein the first antenna elements of the first antenna array and the second antenna elements of the second antenna array, which are disposed on the second substrate, are alternately disposed on the left and right sides on a parallel plane, respectively, and wherein the third antenna elements of the third antenna array and the fourth antenna elements of the fourth antenna array, which are disposed on the third substrate, are alternately disposed on the left and right sides on a parallel plane, respectively.

16. An antenna module comprising:

a first substrate comprising at least one feed line, a first surface directed in a first direction, and a second surface directed in a second direction opposite the first surface;

a second substrate disposed on the first surface of the first substrate and having a first antenna array and a second antenna array disposed on the second substrate; and a third substrate disposed in a portion of the second surface of the first substrate and having a third antenna array and a fourth antenna array disposed on the third substrate, wherein the second substrate and/or the third substrate is formed of a material having higher permittivity than the first substrate.

* * * * *